US008503809B2

(12) United States Patent
Fukuhara et al.

(10) Patent No.: US 8,503,809 B2
(45) Date of Patent: Aug. 6, 2013

(54) INFORMATION PROCESSING APPARATUS AND METHOD TO ENTROPY CODE UPON PROCESSING OF PREDETERMINED NUMBER OF PRECINCTS

(75) Inventors: Takahiro Fukuhara, Minato-ku (JP); Katsutoshi Ando, Minato-ku (JP)

(73) Assignee: Sony Corporation, Tokyo (JP)

( * ) Notice: Subject to any disclaimer, the term of this patent is extended or adjusted under 35 U.S.C. 154(b) by 998 days.

(21) Appl. No.: 12/374,509

(22) PCT Filed: May 16, 2008

(86) PCT No.: PCT/JP2008/059002
§ 371 (c)(1),
(2), (4) Date: Jan. 21, 2009

(87) PCT Pub. No.: WO2008/143157
PCT Pub. Date: Nov. 27, 2008

(65) Prior Publication Data
US 2009/0175548 A1 Jul. 9, 2009

(30) Foreign Application Priority Data
May 17, 2007 (JP) .................................. 2007-132156

(51) Int. Cl.
*G06K 9/46* (2006.01)
(52) U.S. Cl.
USPC ........... 382/248; 382/232; 382/233; 382/244; 375/240.02; 375/240.12; 375/240.24; 375/240.25; 341/51; 341/106
(58) Field of Classification Search
None
See application file for complete search history.

(56) References Cited

U.S. PATENT DOCUMENTS

| 5,880,856 | A * | 3/1999 | Ferriere .................. 358/426.11 |
| 6,101,284 | A | 8/2000 | Matsubara et al. |
| 6,560,369 | B1 * | 5/2003 | Sato .............................. 382/239 |
| 6,707,948 | B1 * | 3/2004 | Cosman et al. ............... 382/240 |
| 6,813,314 | B2 * | 11/2004 | Aono et al. ............. 375/240.11 |
| 6,847,468 | B2 * | 1/2005 | Ferriere ........................ 358/1.2 |
| 6,917,384 | B1 | 7/2005 | Fukushima |
| 7,031,386 | B2 * | 4/2006 | Yamamoto et al. ....... 375/240.12 |

(Continued)

FOREIGN PATENT DOCUMENTS
JP 9 130800 5/1997
JP 2000 358183 12/2000

(Continued)

OTHER PUBLICATIONS

Office Action issued Jul. 19, 2010, in Chine Patent Application No. 200880000450.3 (with English translation).

(Continued)

*Primary Examiner* — Matthew Bella
*Assistant Examiner* — Jason Heidemann
(74) *Attorney, Agent, or Firm* — Oblon, Spivak, McClelland, Maier & Neustadt, L.L.P.

(57) ABSTRACT

The present invention relates to an information processing apparatus and method which make it possible to transmit image data with high quality and low delay. A wavelet transform unit 101 applies wavelet transform to image data using a reversible filter that performs data transform with a reversible method that completely ensures forward direction and backward direction transform. An entropy coding unit 103 encodes coefficient data using a predetermined entropy coding scheme, with a reversible method that completely ensures forward direction and backward direction transform. The present invention is applicable to, for example, an encoding apparatus or a decoding apparatus.

15 Claims, 42 Drawing Sheets

U.S. PATENT DOCUMENTS

| | | | |
|---|---|---|---|
| 7,076,107 B1 * | 7/2006 | Terao | 382/240 |
| 2002/0028022 A1 * | 3/2002 | Fukuhara et al. | 382/240 |
| 2004/0126029 A1 * | 7/2004 | Sakuyama et al. | 382/240 |
| 2004/0131265 A1 * | 7/2004 | Yagishita et al. | 382/233 |
| 2004/0161156 A1 * | 8/2004 | Matsubara | 382/232 |
| 2007/0165959 A1 * | 7/2007 | Takada | 382/240 |

FOREIGN PATENT DOCUMENTS

| | | |
|---|---|---|
| JP | 2000-358183 | 12/2000 |
| JP | 2001-275112 | 10/2001 |
| JP | 2003-101791 | 4/2003 |
| JP | 2003-116133 | 4/2003 |
| JP | 2003-274185 | 9/2003 |
| JP | 2004 166096 | 6/2004 |
| JP | 2005-142673 | 6/2005 |
| JP | 2005-303854 | 10/2005 |
| WO | 2007 058294 | 5/2007 |
| WO | 2007 058296 | 5/2007 |

OTHER PUBLICATIONS

Office Action issued May 12, 2011, in Japan Patent Application No. 2008-289346.

Office Action issued May 19, 2011, in Japan Patent Application No. 2008-289345.

U.S. Appl. No. 12/307,447, filed Jan. 5, 2009, Fukuhara, et al.

* cited by examiner

FIG. 5
A
SPLITTING LEVEL = 1
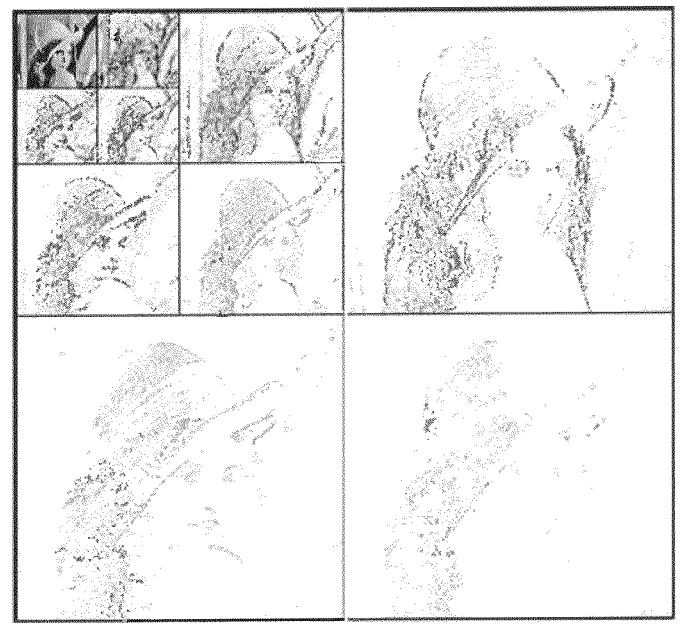
B
SPLITTING LEVEL = 3

INFORMATION PROCESSING APPARATUS AND METHOD TO ENTROPY CODE UPON PROCESSING OF PREDETERMINED NUMBER OF PRECINCTS

TECHNICAL FIELD

The present invention relates to an information processing apparatus and method, and more particularly, to an information processing apparatus and method which make it possible to transmit image data with high quality and low delay.

BACKGROUND ART

Hitherto, it has been demanded to transmit video and audio data with least delay in, for example, communication systems using video and audio, such as bidirectional video conference systems, and in mixed systems with a non-compression environment in broadcasting stations or the like. In recent years in particular, the amount of data has been increasing as the quality of video and audio has been improved, and accordingly, image compression at the time of transmission has become essential. It has been demanded to suppress an increase in delay time due to the image compression and to perform data transmission with lower delay.

For example, in MPEG (Moving Picture Experts Group) and H.26x compression systems, the compression ratio has been increased based on motion prediction. When motion prediction is performed, the algorithm becomes complicated, and the processing time involved increases in proportion to the square of the frame size. In principle, an encoding delay of a few frames occurs. When bidirectional real-time communication is to be performed, the delay time becomes almost an allowable delay time of 250 ms, which is a length that is not negligible.

Also, intraframe codecs represented by JPEG (Joint Photographic Experts Group) 2000 do not use interframe difference information. Thus, delay such as that described above does not occur. However, since compression is done on a frame-by-frame basis, the codec must wait at least one frame before the start of encoding. Since current general systems employ 30 frames per second in many cases, a waiting time of about 16 ms is necessary before the start of encoding.

In addition, as the quality of video and audio has become improved, it has also been demanded to improve the quality of image compression. JPEG 2000 adopts a compression coding scheme combining high-efficiency entropy coding using bit modeling in increments of a bit plane and arithmetic coding with wavelet transform. For example, a wavelet transform method that has further improved the encoding efficiency has been described in Patent Document 1.

Patent Document 1: Japanese Unexamined Patent Application Publication No. 9-130800

DISCLOSURE OF INVENTION

Technical Problem

However, it has been difficult to transmit image data with high quality and low delay using conventional methods.

The present invention is proposed in view of such conventional circumstances and makes it possible to encode image data using a reversible method that can restore the original data and to transmit the image data with low delay.

Technical Solution

An aspect of the present invention is an information processing apparatus including: analysis filtering means for performing an analysis filtering process of decomposing image data in increments of a frequency band using a reversible method that can restore the original image data from transformed coefficient data by performing transform in an opposite direction, and generating sub-bands including coefficient data in increments of the frequency band, in increments of a line block including the image data equivalent to a number of lines needed to generate coefficient data equivalent to one line of sub-bands of at least lowest frequency components; and encoding means for encoding the coefficient data generated by the analysis filtering process performed by the analysis filtering means using a reversible method that can restore the original coefficient data from encoded data by performing a decoding process in increments of a group of items of the coefficient data generated from a plurality of the line blocks.

The information processing apparatus may further include generation means for generating, for the encoded data obtained by encoding performed by the encoding means, information regarding the encoded data, the information at least including information indicating that the encoded data has been generated by encoding using the reversible method, in increments of a predetermined data unit.

The generation means may generate, as the information regarding the encoded data, information regarding the type of the analysis filtering process executed by the analysis filtering means.

The generation means may generate, as the information regarding the encoded data, information regarding the number of line blocks needed to generate the group of items of coefficient data serving as a processing unit for the encoding performed by the encoding means.

The information processing apparatus may further include reordering means for reordering the coefficient data generated by the analysis filtering process performed by the analysis filtering means in the order in which the coefficient data is used in executing a combining filtering process of combining the coefficient data of each sub-band to generate the original image data in increments of the line block. The encoding means may encode the coefficient data in the order reordered by the reordering means in increments of the group of items of coefficient data generated from the plurality of line blocks.

The information processing apparatus may further include generation means for generating, for the encoded data obtained by encoding performed by the encoding means, information regarding the encoded data, the information at least including information indicating that the encoded data has been generated by encoding using the reversible method, and information regarding reordering of the coefficient data performed by the reordering means, in increments of a predetermined data unit.

The analysis filtering means may further perform an analysis filtering process of decomposing the image data in increments of a frequency band using an irreversible method that does not ensure restoration of the original image data by performing transform in the opposite direction, and generating sub-bands including coefficient data in increments of the frequency band, in increments of a line block including the image data equivalent to a number of lines needed to generate coefficient data equivalent to one line of sub-bands of at least lowest frequency components. The information processing apparatus may further include control means for controlling whether to perform the analysis filtering process performed by the analysis filtering means using the reversible method or the irreversible method.

An aspect of the present invention is an information processing method, wherein: analysis filtering means performs an analysis filtering process of decomposing image data in increments of a frequency band using a reversible method that can restore the original image data from transformed coefficient data by performing transform in an opposite direction, and generating sub-bands including coefficient data in increments of the frequency band, in increments of a line block including the image data equivalent to a number of lines needed to generate coefficient data equivalent to one line of sub-bands of at least lowest frequency components; and encoding means encodes the coefficient data generated by performing the analysis filtering process using a reversible method that can restore the original coefficient data from encoded data by performing a decoding process in increments of a group of items of the coefficient data generated from a plurality of the line blocks.

Another aspect of the present invention is an information processing apparatus including: analysis means for analyzing information regarding encoded data which is encoded image data, and specifying whether or not the encoded data has been generated by performing an encoding process using a reversible method that can restore data before encoding by performing a decoding process; decoding means for performing, when it is determined as a result of the analysis performed by the analysis means that the encoded data has been generated by performing the encoding process using the reversible method, a decoding process of the encoded data using a method corresponding to the encoding process; and combining filtering means for combining coefficient data generated from the encoded data by performing the decoding process using the decoding means and generating the image data.

Yet another aspect of the present invention is an information processing method, wherein: analysis means analyzes information regarding encoded data which is encoded image data, and specifies whether or not the encoded data has been generated by performing an encoding process using a reversible method that can restore data before encoding by performing a decoding process; decoding means performs, when it is determined as a result of the analysis that the encoded data has been generated by performing the encoding process using the reversible method, a decoding process of the encoded data using a method corresponding to the encoding process; and combining filtering means combines coefficient data generated from the encoded data by performing the decoding process and generates the image data.

In an aspect of the present invention, an analysis filtering process of decomposing image data in increments of a frequency band using a reversible method that can restore the original image data from transformed coefficient data by performing transform in an opposite direction and generating sub-bands including coefficient data in increments of the frequency band is performed in increments of a line block including the image data equivalent to a number of lines needed to generate coefficient data equivalent to one line of sub-bands of at least lowest frequency components; and the coefficient data generated by performing the analysis filtering process is encoded using a reversible method that can restore the original coefficient data from encoded data by performing a decoding process in increments of a group of items of coefficient data generated from a plurality of line blocks.

In another aspect of the present invention, information regarding encoded data which is encoded image data is analyzed, and whether or not the encoded data has been generated by performing an encoding process using a reversible method that can restore data before encoding by performing a decoding process is specified; when it is determined as a result of the analysis that the encoded data has been generated by performing the encoding process using the reversible method, a decoding process of the encoded data is performed using a method corresponding to the encoding process; and coefficient data generated from the encoded data by performing the decoding process is combined to generate the image data.

Advantageous Effects

According to the present invention, image data can be transmitted. In particular, image data can be transmitted with high quality and low delay.

BRIEF DESCRIPTION OF DRAWINGS

FIG. 5 includes outline diagrams for describing the outline of wavelet transform.

Figure 1:
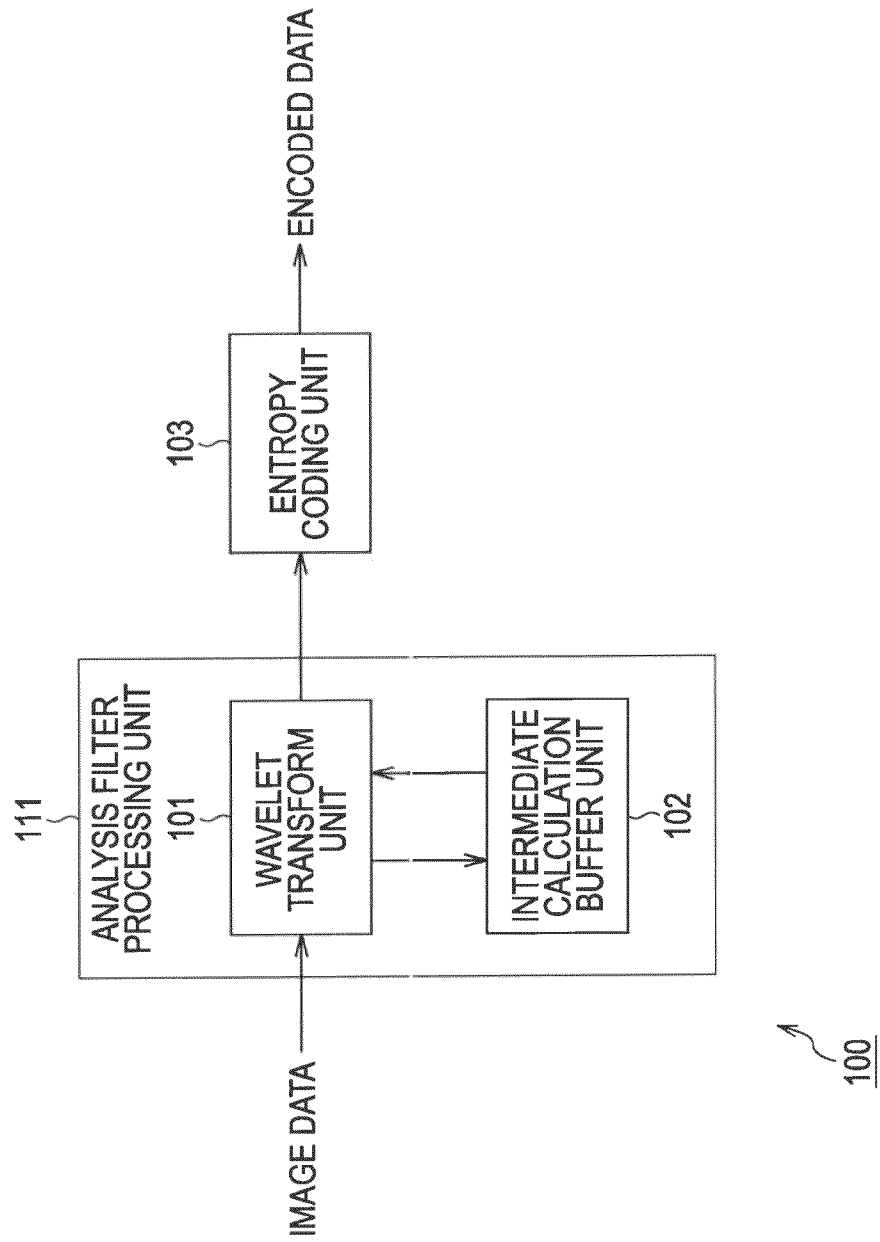
FIG. 1 is a block diagram showing an exemplary structure of an encoding apparatus.

EXPLANATION OF REFERENCE NUMERALS 100 encoding apparatus, 101 wavelet transform unit, 102 intermediate calculation buffer unit, 103 entropy coding unit, 111 analysis filter processing unit, 200 decoding apparatus, 201 entropy decoding unit, 202 coefficient reordering unit, 203 coefficient buffer unit, 204 inverse wavelet transform unit, 211 combining filter processing unit, 300 encoding apparatus, 321 bit shifter, 322 wavelet transformer, 400 decoding apparatus, 421 inverse wavelet transformer, 422 bit shifter, 500 encoding apparatus, 501 control unit, 502 encoding unit, 503 header generation unit, 504 packetizing unit, 505 sending unit, 513 coefficient reordering buffer unit, 514 coefficient reordering unit, 600 encoding apparatus, 601 control unit, 602 encoding unit, 603 header generation unit, 604 packetizing unit, 605 sending unit, 611 wavelet transform unit, 613 switching unit, 616 switching unit, 622 reordering processing unit, 623 encoding processing unit, 632 switching unit, 633 integer-type wavelet transform unit, 634 fixed-point-type wavelet transform unit, 635 switching unit, 542 switching unit, 644 switching unit, 700 decoding apparatus, 701 receiving unit, 702 packet analysis unit, 703 header analysis unit, 704 decoding unit, 713 switching unit, 716 switching unit, 717 gain adjustment unit, 731 reordering processing unit, 732 combining filter processing unit, 751 switching unit, 752 high-frequency-component gain adjustment unit, 753 switching unit, 754 integer-type inverse wavelet transform unit, 755 fixed-point-type inverse wavelet transform unit, 756 switching unit, 765 switching unit, 767 switching unit

BEST MODES FOR CARRYING OUT THE INVENTION

Hereinafter, embodiments of the present invention will be described.

FIG. 1 is a block diagram showing an exemplary structure of an encoding apparatus to which the present invention is applied.

In FIG. 1, an encoding apparatus 100 is an apparatus that encodes image data. The encoding apparatus 100 performs encoding so that baseband image data before encoding can be restored by decoding encoded data obtained by encoding baseband image data. That is, the encoding apparatus 100 encodes image data using a reversible method that completely ensures forward direction and backward direction transform. Accordingly, the encoding apparatus 100 can encode image data such that high-quality image data can be obtained even after decoding. Also, the encoding apparatus 100 encodes image data in increments of a precinct, which will be described later. Accordingly, the encoding apparatus 100 can reduce delay time until image data is encoded and decoded.

The encoding apparatus 100 has a wavelet transform unit 101, an intermediate calculation buffer unit 102, and an entropy coding unit 103.

Image data input to the encoding apparatus 100 is temporarily accumulated in the intermediate calculation buffer unit 102 via the wavelet transform unit 101. The wavelet transform unit 101 applies wavelet transform to the image data accumulated in the intermediate calculation buffer unit 102 using a reversible filter that performs data transform with a reversible method that completely ensures forward direction and backward direction transform. The wavelet transform unit 101 reads out image data from the intermediate calculation buffer unit 102, applies a filtering process to the image data using a reversible analysis filter to generate coefficient data of low frequency components and high frequency components, and stores the generated coefficient data in the intermediate calculation buffer unit 102.

The wavelet transform unit 101 includes a horizontal analysis filter and a vertical analysis filter and performs a reversible analysis filtering process in both a screen horizontal direction and a screen vertical direction on a group of items of image data. The wavelet transform unit 101 reads out again the coefficient data of low frequency components, which is stored in the intermediate calculation buffer unit 102, and applies a filtering process to the read-out coefficient data using the analysis filters to further generate coefficient data of high frequency components and low frequency components. The generated coefficient data is stored in the intermediate calculation buffer unit 102. That is, the wavelet transform unit 101 recursively repeats, on low frequency components, a filtering process of splitting input data into low frequency components and high frequency components a predetermined number of times.

When a decomposition level reaches a predetermined level as a result of repeating this process, the wavelet transform unit 101 reads out the coefficient data from the intermediate calculation buffer unit 102 and writes the read-out coefficient data into the entropy coding unit 103.

Note that the wavelet transform unit 101 and the intermediate calculation buffer unit 102 are also collectively referred to as an analysis filter processing unit 111.

The entropy coding unit 103 encodes the coefficient data supplied from the wavelet transform unit 101 (analysis filter processing unit 111) using a predetermined entropy coding scheme, such as Huffman coding or arithmetic coding, with a reversible method that completely ensures forward direction and backward direction transform. That is, the entropy coding unit 103 performs encoding so that baseband image data before encoding can be restored by decoding encoded data obtained by encoding baseband image data.

On this occasion, the entropy coding unit 103 improves the encoding efficiency by performing an encoding process using a larger amount of information. In particular, when an encoding process is performed with a reversible method, in most cases, priority is given to the improvement of quality and efficiency of image compression over delay time. Therefore, the entropy coding unit 103 remains in standby until coefficient data equivalent to a predetermined number of precincts that has been determined in advance, which is at least "two precincts" or more, is obtained, and performs entropy coding of coefficient data in increments of that number of precincts. By performing encoding using coefficient data equivalent to a plurality of precincts as above, the entropy coding unit 103 can compress an image with higher efficiency and higher quality than performing encoding in increments of a precinct.

The entropy coding unit 103 outputs the generated encoded data to the outside of the encoding apparatus 100.

Next, a process performed by the wavelet transform unit 101 in FIG. 1 will be more specifically described. First, data input to the wavelet transform unit 101 will be described.

In the wavelet transform unit 101, for example, an integer-type 5×3 filter that performs calculations with integer precision, which will be described later, is used in order to reversibly perform an analysis filtering process. The wavelet transform unit 101 uses the input data up to the least significant bit as an integer part.

Figure 2:
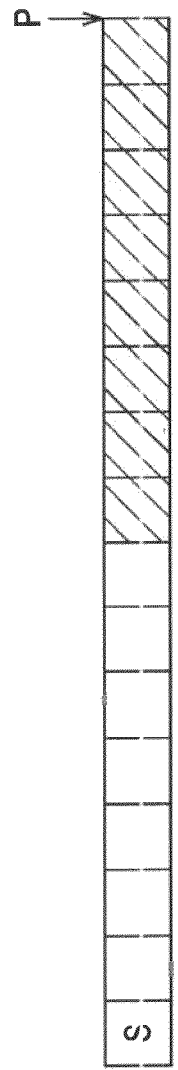
FIG. 2 is a schematic diagram showing an example of input data with integer precision.

FIG. 2 is a schematic diagram showing an example of input data of the wavelet transform unit 101. In FIG. 2, individual squares represent individual bits of the input data. The left end in the drawing represents the most significant bit, and the right end in the drawing represents the least significant bit.

Also, point P shown in FIG. 2 represents the position of a decimal point. In FIG. 2, this point P exists at the right end (least significant side). In addition, a calculation with this integer precision uses one bit at the most significant side (left end in the drawing) as a bit indicating sign (+/−).

Figure 3:
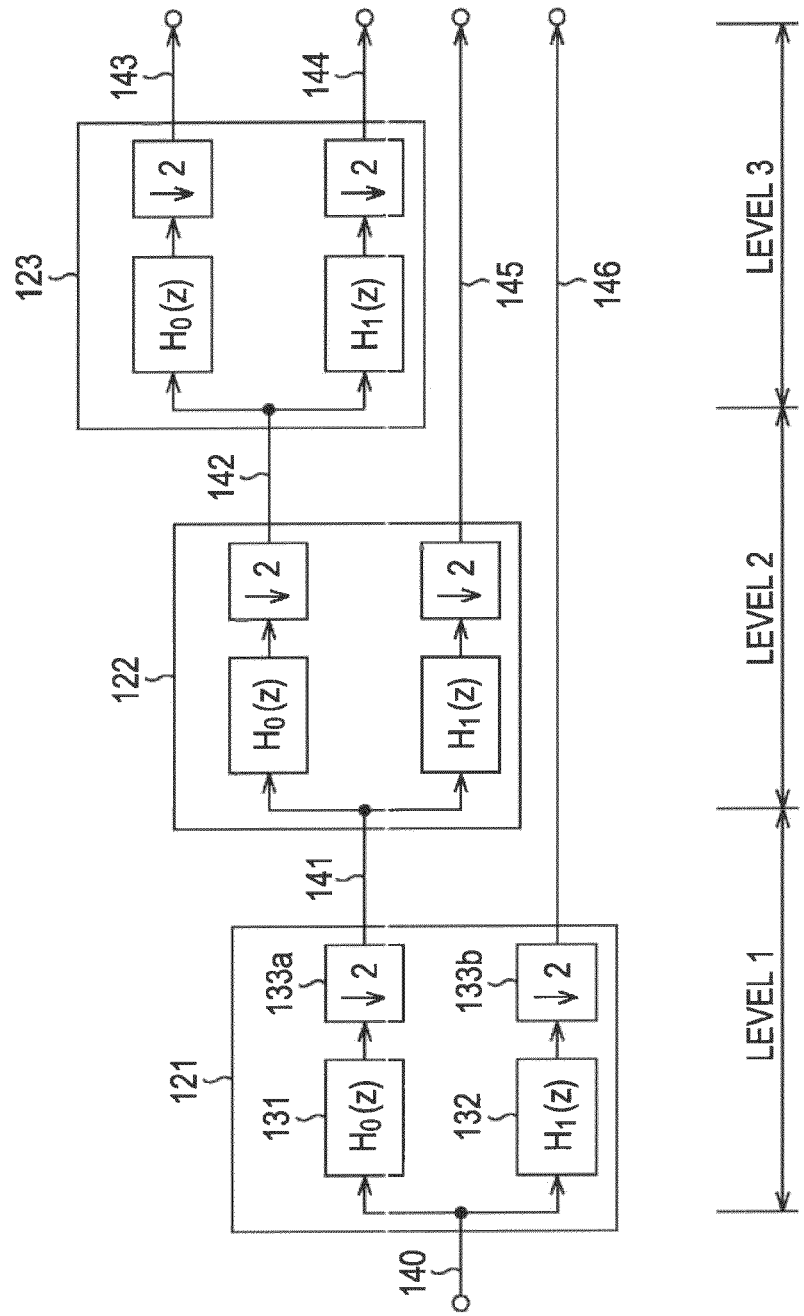
FIG. 3 is a diagram schematically showing an exemplary structure for an arithmetic operation of wavelet transform of image data.

Next, the outline of wavelet transform will be described. FIG. 3 is a diagram schematically showing an exemplary structure for an arithmetic operation of wavelet transform of image data. The example in FIG. 3 illustrates an exemplary structure in which octave splitting, which is the most general wavelet transform among some available techniques, is performed over a plurality of levels. Note that the case in FIG. 3 employs a structure in which the number of levels is three (level 1 through level 3), and splits an image signal into low frequency and high frequency and hierarchically splits only low frequency components. Also in FIG. 3, wavelet transform of a signal in one dimension (e.g., a horizontal component of an image) has been illustrated for convenience. By expanding this to two dimensions (e.g., by additionally applying this to a vertical component of the image), a two-dimensional image signal can be handled.

First, an input image signal 140 for a wavelet transform unit shown in FIG. 3 is band-split using a low-pass filter 131 (transmission function $H_0(z)$) and a high-pass filter 132 (transmission function $H_1(z)$). The resolutions of the obtained low frequency component and high frequency component are individually decimated ½ times using a downsampler 133a and a downsampler 133b, respectively (level 1). Outputs at this time are two, an L component 141 and an H component 146. Here, the above-described L indicates low frequency, and H indicates high frequency. The low-pass filter 131, the high-pass filter 132, the downsampler 133a, and the downsampler 133b in this FIG. 3 constitute a level-1 circuit unit 121.

A low frequency component of signals decimated respectively by the above-described downsampler 133a and downsampler 133b, that is, only a signal from the downsampler 133a, is further band-split by a low-pass filter and a high-pass filter of a level-2 circuit unit 122, and the resolutions thereof are individually decimated ½ times using corresponding downsamplers (level 2). The structure of the circuit unit 122 including the level-2 low-pass filter, high-pass filter, and downsamplers is similar to the circuit unit 121 including the above-described level-1 low-pass filter 131, high-pass filter 132, downsampler 133a, and downsampler 133b.

By performing such a process up to a predetermined level, band components obtained by hierarchically splitting the band of a low frequency component are sequentially generated. Band components generated at level 2 are an LL component 142 and an LH component 145. FIG. 3 shows an example in which band splitting is performed up to level 3. An output of the downsampler on the low-pass filter side of the level-2 circuit 122 is supplied to a level-3 circuit unit 123 with a structure similar to the above-described circuit unit 121. As a result of performing band splitting up to level 3 in this manner, an LLL component 143, an LLH component 144, the LH component 145, and the H component 146 are generated.

Figure 4:
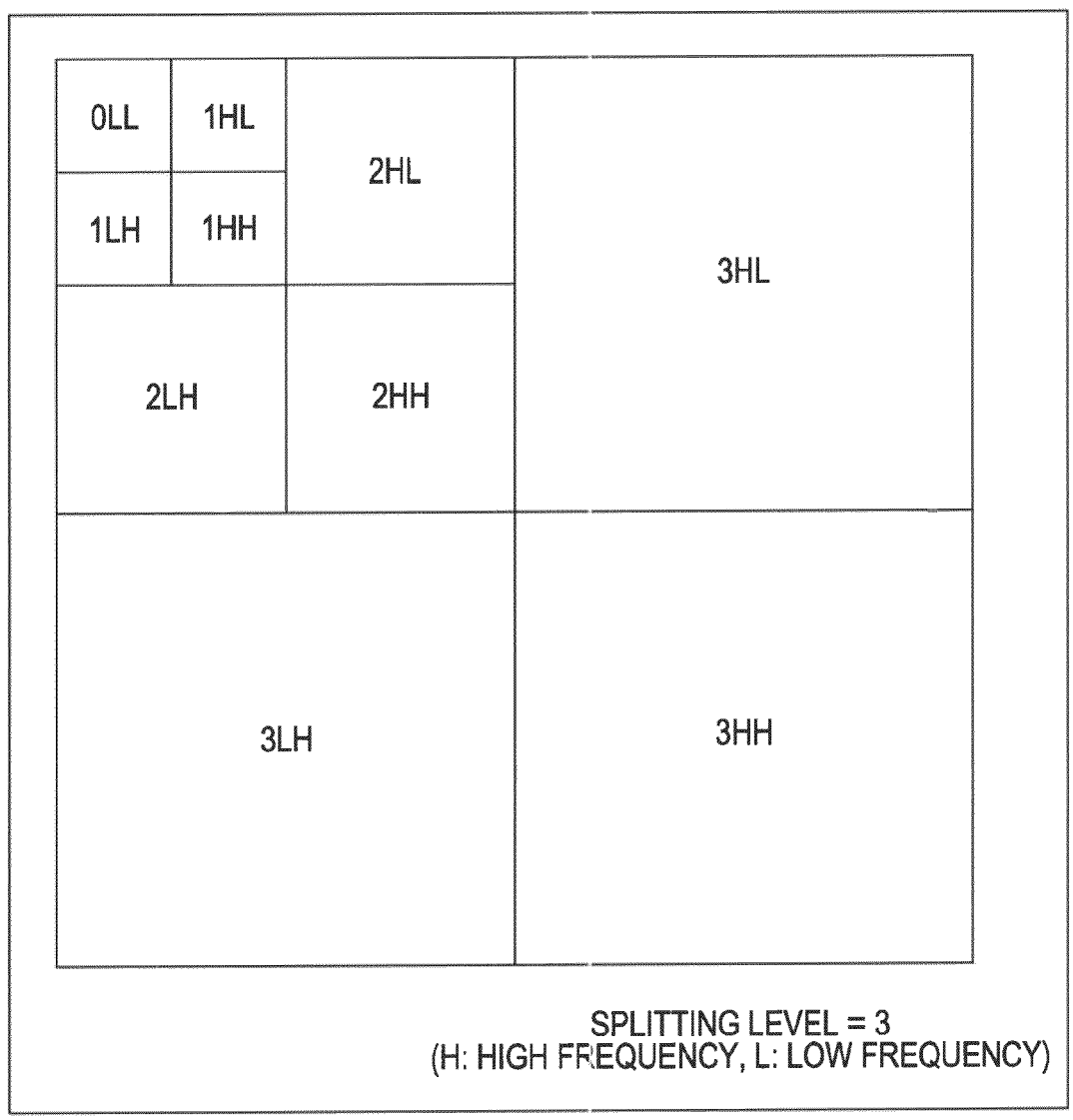
FIG. 4 is an outline diagram for describing the outline of wavelet transform.

With the foregoing wavelet transform, as the outline thereof is shown in FIG. 4, a process of splitting image data into a high spatial frequency band and a low spatial frequency band is recursively repeated on data in the low spatial frequency band obtained as a result of splitting. By driving data in a low spatial frequency band into a smaller region using the analysis filter processing unit 111 in such a manner, the encoding apparatus 100 enables the entropy coding unit 103 to perform efficient compression and coding.

Note that FIG. 4 corresponds to an example in the case where a process of splitting the lowest frequency component region of image data into a region L of low frequency components and a region H of high frequency components is repeated three times, and a splitting level indicating the total number of split layers is 3. In FIG. 4, "L" and "H" represent low frequency components and high frequency components, respectively. The order of "L" and "H" indicates that the former indicates the band obtained as a result of the splitting in a horizontal direction (horizontal direction) and the latter indicates the band obtained as a result of the splitting in a vertical direction (vertical direction). Also, a numeral before "L" and "H" indicates the layer of that region. The layer of lower frequency components is represented by a smaller numeral. The maximum value of this layer indicates the splitting level (splitting number) at that time of wavelet transform.

That is, in FIG. 4, "0LL", "1HL", "1LH", and "1HH" are sub-bands obtained by performing the level-3 analysis filtering process in FIG. 3 (by splitting 2LL). In FIG. 4, "2HL", "2LH", and "2HH" are sub-bands obtained by performing the level-2 analysis filtering process in FIG. 3 (by splitting 1LL). In FIG. 4, "3HL", "3LH", and "3HH" are sub-bands obtained by performing the level-1 analysis filtering process in FIG. 3 (by splitting baseband image data).

That is, in the example in FIG. 4, "3HH" is a sub-band including the smallest number of low frequency components (including the largest number of high frequency components), and "0LL" is a sub-band including the largest number of low frequency components.

The transform and splitting are repeatedly performed on low frequency components since the energy of the image is concentrated in the low frequency components. This can be understood from the fact that, as the splitting level progresses from a state of the splitting level=1, an example of which is shown in A of FIG. 5, to a state of the splitting level=3, an example of which is shown in B of FIG. 5, sub-bands are formed, as shown in B of FIG. 5. In the case of the example in FIG. 4, the splitting level of wavelet transform is 3, and, as a result, ten sub-bands are formed.

The wavelet transform unit 51 usually uses a filter bank constituted of a low frequency filter and a high frequency filter to perform a process such as that described above. Note that a digital filter usually has the impulse response of multiple tap lengths, i.e., filter coefficients, and accordingly it is necessary to buffer in advance as many items of input image data or coefficient data as are needed to perform a filtering process. Also, as in the case where wavelet transform is performed in multiple stages, it is necessary to buffer as many wavelet transform coefficients generated at the previous stages as are needed to perform a filtering process.

Figure 6:
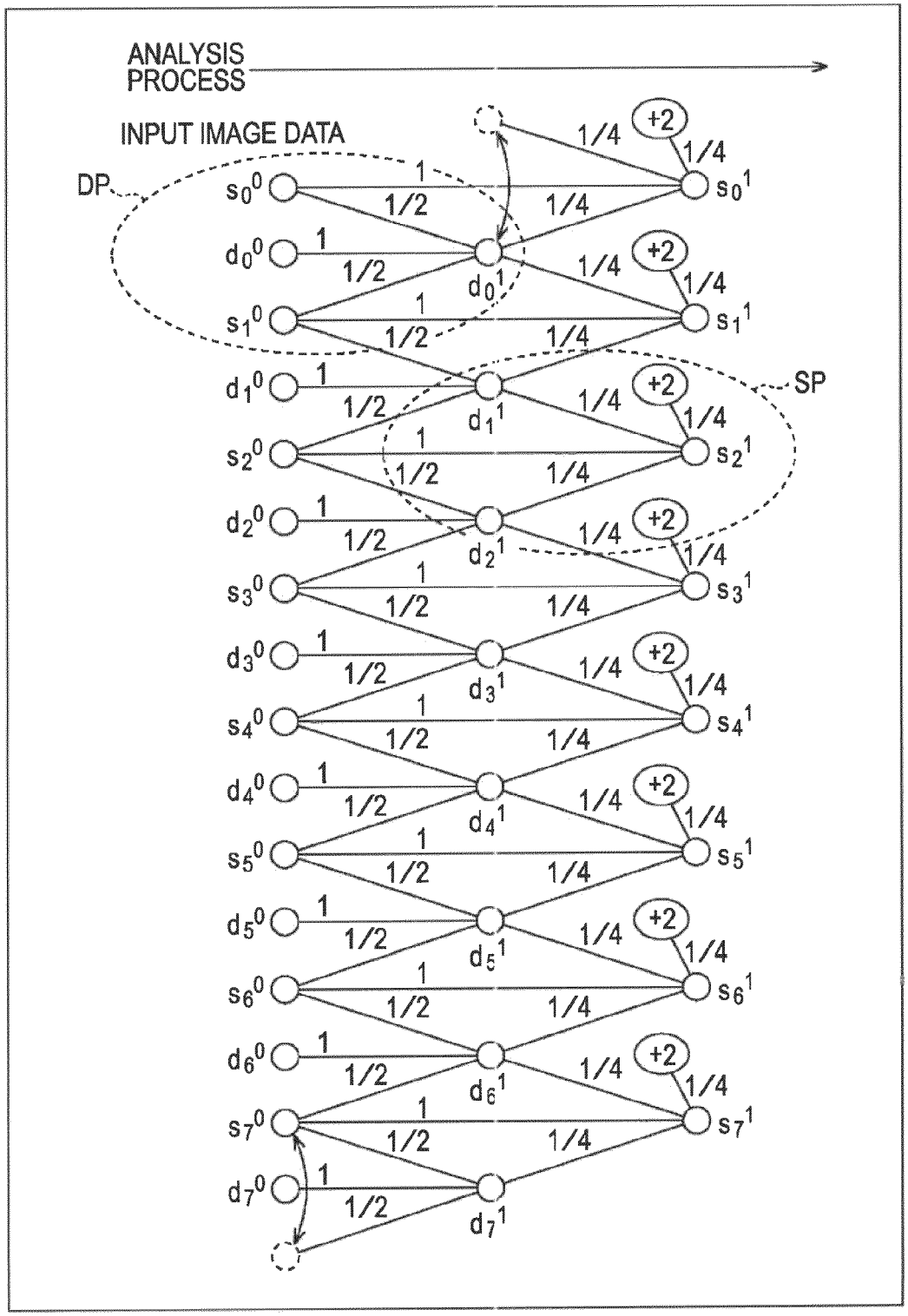
FIG. 6 is a diagram for describing an arithmetic operation of an integer-type 5×3 analysis filter.

A reversible integer-type wavelet transform arithmetic operation using an integer-precision-type 5×3 analysis filter defined in FCD (Final Committee Draft) of JPEG-2000 Part-1 will be described. FIG. 6 is a diagram for describing an arithmetic operation of an integer-precision-type 5×3 analysis filter (hereinafter may also be referred to as an integer-type 5×3 analysis filter) and shows an operation of converting input image data at the left end in the drawing into low frequency components s and high frequency components d by performing a one-dimensional analysis filtering process once. Here, it is assumed that $d_m^n$ is the m-th high-frequency-component coefficient with a wavelet transform level of n. Similarly, it is assumed that $s_m^n$ is the m-th low-frequency-component coefficient with a wavelet transform level of n. Note that, in the case of n=0, as shown in FIG. 6, it is the input image itself.

As shown in this FIG. 6, an equation for calculating a low-frequency-component coefficient s can be generally represented as the following equation (1).

$$s_{m+1}^{n+1}=s_{m+1}^n+((d_m^{n+1}+d_{m+1}^{n+1}+2)/4) \quad (1)$$

Here, the ¼ arithmetic operation in the equation can be realized by shifting bit(s). When shifting two bits to the right is represented as ">>2", the above-described equation (1) can be represented as the following equation (1').

$$s_{m+1}^{n+1}=s_{m+1}^n+((d_m^{n+1}+d_{m+1}^{n+1}+2)>>2) \quad (1')$$

Note that +2 in the parentheses in the above-described equation (1) is for performing compensation for a rounding error that occurs at the time of shifting to the right.

Also, an equation for calculating a high-frequency-component coefficient d can be generally represented as the following equation (2).

$$d_m^{n+1}=d_m^n-((s_m^n+s_{m+1}^n)/2) \quad (2)$$

Alternatively, by representing shifting one bit to the right as ">>1", this can be represented as the following equation (2').

$$d_m^{n+1}=d_m^n-((s_m^n+s_{m+1}^n)>>1) \quad (2')$$

Here, in the example in FIG. 6, first-stage wavelet transform coefficients for input image data, that is, low-frequency-component coefficients and high-frequency-component coefficients when level n=1, are calculated, and s and d of the input image data in this case do not represent low-frequency-component coefficients and high-frequency-component coefficients. Also, at positions corresponding to ends of the screen, data corresponding to the outside of the screen is used by folding the data outside the screen. For example, in order to obtain data $s_0^1$ in FIG. 6, $s_0^0$, $d_0^1$, and further, the same $d_0^1$ which serves as folding of $d_0^1$, are used. This also applies to the case where two $s_7^0$ are used in order to obtain $d_7^1$.

A portion SP surrounded by broken lines in FIG. 6 is a portion where a low-frequency-component coefficient $s_2^1$ corresponding to n=0 and m=1 in the above-described equation (1) is obtained, and a calculation such as the following equation (3) is performed.

$$s_2^1=s_2^0+((d_1^1+d_2^1+2)/4) \quad (3)$$

In addition, a portion DP surrounded by broken lines in FIG. 6 is a portion where a high-frequency-component coefficient $d_0^1$ corresponding to n=0 and m=0 in the above-described equation (2) is obtained, and a calculation such as the following equation (4) is performed.

$$d_0^1=d_0^0-((s_0^0+s_1^0)/2) \quad (4)$$

Here, the ¼ multiplication can be realized by shifting two bits to the right ">>2", and the ½ multiplication can be realized by shifting one bit to the right ">>1", as has been described above.

The amount of arithmetic operation required for calculating the above-described equation (1) and equation (2) includes, assuming that multiplication is realized by shifting calculation as above, multiplication "0", addition/subtraction "5", and shifting calculation "2". By performing this operation similarly from top to bottom, all coefficients can be calculated. Note that, as has been described above, for a two-dimensional signal such as an image, it is only necessary to apply wavelet transform similar to the above to a group of coefficients generated by wavelet transform in a one-dimensional direction (e.g., vertical direction) in another direction (e.g., horizontal direction).

Figure 7:
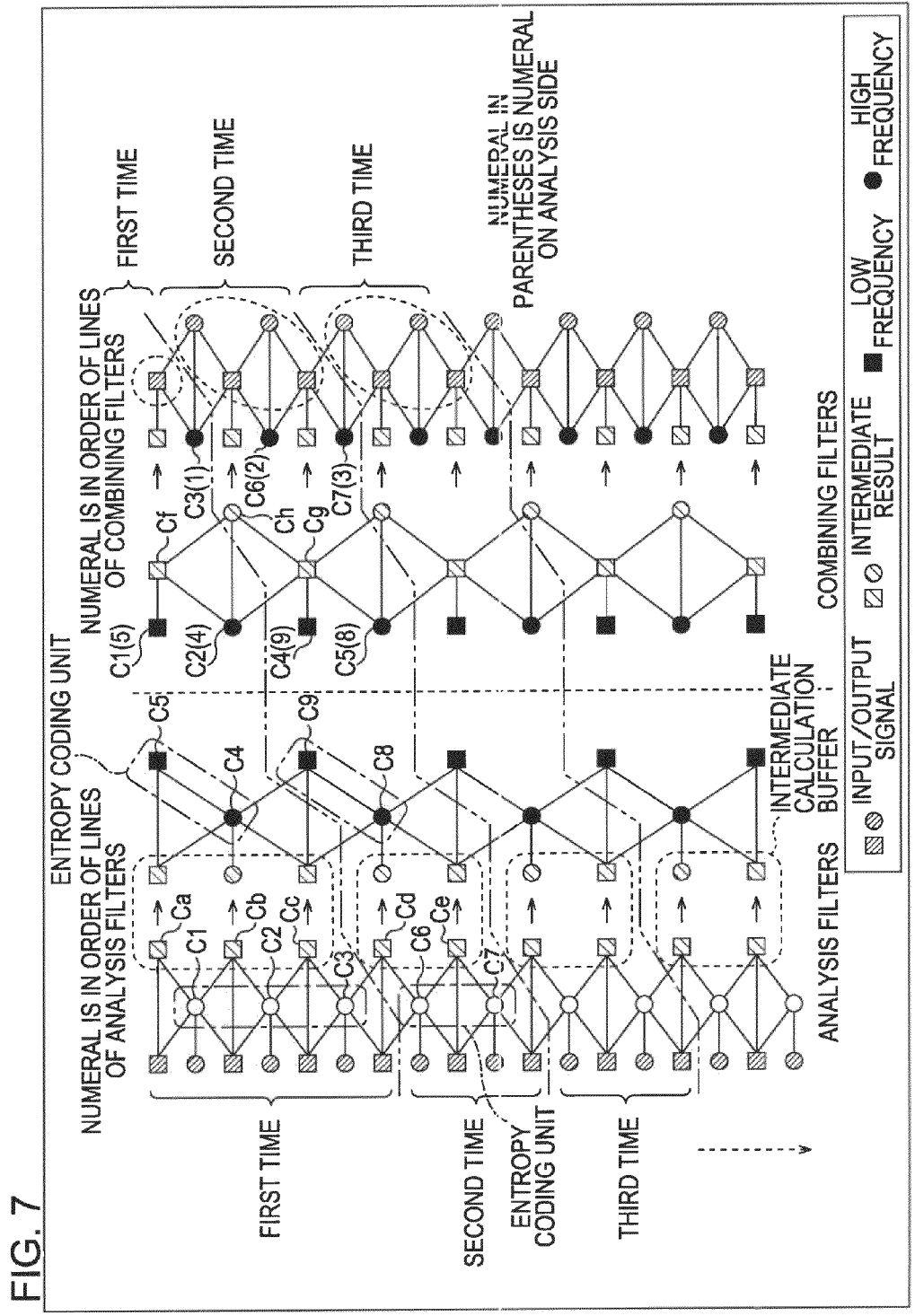
FIG. 7 is an outline diagram showing an example of the manner of lifting using a 5×3 filter.

Note that, actually, calculations involved in the above-described filtering process can be reduced by using the lifting technique. This lifting will be described. FIG. 7 shows an example in which a one-dimensional filtering process based on the lifting using the integer-type 5×3 filter (analysis filters and combining filters) is executed up to the decomposition level=2. Note that, in FIG. 7, a portion indicated as analysis filters on the left side of the drawing includes the filters of the wavelet transform unit 101. Also, a portion indicated as combining filters on the right side of the drawing includes filters of an inverse wavelet transform unit described later.

In FIG. 7, the left-end column indicates successive items of pixel data on one line (or one column) of original image data which is baseband image data (i.e., image data input to the encoding apparatus 100). The first column through the third column from the left end in FIG. 7 show a filtering process at the splitting level=1, and the fourth column through the sixth column show a filtering process at the splitting level=2.

In the analysis filtering process at the decomposition level=1, as an analysis filtering process at a first stage, coefficient data of high frequency components is calculated on the basis of the original image data; and, as an analysis filtering process at a second stage, coefficient data of low frequency components is calculated on the basis of the coefficient data of high frequency components, which has been calculated in the analysis filtering process at the first stage, and the original image data. The second column from the left end in FIG. 7 indicates a high frequency component output, and the third column from the left end indicates a low frequency component output.

The calculated coefficient data of high frequency components is supplied to the entropy coding unit 103 in FIG. 1. Also, the calculated coefficient data of low frequency components is stored in the intermediate calculation buffer unit 102 in FIG. 1. In FIG. 7, the entropy coding unit 103 is shown as portions surrounded by dotted-chain lines, and the intermediate calculation buffer unit 102 is shown as portions surrounded by dotted lines.

An analysis filtering process at the decomposition level=2 is performed on the basis of the result of the analysis filtering process at the decomposition level=1, which is held in the intermediate calculation buffer unit 102. In the filtering process at the decomposition level=2, the coefficient data calculated as coefficients of low frequency components in the filtering process at the decomposition level=1 is regarded as coefficient data including low frequency components and high frequency components, and a filtering process similar to that at the decomposition level=1 is performed. Coefficient data of high frequency components and coefficient data of low frequency components calculated in the filtering process at the decomposition level=2 are supplied to the entropy coding unit 103 in FIG. 1.

The wavelet transform unit 101 in FIG. 1 performs a filtering process such as that described above individually in the horizontal direction and in the vertical direction of the screen. For example, firstly, the wavelet transform unit 101 performs a filtering process at the decomposition level=1 in the horizontal direction, and stores generated coefficient data of high frequency components and low frequency components in the intermediate calculation buffer unit 102. Next, the wavelet transform unit 101 performs a filtering process at the decomposition level=1 in the vertical direction on the coefficient data stored in the intermediate calculation buffer unit 102. With the processes at the decomposition level=1 in the horizontal and vertical directions, four sub-bands, a sub-band HH and a sub-band HL based on corresponding items of coefficient data obtained by further decomposing the high frequency components into high frequency components and low frequency components, and a sub-band LH and a sub-band LL based on corresponding items of coefficient data obtained by further decomposing the low frequency components into high frequency components and low frequency components, are formed.

Subsequently, at the decomposition level=2, an analysis filtering process is performed individually in the horizontal direction and the vertical direction on the coefficient data of low frequency components generated at the decomposition level=1. That is, with the analysis filtering process at the decomposition level=2, the sub-band LL split and formed at the decomposition level=1 is further split into four sub-bands, and the sub-band HH, the sub-band HL, the sub-band LH, and the sub-band LL are formed.

The wavelet transform unit 101 is configured to perform a reversible analysis filtering process based on the above-described wavelet transform multiple times in a stepwise manner by splitting the reversible analysis filtering process into processing of each of groups of several lines in the vertical direction of the screen. In the example in FIG. 7, a first process which is a process starting with the first line on the screen performs a filtering process on seven lines. A second process which is a process starting with the eighth line and thereafter performs a filtering process in increments of four lines. This number of lines at each time is based on the number of lines needed to generate the lowest frequency components equivalent to one line by performing the above-described analysis filtering process.

Note that, hereinafter, a group of lines, which includes other sub-bands, needed to generate the lowest frequency components equivalent to one line (coefficient data equivalent to one line of sub-bands of lowest frequency components) will be referred to as a precinct (or line block). The line stated here indicates pixel data or coefficient data equivalent to one line formed in a picture (frame or field) corresponding to image data before wavelet transform, or in each sub-band. That is, the precinct (line block) indicates, in the original image data before the wavelet transform, a pixel data group equivalent to the number of lines needed to generate coefficient data equivalent to one line of sub-bands of lowest frequency components after the wavelet transform, or a coefficient data group of each sub-band obtained by performing wavelet transform of this pixel data group.

According to FIG. 7, a coefficient C5 obtained as a result of performing a filtering process at the decomposition level=2 is calculated on the basis of a coefficient C4 and a coefficient Ca that is stored in the intermediate calculation buffer unit 102, and the coefficient C4 is calculated on the basis of the coefficient Ca, a coefficient Cb, and a coefficient Cc which are stored in the intermediate calculation buffer unit 102. Further, the coefficient Cc is calculated on the basis of a coefficient C2 and a coefficient C3 which are supplied to the entropy coding unit 103, and pixel data of the fifth line. Also, the coefficient C3 is calculated on the basis of pixel data of the fifth line through the seventh line. Accordingly, in order to obtain the coefficient C5 of low frequency components at the splitting level=2, pixel data of the first line through the seventh line is needed.

In contrast, in the second filtering process and thereafter, the coefficient data already calculated in the filtering process(es) so far and supplied to the entropy coding unit 103 (actually, data same as the supplied coefficient data is held in the wavelet transform unit 101 (or the intermediate calculation buffer unit 102)) can be used, and hence the number of lines needed can be kept small.

That is, according to FIG. 7, among coefficients of low frequency components obtained as a result of a filtering process at the decomposition level=2, a coefficient C9 which is the next coefficient of the coefficient C5 is calculated on the basis of the coefficient C4, a coefficient C8, and the coefficient Cc which is stored in the intermediate calculation buffer unit 102. The coefficient C4 has already been calculated with the above-described first filtering process and supplied to the entropy coding unit 103 (actually, data same as the supplied coefficient data is held in the wavelet transform unit 101 (or the intermediate calculation buffer unit 102)). Similarly, the coefficient Cc has already been calculated with the above-described first filtering process and stored in the intermediate calculation buffer unit 102. Accordingly, in this second filtering process, only a filtering process for calculating the coefficient C8 is newly performed. This new filtering process is performed by further using the eighth line through the eleventh line.

Since the second filtering process and thereafter can use the data calculated with the filtering process(es) so far and supplied to the intermediate calculation buffer unit 102 and the entropy coding unit 103 (actually, data held in the wavelet transform unit 101 (or the intermediate calculation buffer unit 102)), all that is needed is each process in increments of four lines.

Note that, when the number of lines on the screen does not match the number of lines for encoding, the lines of the original image data are copied with a predetermined method so that the number of lines becomes identical to the number of lines for encoding, and then a filtering process is performed.

Accordingly, since the wavelet transform unit 101 performs a filtering process for obtaining as many as items of coefficient data equivalent to one line of the lowest frequency components is performed multiple times in a stepwise manner on the lines of the whole screen (in increments of a precinct (line block)), this makes it possible to obtain a decoded image with low delay when encoded data is transmitted.

As has been already described, in wavelet transform, coefficients are generated from a high frequency component side to a low frequency component side. In the example in FIG. 7, at the first time, a coefficient C1, the coefficient C2, and the coefficient C3 of high frequency components are sequentially generated in a filtering process at the decomposition level 1 on the basis of pixel data of an original image. Subsequently, a filtering process at the decomposition level=2 is performed on coefficient data of low frequency components, which is obtained in the filtering process at the decomposition level=1, and accordingly the coefficient C4 and the coefficient C5 of low frequency components are sequentially generated. That is, at the first time, coefficient data is generated in order of the coefficient C1, the coefficient C2, the coefficient C3, the coefficient C4, and the coefficient C5. The generating order of coefficient data always becomes this order (order from high frequency to low frequency) because of the principle of wavelet transform.

In contrast, a decoding process is performed starting with low frequency components. Description will be made more specifically using the example in FIG. 7. The right side of FIG. 7 indicates an example of a combining filtering process of performing inverse wavelet transform which is inverse transform of the above-described wavelet transform (analysis filtering process). A first combining filtering process including the first line of output image data (inverse wavelet transform process) on the decoding side is performed using the coefficient C4 and coefficient C5 of the lowest frequency components, which are generated in the first filtering process on the encoding side, and the coefficient C1.

That is, in the first combining process, with a process at a combining level=2 which is a combining process corresponding to the decomposition level=2, a combining filtering process is performed on the coefficient C5 and the coefficient C4 to generate a coefficient Cf, and the coefficient Cf is stored in the buffer. Subsequently, with a process at a combining level=1 which is a combining process corresponding to the decomposition level=1, a combining filtering process is performed on this coefficient Cf and the coefficient C1 to generate the first line of the baseband image data.

Accordingly, the first combining filtering process processes the coefficient data, which has been generated in order of the coefficient C1, the coefficient C2, the coefficient C3, the coefficient C4, and the coefficient C5 with the analysis filtering process on the encoding side, in order of the coefficient C5, the coefficient C4, the coefficient C1, . . . .

Note that, on the combining filter side shown on the right side in FIG. 7, for a coefficient supplied from the encoding side, the line order of the analysis filter side is indicated in parentheses, and the line order of the combining filter side is indicated outside the parentheses. For example, a coefficient C1(5) indicates that this is the fifth line on the analysis filter side on the left side in FIG. 7, and is the first line on the combining filter side.

A combining filtering process of the coefficient data generated in the second analysis filtering process and thereafter can be performed using, besides the coefficient data supplied from the analysis filter side, coefficient data or image data combined at the time of the previous combining filtering process. In the example in FIG. 7, a second combining filtering process is performed using, as coefficient data supplied from the analysis filter side, besides the coefficient C8 and the coefficient C9 of low frequency components, which are generated in the second analysis filtering process, the coefficient C2 and the coefficient C3 generated in the first analysis filtering process. With the second combining filtering process, the second line through the fifth line of the baseband image data are decoded.

That is, in the second combining process, the coefficient data is processed in order of the coefficient C9, the coefficient C8, the coefficient C2, and the coefficient C3. That is, the combining filtering process at the combining level=2 generates a coefficient Cg using the coefficient C8, the coefficient C9, and the coefficient C4 which is supplied from the encoding side at the time of the first combining filtering process, and stores the coefficient Cg in the buffer. Also, the combining filtering process at the combining level=2 generates a coefficient Ch using this coefficient Cg, the above-described coefficient C4, and the coefficient Cf generated in the first combining filtering process and stored in the buffer, and stores the coefficient Ch in the buffer.

Subsequently, a combining filtering process at the combining level=1 decodes the second line through the fifth line of the baseband image data using the coefficient Cg and the coefficient Ch generated in the combining filtering process at the combining level=2 and stored in the buffer, and the coefficient C2 (shown as a coefficient C6(2) at the combining filter side) and the coefficient C3 (shown as a coefficient C7(3) at the combining filter side) supplied from the analysis filter side.

Accordingly, in the second combining filtering process, the coefficient data generated in order of the coefficient C2, the coefficient C3, (the coefficient C4, the coefficient C5), the coefficient C6, the coefficient C7, the coefficient C8, and the coefficient C9 on the analysis filter side is processed in order of the coefficient C9, the coefficient C8, the coefficient C2, the coefficient C3 . . . .

In a third combining filtering process and thereafter as well, similarly, the coefficient data generated by the analysis filtering process is reordered in a predetermined order and processed, thereby decoding lines of the baseband image data in increments of four lines.

Note that, in a combining filtering process including the lower end line of the screen, which corresponds to an analysis filtering process (hereinafter referred to as the last time), the entire coefficient data generated in the processes so far and stored in the buffer is output, and hence, the number of output lines increases. In the example in FIG. 7, eight lines are output at the last time.

Figure 8:
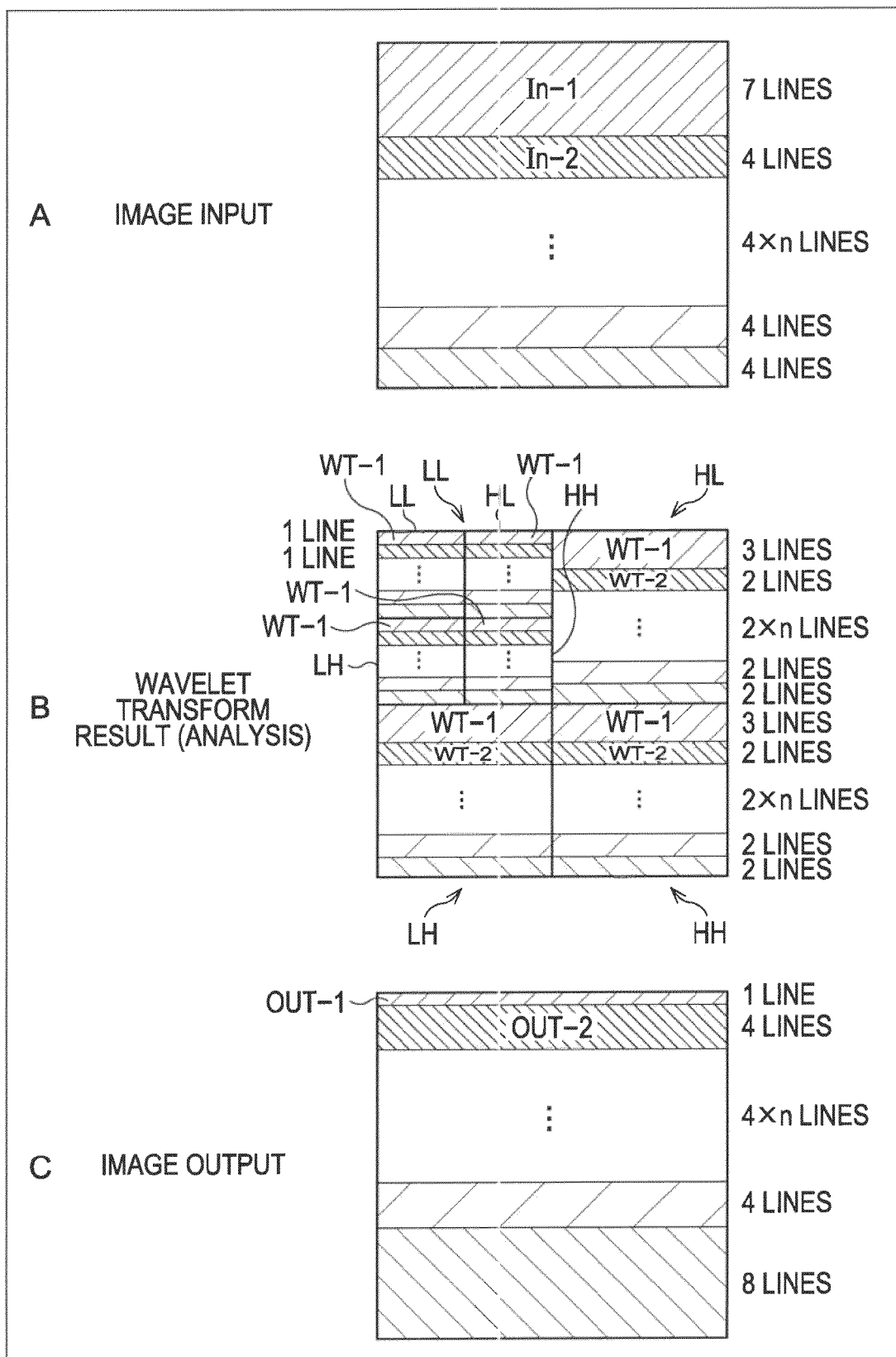
FIG. 8 includes outline diagrams showing the outline of flow of wavelet transform and inverse wavelet transform.

The processes up to those described above will be described more specifically using FIG. 8. FIG. 8 corresponds to an example in the case where a filtering process based on wavelet transform is applied up to the decomposition level=2 using an integer-type 5×3 analysis filter. In the wavelet transform unit 101, as shown in an example in A of FIG. 8, a first analysis filtering process is performed individually in the horizontal and vertical directions on the first line through the seventh line of input image data (In-1 in A of FIG. 8).

With processes in the horizontal and vertical directions at the decomposition level=1 in the first analysis filtering process, in at least one of the processes, items of coefficient data regarded as corresponding to the above-described coefficient C1, coefficient C2, and coefficient C3 are generated, as shown in an example in B of FIG. 8, in increments of three lines for each of the sub-band HH, the sub-band HL, and the sub-band LH which are formed at the decomposition level=1 (WT-1 in B of FIG. 8).

Also, the sub-band LL which is formed of coefficient data regarded as low frequency components in both the processes in the horizontal and vertical directions at the decomposition level=1 in the first analysis filtering process is further split into four sub-bands with a splitting filtering process in the horizontal and vertical directions at the decomposition level=2. With processes in the horizontal and vertical directions at the decomposition level=2 in the first analysis filtering process, coefficient data regarded as corresponding to the coefficient C5 in both the processes is generated for one line of a sub-band LL in the sub-band LL. Also, with the processes in the horizontal and vertical directions at the decomposition level=2 in the first analysis filtering process, coefficient data regarded as corresponding to the coefficient C4 in at least one of the processes is generated for one line of each of a sub-band HH, a sub-band HL, and a sub-band LH in the sub-band LL.

In a second filtering process and thereafter using the wavelet transform unit 101, a filtering process is performed in increments of four lines (In-2 . . . in A of FIG. 8). For each sub-band, coefficient data of every two lines is generated at the decomposition level=1 (WT-2 in B of FIG. 8), and coefficient data of every line is generated at the decomposition level=2.

As in B of FIG. 8, when wavelet-transformed coefficient data is to be decoded, as shown in an example in C of FIG. 8, the first line is output by performing the first combining filtering process (Out-1 in C of FIG. 8), which corresponds to the first analysis filtering process based on the first line through the seventh line. Thereafter, four lines of image data are output at a time by performing combining filtering processes (Out-2 . . . in C of FIG. 8), which correspond to the second through one before the last analysis filtering processes. Subsequently, image data equivalent to eight lines is output by performing a combining filtering process which corresponds to the last analysis filtering process.

Items of coefficient data generated from the high frequency component side to the low frequency component side at the wavelet transform unit 101 are sequentially supplied to the entropy coding unit 103.

The entropy coding unit 103 sequentially encodes the supplied coefficient data using a reversible method and outputs the generated encoded data to the outside of the encoding apparatus 100.

Figure 9:
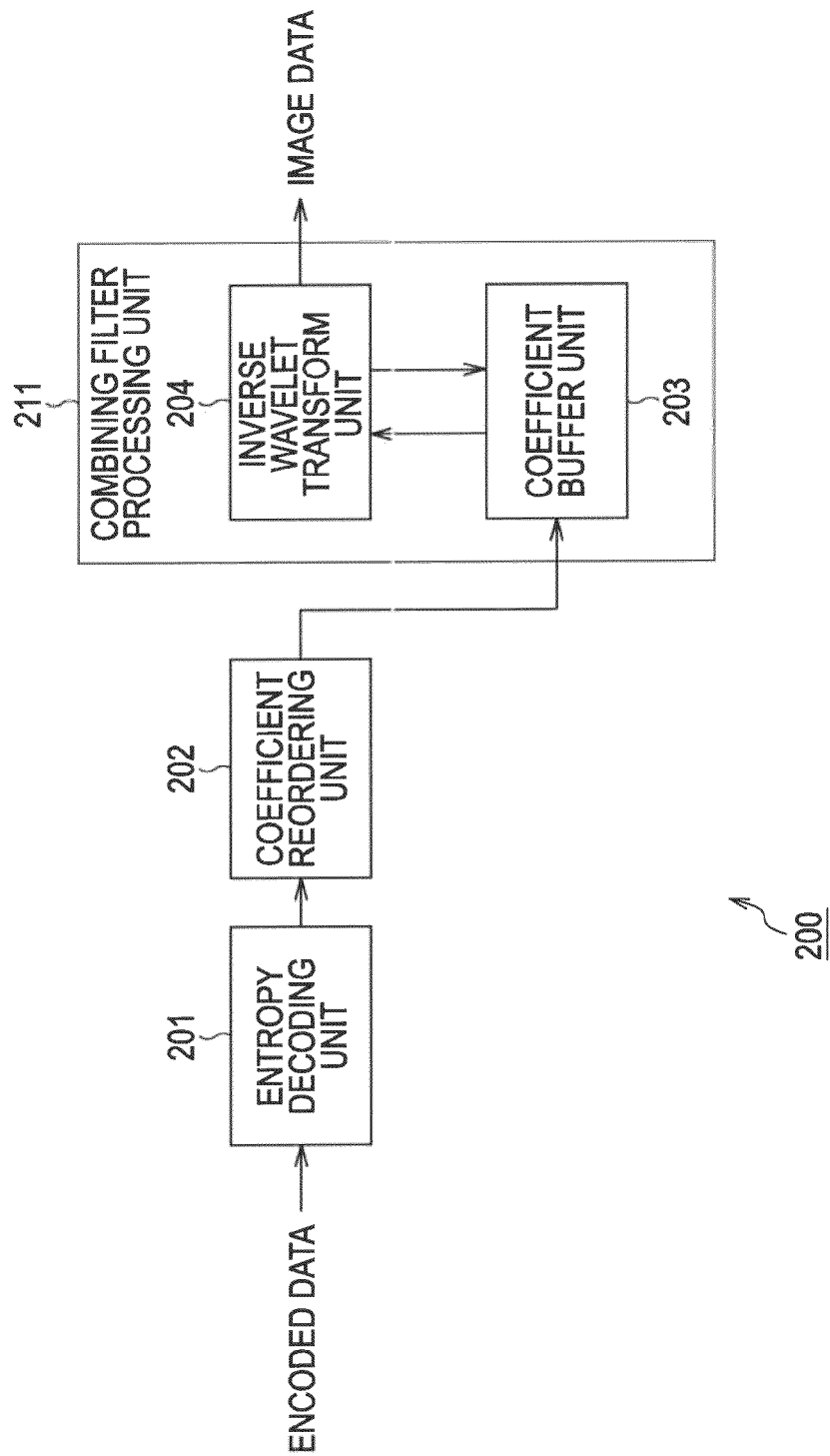
FIG. 9 is a block diagram showing an exemplary structure of a decoding apparatus.

FIG. 9 is a block diagram showing an exemplary structure of a decoding apparatus corresponding to the encoding apparatus 100 in FIG. 1. A decoding apparatus 200 shown in FIG. 9 decodes, with a method corresponding to the encoding apparatus 100 in FIG. 1, encoded data obtained by encoding image data using the encoding apparatus 100, and restores the baseband image data before encoding. That is, the decoding apparatus 200 decodes image data using a reversible method that completely ensures forward direction and backward direction transform. Accordingly, the decoding apparatus 200 can decode encoded data obtained by performing encoding using the encoding apparatus 100 so that high-quality image data can be obtained. Also, the decoding apparatus 200 decodes encoded data, which has been obtained by encoding image data in increments of a precinct using the encoding apparatus 100, in increments of the precinct. Accordingly, the decoding apparatus 200 can reduce delay time until image data is encoded and decoded.

The decoding apparatus 200 includes an entropy decoding unit 201, a coefficient reordering unit 202, a coefficient buffer unit 203, and an inverse wavelet transform unit 204.

The entropy decoding unit 201 decodes the supplied encoded data using a reversible decoding method corresponding to the encoding method performed by the entropy coding unit 103 (FIG. 1) to obtain coefficient data. The coefficient data is supplied to the coefficient reordering unit 202. The coefficient reordering unit 202 reorders the supplied coefficient data, that is, items of coefficient data supplied in order from high frequency components to low frequency components, in order from low frequency components to high frequency components. The coefficient reordering unit 202 stores the reordered coefficient data in the coefficient buffer unit 203. The inverse wavelet transform unit 204 uses the coefficient data stored in the coefficient buffer unit 203 to perform a combining filtering process (inverse wavelet transform) and again stores the result of the combining filtering process in the coefficient buffer unit 203. The inverse wavelet transform unit 204 repeats this process in accordance with the decomposition level and obtains baseband image data. This baseband image data is equivalent to the baseband image data input to the encoding apparatus 100 in FIG. 1.

That is, the decoding apparatus 200 can restore the baseband image data before encoding by decoding the encoded data obtained by encoding the baseband image data using the encoding apparatus 100. When the baseband image data is obtained, the inverse wavelet transform unit 204 outputs this to the outside of the decoding apparatus 200.

The inverse wavelet transform unit 204 includes a horizontal combing filter and a vertical combining filter and performs a reversible filtering process in both a screen horizontal direction and a screen vertical direction on a group of items of coefficient data. The inverse wavelet transform unit 204 reads out the coefficient data of low frequency components and the coefficient data of high frequency components, which are stored in the coefficient buffer unit 203, and applies a combining filtering process to generate coefficient data of low frequency components which are one level lower. The generated coefficient data is stored in the coefficient buffer unit 203. That is, the inverse wavelet transform unit 204 combines the low frequency components and the high frequency components serving as input data and recursively repeats a filtering process of generating low frequency components that are one level lower until the process at level 1 is completed.

When this process is repeated and the combining filtering process at level 1 is completed (when baseband image data is obtained), the inverse wavelet transform unit 204 reads out the baseband image data from the coefficient buffer unit 203 and outputs the read-out baseband image data.

Note that the coefficient buffer unit 203 and the inverse wavelet transform unit 204 are also collectively referred to as a combining filter processing unit 211.

Figure 10:
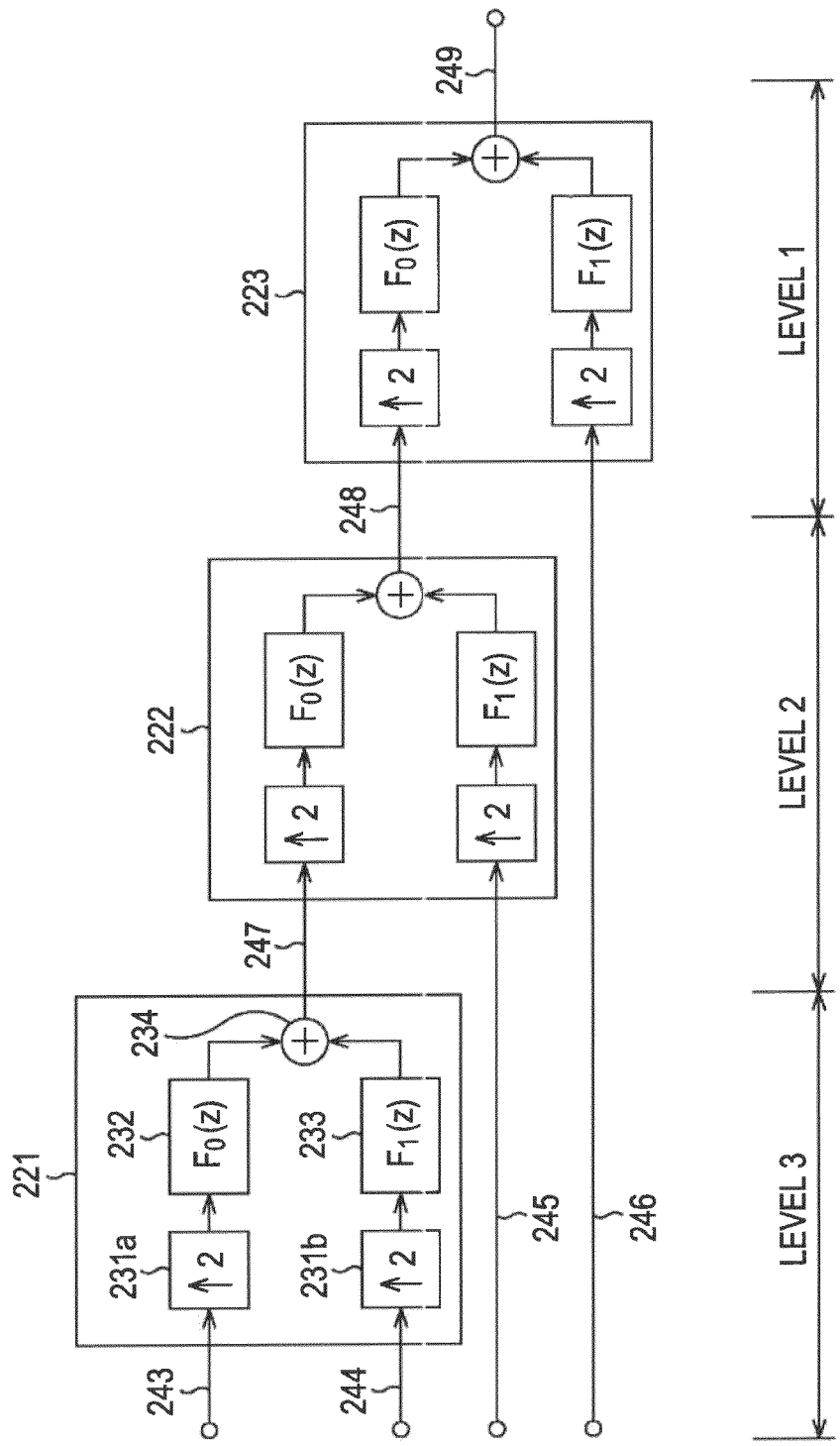
FIG. 10 is a diagram schematically showing an exemplary structure for an arithmetic operation of inverse wavelet transform of encoded data.

Next, a process performed by the wavelet transform unit 101 in FIG. 10 will be more specifically described. First, data input to the wavelet transform unit 101 will be described.

Next, the outline of inverse wavelet transform will be described. FIG. 10 is a diagram schematically showing an exemplary structure for an arithmetic operation of inverse wavelet transform of coefficient data. Among an LLL component 243 corresponding to the LLL component 143, an LLH component 244 corresponding to the LLH component 144, an LH component 245 corresponding to the LH component 145, and an H component 246 corresponding to the H component 146, which are outputs of the wavelet transform process described with reference to FIG. 3, the LLL component 243 and the LLH component 244 are upsampled to double the resolution using an upsampler 231$a$ and an upsampler 231$b$, respectively. A low frequency component upsampled by the upsampler 231$a$ (LLL component 243) is filtered using a low-pass filter 232 and supplied to an adder 234. A high frequency component upsampled by the upsampler 231b (LLH component 244) is filtered using a low-pass filter 233 and supplied to the adder 234.

The adder 234 combines these low frequency component and high frequency component (LLL component 243 and LLH component 244). With a process performed by a circuit unit 211 so far, inverse transform corresponding to the forward direction transform in the level-3 circuit unit 123 in FIG. 3 is completed, and an LL component 247 which is a level-2 low frequency component is obtained.

By repeating this process in each level thereafter up to level 1, a decoded image 249 after the final inverse transform is output. That is, a level-2 circuit unit 222 and a level-1 circuit unit 223 have a structure similar to the above-described level-3 circuit unit 221. In other words, an output of the level-3 circuit unit 221 (LL component 247) is input to a low frequency side of the level-2 circuit unit 222. The circuit unit 222 similarly combines the LL component 247 input to the low frequency side and the LH component 245 input to a high frequency side, as in the case of the circuit unit 221, and outputs an L component 248 which is a level-1 low frequency component. This L component 248 is input to a low frequency side of the level-1 circuit unit 223. The circuit unit 223 similarly combines the L component 248 input to the low frequency side and the H component 246 input to a high frequency side, as in the case of the circuit unit 221, and outputs the baseband image data (decoded image) 249. The foregoing is the basic structure for an inverse wavelet transform process.

Figure 11:
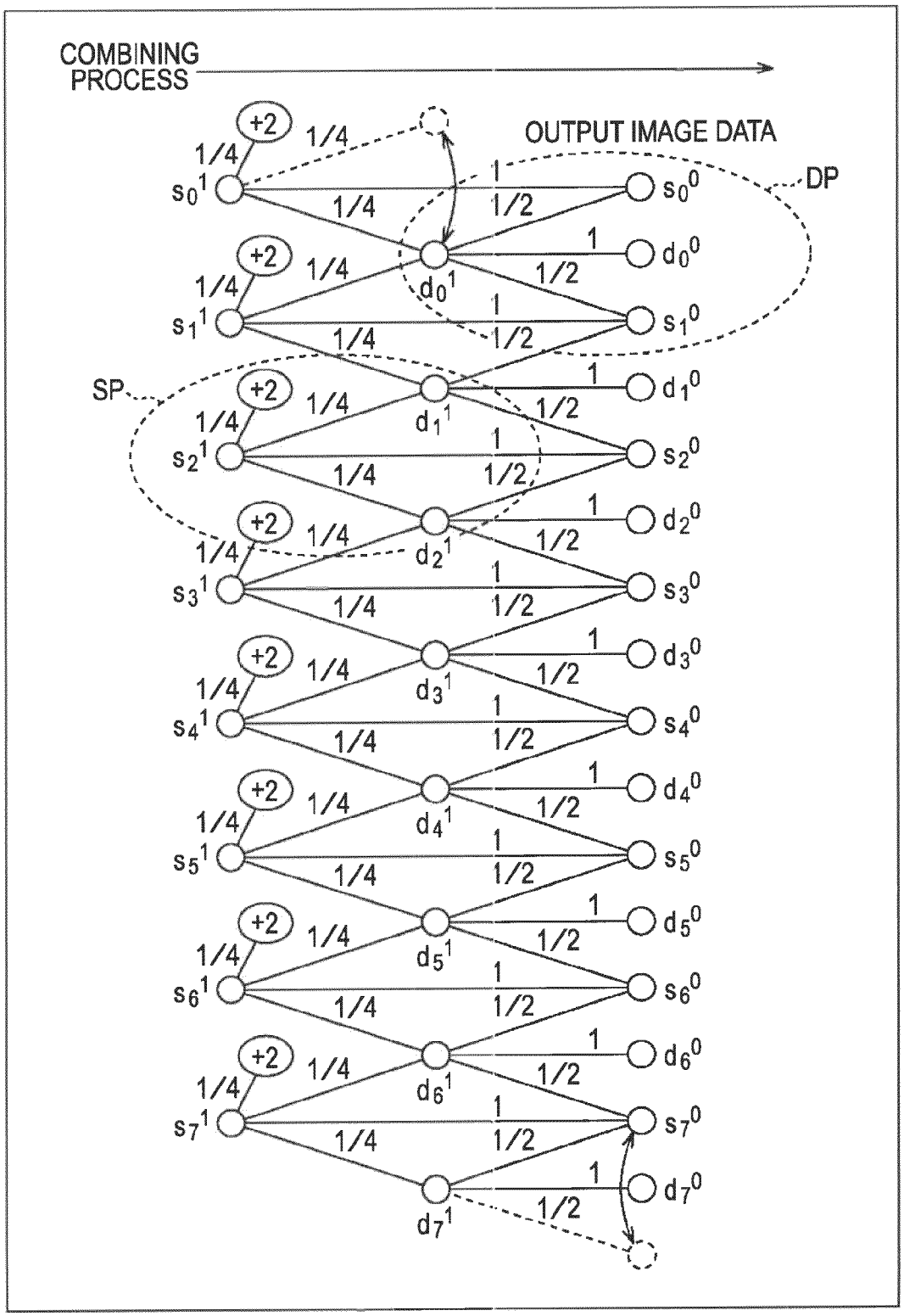
FIG. 11 is a diagram for describing an arithmetic operation of an integer-type 5×3 combining filter.

An arithmetic operation performed by an integer-precision-type 5×3 combining filter defined in FCD of JPEG 2000 Part-1 will be described. FIG. 11 is a diagram for describing an arithmetic operation of an integer-precision-type 5×3 combining filter (hereinafter may also be referred to as an integer-type 5×3 combining filter) and shows the manner of calculating output image data at the right end in the drawing from low frequency components s at the left end in the drawing and high frequency components d in the center by performing a one-dimensional combining filtering process once. In this FIG. 11, it is assumed that $d_m^n$ is the m-th high-frequency-component coefficient with a wavelet transform level of n. Similarly, it is assumed that $s_m^n$ is the m-th low-frequency-component coefficient with a wavelet transform level of n. Here, when n=0, as shown in FIG. 11, it is the output image.

As shown in this FIG. 11, an equation for calculating a low-frequency-component coefficient s that is one level lower is generally represented as the following equation (5).

$$s_{m+1}^n = s_{m+1}^{n+1} - ((d_m^{n+1} + d_{m+1}^{n+1} + 2)/4) \qquad (5)$$

Here, the ¼ multiplication in this equation (5) is realized by shifting bits, and, when shifting two bits to the right is represented as ">>2", equation (5) can be represented as the following equation (5').

$$s_{m+1}^n = s_{m+1}^{n+1} - ((d_m^{n+1} + d_{m+1}^{n+1} + 2) >> 2) \qquad (5')$$

"+2" in the parentheses in equation (5) or equation (5') is for handling a rounding error that occurs at the time of shifting to the right. This is inextricably linked to the above-described analysis filter rounding process. Needless to say, the fact that the rounding processes match each other at the analysis and combining sides is needed in order to keep reversibility.

Similarly, an equation for calculating a high-frequency-component coefficient d can be represented as the following equation (6).

$$d_m^n = d_m^{n+1} + ((s_m^n + s_{m+1}^n)/2) \qquad (6)$$

Here, by representing shifting one bit to the right as ">>1", equation (6) can be represented as the following equation (6').

$$d_m^n = d_m^{n+1} + ((s_m^n + s_{m+1}^n) >> 1) \qquad (6')$$

Here, a portion SP surrounded by broken lines in FIG. 11 is a portion where a low-frequency-component coefficient $s_2^0$ corresponding to n=0 and m=1 in the above-described equation (5) is obtained, and a calculation shown in the following equation (7) is performed.

$$s_2^0 = s_2^1 - ((d_1^1 + d_2^1 + 2)/4) \qquad (7)$$

In addition, a portion DP surrounded by broken lines in FIG. 11 is a portion where a high-frequency-component coefficient $d_0^0$ corresponding to n=0 and m=0 in the above-described equation (6) is obtained, and a calculation shown in the following equation (8) is performed.

$$d_0^0 = d_0^1 + ((s_0^0 + s_1^0)/2) \qquad (8)$$

Here, the ¼ multiplication can be realized by shifting two bits to the right ">>2", and the ½ multiplication can be realized by shifting one bit to the right ">>1", as has been described above.

The amount of arithmetic operation required for calculating the above-described equation (5) and equation (6), particularly equation (5') and (6') using shifting calculation, that is, the amount of arithmetic operation required for generating one pair of an even-numbered coefficient and an odd-numbered coefficient, includes multiplication "0", addition/subtraction "5", and shifting calculation "2". By performing this operation similarly from top to bottom, all coefficients can be calculated. Note that, as has been described above, for a two-dimensional signal such as an image, it is only necessary to apply inverse wavelet transform similar to the above to a group of coefficients generated by inverse wavelet transform (combining filtering process) in a one-dimensional direction (e.g., vertical direction) in another direction (e.g., horizontal direction).

Next, the flow of processes performed by the foregoing encoding apparatus 100 and decoding apparatus 200 will be described. At first, with reference to the flowchart in FIG. 12, an exemplary flow of an encoding process executed by the encoding apparatus 100 will be described.

When an encoding process starts, the wavelet transform unit 101 in the encoding apparatus 100 initializes in step S101 the numeral A of a precinct to be processed. For example, the numeral A is set to "1". When the setting is completed, the wavelet transform unit 101 obtains in step S102 image data equivalent to a number of lines (that is, one precinct) needed to generate an A-th line from the top in the lowest frequency sub-bands after transform.

When image data equivalent to one precinct is obtained, in step S103, the wavelet transform unit 101 performs, for that image data, a reversible vertical analysis filtering process of performing analysis filtering with a reversible method of the image data arranged in the screen vertical direction, and, in step S104, performs a reversible horizontal analysis filtering process of performing an analysis filtering process with a reversible method of the image data arranged in the screen horizontal direction.

In step S105, the wavelet transform unit 101 determines whether or not the reversible vertical analysis filtering process and the reversible horizontal analysis filtering process have been performed up to the final level. When it is determined that the decomposition level has not reached a predetermined final level, the process returns to step S103, and the analysis filtering processes in step S103 and step S104 are repeated for the current decomposition level.

When it is determined in step S105 that the analysis filtering processes have been performed up to the final level, the process proceeds to step S106.

In step S106, the entropy coding unit 103 determines whether or not a predetermined number of precincts have been processed by the wavelet transform unit 101. When it is determined that the predetermined number of precincts have been processed, the process proceeds to step S107, and entropy coding of the accumulated coefficient data is performed. When encoding is completed, the entropy coding unit 103 outputs the obtained encoded data and advances the process to step S108. Alternatively, when it is determined in step S106 that the predetermined number of precincts have not been processed, the processing in step S107 is omitted, and the process proceeds to step S108.

In step S108, the wavelet transform unit 101 increments the value of the precinct numeral A by "1". In step S109, the wavelet transform unit 101 determines whether or not an unprocessed line exists. When it is determined that an unprocessed line exists, the process returns to step S102, and the process thereafter is repeated. Alternatively, when it is determined in step S109 that no unprocessed line exists, the wavelet transform unit 101 terminates the encoding process.

The encoding apparatus 100 repeats the encoding process such as that described above in increments of a picture (frame or field).

Since the wavelet transform unit 101 successively performs the reversible vertical analysis filtering process and the reversible horizontal analysis filtering process in this manner in increments of a precinct up to the final level, compared with a conventional method, the amount of data needed to be held (buffered) at a time (simultaneously) is small, and the amount of memory of the buffer that should be prepared can be significantly reduced. Therefore, the delay time can be significantly reduced, compared with a method of performing wavelet transform of the entire screen. Also, an entropy coding process can be performed in increments of a plurality of precincts. Therefore, entropy coding of image data can be performed with higher efficiency and higher quality than the case in which encoding is performed in increments of one precinct. Further, by performing wavelet transform and entropy coding with reversible methods, the encoding apparatus 100 can transmit image data with high quality and low delay.

Figure 13:
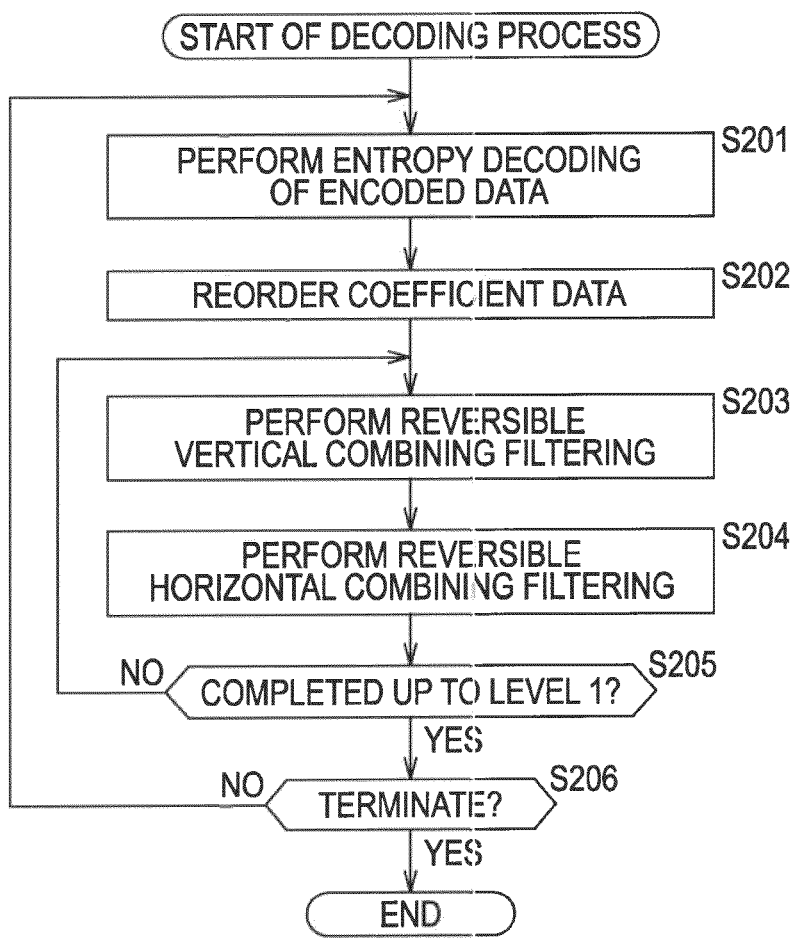
FIG. 13 is a flowchart for describing an exemplary flow of a decoding process.

Next, with reference to the flowchart in FIG. 13, an exemplary flow of a decoding process executed by the decoding apparatus 200 will be described.

When a decoding process starts, in step S201, the entropy decoding unit 201 performs entropy decoding of input encoded data. In step S202, the coefficient reordering unit 202 reorders coefficient data in order from low frequency components to high frequency components. In step S203, when coefficient data equivalent to one precinct or more supplied from the coefficient reordering unit 202 is held in the coefficient buffer unit 203, the inverse wavelet transform unit 204 reads out the coefficient data equivalent to one precinct and performs a reversible vertical combining filtering process. In step S204, the inverse wavelet transform unit 204 performs a reversible horizontal combining filtering process.

In step S205, the inverse wavelet transform unit 204 determines whether or not the combining filtering processes have been performed up to level 1. When it is determined that level 1 has not been reached, the process returns to step S203, and the process thereafter is repeated. Alternatively, when it is determined in step S205 that the combining filtering processes have been performed up to level 1, the process proceeds to step S206.

In step S206, the entropy decoding unit 201 determines whether or not to terminate the decoding process. When it is determined not to terminate the decoding process, the process returns to step S201, and the process thereafter is repeated. Alternatively, when it is determined in step S206 to terminate the decoding process, the decoding process is terminated.

The decoding apparatus 200 repeats the decoding process such as that described above in increments of a picture (frame or field).

In the case of a conventional inverse wavelet transform method, firstly a horizontal combining filtering process is performed in the screen horizontal direction on the whole coefficients at the decomposition level to be processed, and then a vertical combining filtering process is performed in the screen vertical direction on the whole coefficients at the decomposition level to be processed. That is, every time each combining filtering process is performed, it is necessary to hold the result of the combining filtering process in the buffer. On that occasion, the buffer needs to hold the combining filtering result at the decomposition level at that point of time and all the coefficients at the next decomposition level. This means that a large memory capacity is necessary (the amount of data to be held is large).

Also, in this case, image data output is not performed until the whole inverse wavelet transform in the picture (frame or field) is completed, and hence, a delay time from input to output increases.

In contrast, in the case of the inverse wavelet transform unit 203 in the decoding unit 200, as has been described above, a vertical combining filtering process and a horizontal combining filtering process are successively performed up to level 1 on a precinct-by-precinct basis. Thus, compared with the conventional method, the amount of data needed to be buffered at a time (simultaneously) is small, and the amount of memory of the buffer that should be prepared can be significantly reduced. Also, since combining filtering processes (inverse wavelet transform process) are performed up to level 1, items of image data can be sequentially output (on a precinct-by-precinct basis) before the entire image data in the picture is obtained, and the delay time can be significantly reduced, compared with the conventional method.

In addition, by performing the entropy decoding process and the inverse wavelet transform process using reversible methods, the decoding apparatus 200 can obtain a high-quality restored image.

That is, the encoding apparatus 100 and the decoding apparatus 200 can transmit image data with high quality and low delay.

Next, an encoding process and a decoding process using irreversible methods that do not completely ensure forward direction and backward direction transform, which are contrary to an encoding process and a decoding process using reversible methods such as those described above, will be described.

Figure 14:
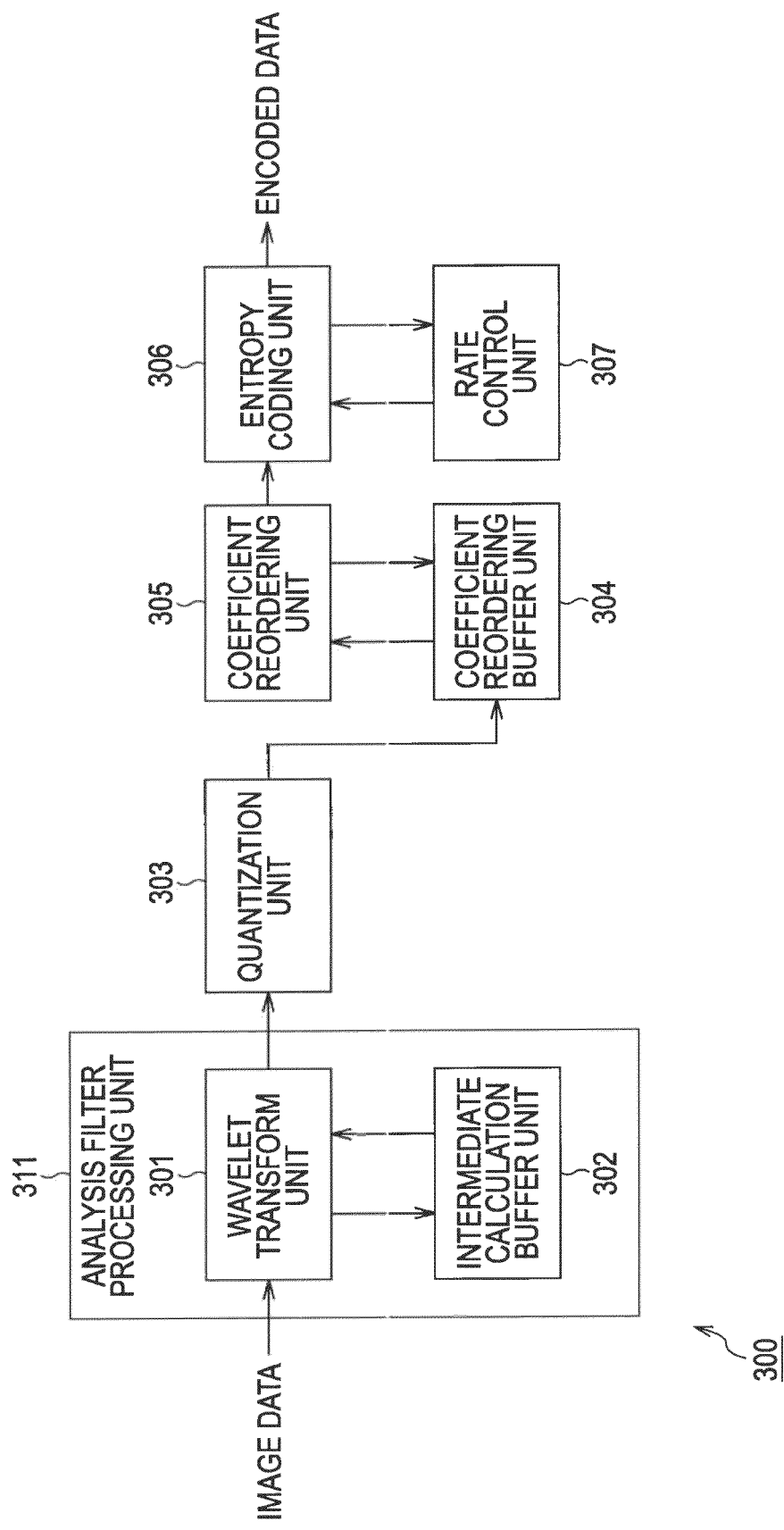
FIG. 14 is a block diagram showing another exemplary structure of the encoding apparatus.

FIG. 14 is a block diagram showing an exemplary structure of an encoding apparatus that encodes image data using an irreversible method. In FIG. 14, an encoding apparatus 300 performs an encoding process using an irreversible method. The encoding apparatus 300 includes a wavelet transform unit 301, an intermediate calculation buffer unit 302, a quantization unit 303, a coefficient reordering buffer unit 304, a coefficient reordering unit 305, an entropy coding unit 306, and a rate control unit 307.

The wavelet transform unit 301 is basically similar to the wavelet transform unit 101. The wavelet transform unit 301 performs irreversible wavelet transform by using a fixed-point-precision-type 5×3 analysis filter described later. The intermediate calculation buffer unit 302 is basically similar to the intermediate calculation buffer unit 102.

The quantization unit 303 quantizes coefficient data transformed by the wavelet transform unit 301 using a predetermined quantization coefficient, and supplies the quantized coefficient data to the coefficient reordering buffer unit 304 to hold the quantized coefficient data. Note that, needless to say, this quantization unit 303 may be omitted. By performing quantization, further improvement of the compression effect can be expected. Any method can be used as the quantization method. For example, this may be a technique of dividing coefficient data W by a quantization step size Δ. The quantization step size Δ on this occasion is calculated in, for example, the rate control unit 307. The coefficient reordering unit 305 is basically similar to the coefficient reordering unit 202. The coefficient reordering unit 305 reorders coefficient data, which is held in the coefficient reordering buffer unit 304 in order from high frequency components to low frequency components, in order from low frequency components to high frequency components, and supplies the reordered coefficient data to the entropy coding unit 306.

The entropy coding unit 306 is basically similar to the entropy coding unit 103. The entropy coding unit 306 encodes the supplied coefficient data using a predetermined entropy coding scheme, such as Huffman coding or arithmetic coding.

The entropy coding unit 306 operates in conjunction with the rate control unit 307. The bit rate of compressed and encoded data to be output is controlled to be a substantially constant value. That is, the rate control unit 307 supplies, on the basis of encoded data information from the entropy coding unit 306, a control signal to the entropy coding unit 306 so as to perform control to terminate an encoding process performed by the entropy coding unit 306 at the point of time at which the bit rate of data compressed and encoded by the entropy coding unit 306 reaches a target value or immediately before the bit rate reaches the target value. The entropy coding unit 306 outputs the encoded data to the outside of the encoding apparatus 300 at the point of time at which the encoding process is terminated in response to the control signal supplied from the rate control unit 307.

Figure 15:
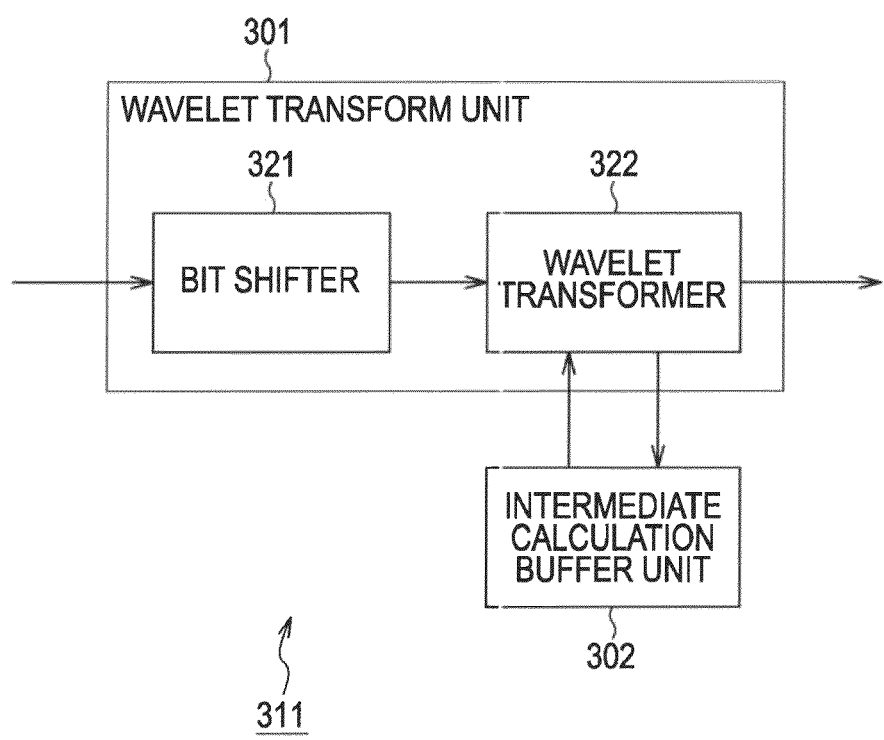
FIG. 15 is a block diagram showing a detailed exemplary structure of an analysis filter processing unit in FIG. 14.

Note that the wavelet transform unit 301 and the intermediate calculation buffer unit 302 are also collectively referred to as an analysis filter processing unit 311. FIG. 15 is a block diagram showing a further detailed exemplary structure of the analysis filter processing unit.

As shown in FIG. 15, the fixed-point-type wavelet transform unit 301 includes a bit shifter 321 and a wavelet transformer 322.

Figure 16:
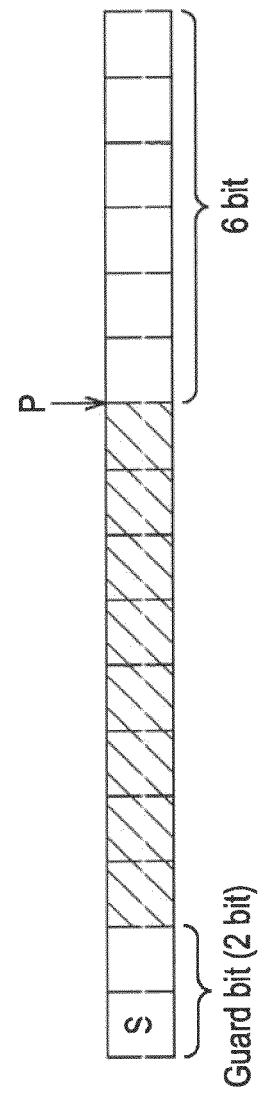
FIG. 16 is a schematic diagram showing an example of input data with fixed-point-type precision.

The bit shifter 321 performs a bit shifting process of input image data only once to generate fixed-point-precision input data, such as that shown in FIG. 16. In FIG. 16, individual squares represent individual bits of the input data. A point P indicates the position of a fixed point. Bits higher than this point P (left side of the drawing) indicate an integer part, and bits lower than this point P (right side of the drawing) indicate a decimal part. In the example in FIG. 16, since the decimal part has six bits, the fixed-point precision can be ensured with a precision of $1/2^6 = 1/64$. Also in the example in FIG. 16, it is assumed that the integer part handles 8-bit data, and, as a whole, a calculation of 16 bits (arithmetic operation precision is 16 bits) is performed. Further, in the example in FIG. 16, 2 bits of guard bits (Guard-bit) are provided at the most significant side (left end of the drawing). Of these bits, one bit is a bit indicating sign (+/−), and the other bit is a bit for avoiding overflow.

Referring back to FIG. 15, the fixed-point-precision data generated by the bit shifter 321 is stored by the wavelet transformer 322 in the intermediate calculation buffer unit 302. When a predetermined amount (equivalent to one precinct) of the fixed-point-type data is accumulated in the intermediate calculation buffer unit 302, the wavelet transformer 322 performs an analysis filtering process using a 5×3 analysis filter of the data equivalent to one precinct, which is accumulated in the intermediate calculation buffer unit 302, and generates coefficient data of each sub-band.

Figure 17:
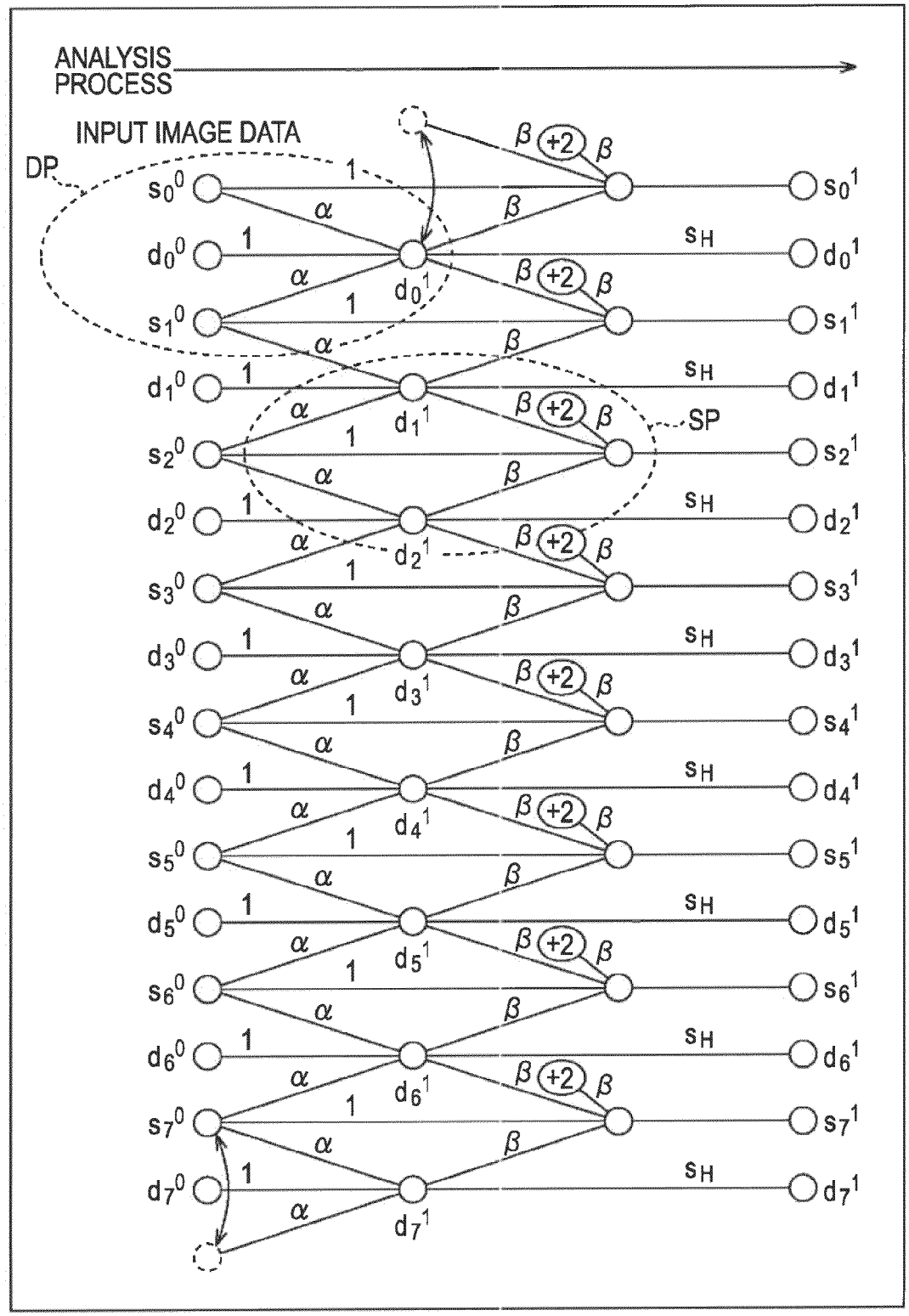
FIG. 17 is a diagram for describing an arithmetic operation of a fixed-point-type 5×3 analysis filter.

FIG. 17 describes a fixed-point-type wavelet transform arithmetic operation on the analysis side using a fixed-point-precision 5×3 analysis filter (hereinafter may also be referred to as a fixed-point-type 5×3 analysis filter). FIG. 17 shows an operation of performing one-dimensional wavelet transform and transforming input image data at the left end into low frequency components s and high frequency components d. Hereinafter a detailed operation will be described using the drawing. Here, it is assumed that $d_m^n$ is the m-th high-frequency-component coefficient with a wavelet transform level of n. It is clear from the drawing that, when n=0, it is the input image. Similarly, it is assumed that $s_m^n$ is the m-th low-frequency-component coefficient with a wavelet transform level of n.

As is clear from this FIG. 17, an equation for calculating a low-frequency-component coefficient s is generally represented as the following equation (9a) or equation (9b).

$$s_{m+1}^{n+1} = s_{m+1}^n + \beta \times (d_m^{n+1} + d_{m+1}^{n+1} + 2) \tag{9a}$$

$$s_{m+1}^{n+1} = s_{m+1}^n + \beta \times (d_m^{n+1} + d_{m+1}^{n+1}) \tag{9b}$$

Similarly, an equation for calculating a high-frequency-component coefficient d can be represented as the following equation (10).

$$d_m^{n+1} = d_m^n - \alpha \times (s_m^n + s_{m+1}^n) \tag{10}$$

Here, α=0.5 and β=0.25, and, since d corresponding to a high frequency component is Nyquist gain=2 on the analysis side, gain adjustment is performed so that Nyquist gain=1. This is the reason for multiplying the high-frequency-component coefficient d by SH=0.5. In addition, in the case of the above-described integer-type 5×3 analysis filter, since reversible transform is not ensured when gain adjustment is performed, it is not necessary to perform gain adjustment. Note that this peripheral technique is known as a general digital signal processing technique.

Note that, at the time of calculating data at the position of an end of the screen, when data outside the screen becomes necessary, the fact that adjacent data inside the screen is folded and used (e.g., $d_0^1$ for obtaining $s_0^1$ in FIG. 17) is similar to the case of the above-described integer-type analysis filter. Further, this is similar in the case of a combining filter.

Next, the difference between the above-described equations (9a) and (9b) will be described. Since the fixed-point-type 5×3 analysis filter has higher precision compared with integer precision, both equation (9a) (compatible) in which rounding of "+2" is performed, which has been described in the integer-type 5×3 analysis filter, and equation (9b) (not compatible) in which no rounding of "+2" is performed are conceivable.

In order to make the structure of arithmetic operation means common between this fixed-point-type 5×3 analysis filter and the above-described integer-type 5×3 analysis filter, it is necessary to use equation (9a). That is, when the structure which performs an arithmetic operation of equation (9a) is used as a wavelet transformer for use in the fixed-point-type 5×3 analysis filter, this can be commonly used as a wavelet transformer for use in the integer-type 5×3 analysis filter.

In such a fixed-point-type 5×3 analysis filter described together with FIG. 17, the amount of arithmetic operation required for calculating one pair of coefficients of a low frequency component and a high frequency component includes multiplication "3" and addition/subtraction "5" (compatible) or addition/subtraction "4" (not compatible).

Figure 18:
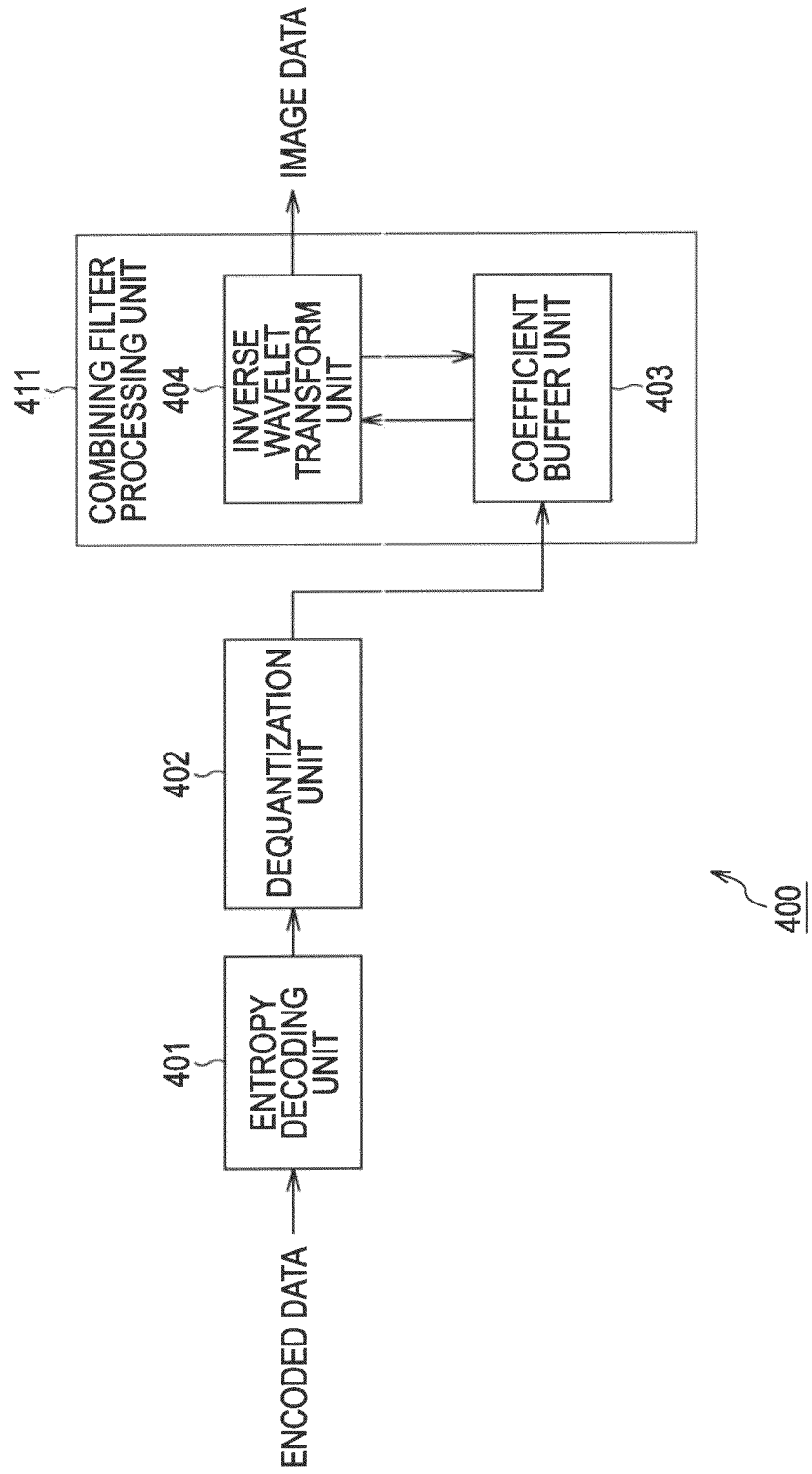
FIG. 18 is a block diagram showing another exemplary structure of the decoding apparatus.

Next, a decoding apparatus corresponding to the foregoing irreversible encoding apparatus 300 will be described. FIG. 18 is a block diagram showing an exemplary structure of a decoding apparatus that decodes encoded data using an irreversible method.

A decoding apparatus 400 shown in FIG. 18 performs a decoding process using a method corresponding to the encoding process performed by the above-described encoding apparatus 300. That is, the decoding apparatus 400 performs a decoding process using an irreversible method that does not completely ensure forward direction and backward direction transform. The decoding apparatus 400 includes an entropy decoding unit 401, a dequantization unit 402, a coefficient buffer unit 403, and an inverse wavelet transform unit 404.

The entropy decoding unit 401 is basically similar to the entropy decoding unit 201. The entropy decoding unit 401 decodes supplied encoded data using a method corresponding to the entropy coding unit 306 and generates coefficient data. The entropy decoding unit 401 supplies the generated coefficient data to the dequantization unit 402. The dequantization unit 402 performs dequantization using a method corresponding to the quantization unit 303, and supplies the dequantized coefficient data to the coefficient buffer unit 403 to hold the dequantized coefficient data. Note that, when the quantization unit 303 is omitted in the encoding apparatus 300, this dequantization unit 402 is also omitted.

The coefficient buffer unit 403 is basically similar to the coefficient buffer unit 203. Besides holding the coefficient data supplied from the dequantization unit 402, the coefficient buffer unit 403 appropriately supplies the coefficient data to the inverse wavelet transform unit 404 and holds intermediate data or image data generated in the inverse wavelet transform unit 404.

The inverse wavelet transform unit 404 is basically similar to the inverse wavelet transform unit 204. The inverse wavelet transform unit 404 performs irreversible inverse wavelet transform by using a fixed-point-precision-type 5×3 combining filter described later (hereinafter may also be referred to as a fixed-point-type 5×3 combining filter).

Figure 19:
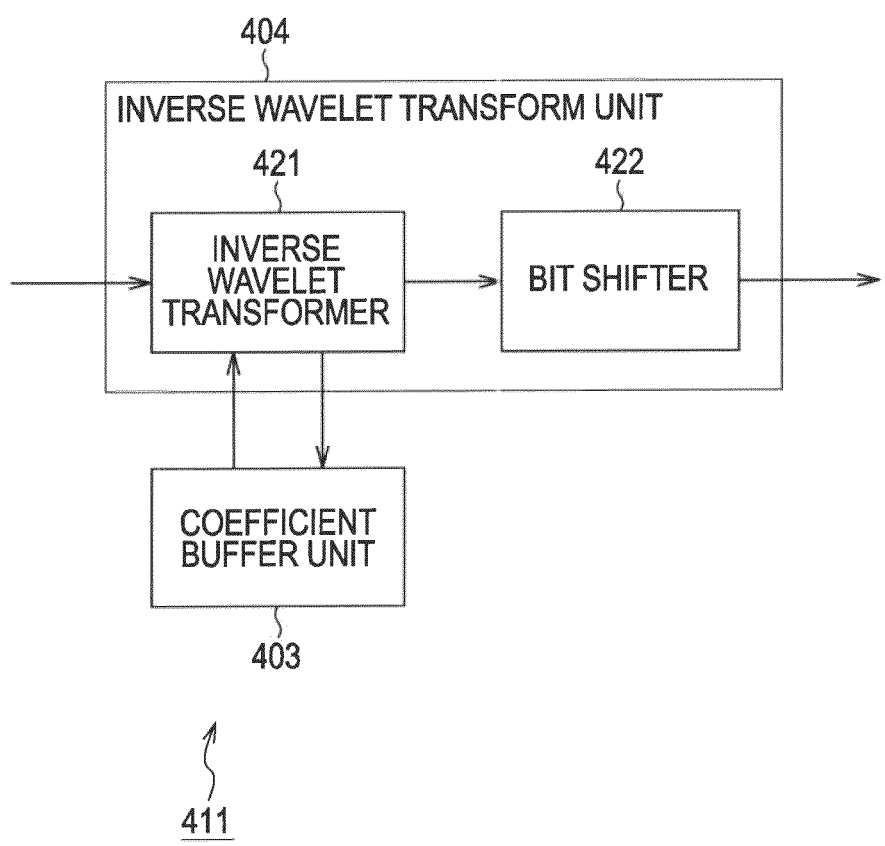
FIG. 19 is a block diagram showing a detailed exemplary structure of a combining filter processing unit.

Note that the coefficient buffer unit 403 and the inverse wavelet transform unit 404 are also collectively referred to as a combining filter processing unit 411. FIG. 19 is a block diagram showing a further detailed exemplary structure of the combining filter processing unit 411.

As shown in FIG. 19, the fixed-point-type inverse wavelet transform unit 404 includes an inverse wavelet transformer 421 and a bit shifter 422.

Regarding the fixed-point precision, the difference with the integer precision has been described above. In the case of the fixed-point precision, since data is bit-shifted to the left on the analysis filter side, data is conversely bit-shifted to the right on the combining filter side, and the value is brought back to the original level. This shifting of bit(s) to the right is performed on the final decoded image (level 0). That is, using the coefficient buffer unit 403, the inverse wavelet transformer 421 repeatedly performs a combining filtering process for each level and, when baseband image data is finally obtained, supplies this to the bit shifter 422. The bit shifter 422 performs a rightward bit shifting process of the supplied baseband image data and outputs the shifted data.

Figure 20:
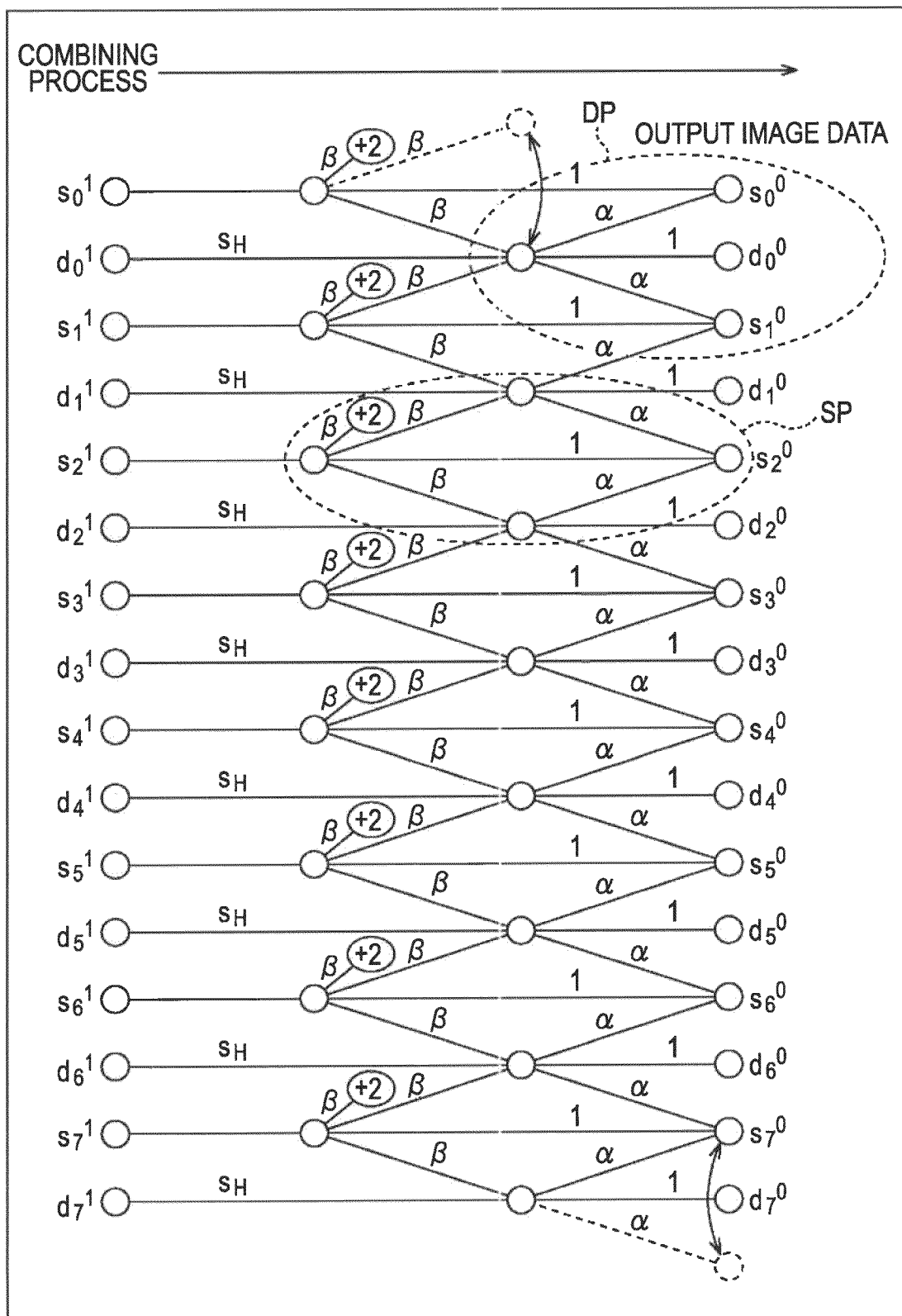
FIG. 20 is a diagram for describing an arithmetic operation of a fixed-point-type 5×3 combining filter.

Next, using FIG. 20, a fixed-point-type inverse wavelet transform arithmetic operation using a fixed-point-type 5×3 analysis filter will be described. FIG. 20 shows an operation of performing one-dimensional wavelet transform (inverse transform) and transforming low frequency components s and high frequency components d at the left end in the drawing into output pixels at the right end in the drawing. Here, it is assumed that $d_m^n$ is the m-th high-frequency-component coefficient with a wavelet transform level of n. Similarly, it is assumed that $s_m^n$ is the m-th low-frequency-component coefficient with a wavelet transform level of n. Note that, when n=0, s and d are odd-numbered and even-numbered pixels, respectively.

As is clear from this FIG. 20, an equation for calculating an odd-numbered pixel s or a low-frequency-component coefficient s at the right end in the drawing is generally represented as the following equation (11a) or equation (11b).

$$s_{m+1}^n = s_{m+1}^{n+1} - \beta \times (d_m^{n+1} + d_{m+1}^{n+1} + 2) \quad (11a)$$

$$s_{m+1}^n = s_{m+1}^{n+1} - \beta \times (d_m^{n+1} + d_{m+1}^{n+1}) \quad (11b)$$

Similarly, an equation for calculating an even-numbered pixel d or a high-frequency-component coefficient d at the right end in the drawing can be represented as the following equation (12).

$$d_m^n = d_m^{n+1} + \alpha \times (s_m^n + s_{m+1}^n) \quad (12)$$

Here, $\alpha=0.5$, and $\beta=0.25$. Since d corresponding to a high frequency component on the analysis filter side is Nyquist gain=2, gain adjustment is performed so that Nyquist gain=1. That is, the high-frequency-component coefficient d on the analysis filter side is multiplied by SH=−0.5. In contrast, on the combining filter side, it is necessary to bring back the Nyquist gain from 1 to 2. Therefore, the high frequency coefficient d is multiplied by SH=−2.0 on the combining filter side, and further, an arithmetic operation of equation (12) is applied.

Next, the difference between the above-described equations (11a) and (11b) will be described. Since the fixed-point-type 5×3 combining filter can perform a transform process with higher precision than the case of integer precision, both equation (11a) (compatible) in which rounding of "+2" is performed, as is the case of the rounding process in the above-described analysis filter, and equation (11b) (not compatible) in which no rounding of "+2" is performed are conceivable.

In order to make the structure of arithmetic operation means common between this fixed-point-type 5×3 combining filter and the above-described integer-type 5×3 combining filter, it is necessary to use equation (11a).

In such a fixed-point-type 5×3 combining filter that performs an arithmetic operation such as that in FIG. 10, the amount of arithmetic operation required for calculating one pair of coefficients of a low frequency component and a high frequency component includes multiplication "3" and addition/subtraction "5" (compatible) or addition/subtraction "4" (not compatible).

Next, the flow of an irreversible encoding process and decoding process such as above will be described. At first, with reference to the flowchart in FIG. 21, an exemplary flow of an encoding process executed by the encoding apparatus 300 will be described. This encoding process is a process that encodes image data using an irreversible method that does not completely ensure forward direction and backward direction transform.

The analysis filter processing unit 311 performs, as has been described above, an analysis filtering process basically similar to that in the reversible case (the case of an analysis filtering process performed by the analysis filter processing unit 111) except that the analysis filter processing unit 311 performs a process not with integer precision, but with fixed-point precision. That is, the processing in step S301 through step S305 is executed similarly to the processing in respective step S101 through step S105 in FIG. 12.

When the analysis filter processing unit 311 (wavelet transform unit 301) performs an analysis filtering process with fixed-point precision of image data equivalent to one precinct up to the final level, in step S306, the quantization unit 303 quantizes coefficient data equivalent to that precinct. Actually, the quantization unit 303 sequentially quantizes items of coefficient data supplied from the wavelet transform unit 301.

In step S307, the coefficient reordering unit 305 reorders the items of quantized coefficient data, which are arranged in order from high frequency components to low frequency components, in order from low frequency components to high frequency components. In step S308, the entropy coding unit 306 performs entropy coding of the items of reordered coefficient data. When coding is completed, the wavelet transform unit 301 increments in step S309 the value of the precinct numeral A to be processed and changes the precinct to be processed to the next precinct. In step S310, the wavelet transform unit 301 determines whether or not an unprocessed line exists. When it is determined that an unprocessed line exists, the process returns to step S302, and the process thereafter is repeated. Alternatively, when it is determined in step S310 that no unprocessed line exists, the wavelet transform unit 301 terminates the encoding process.

The encoding apparatus 300 repeats the encoding process such as that described above in increments of a picture (frame or field).

Figure 22:
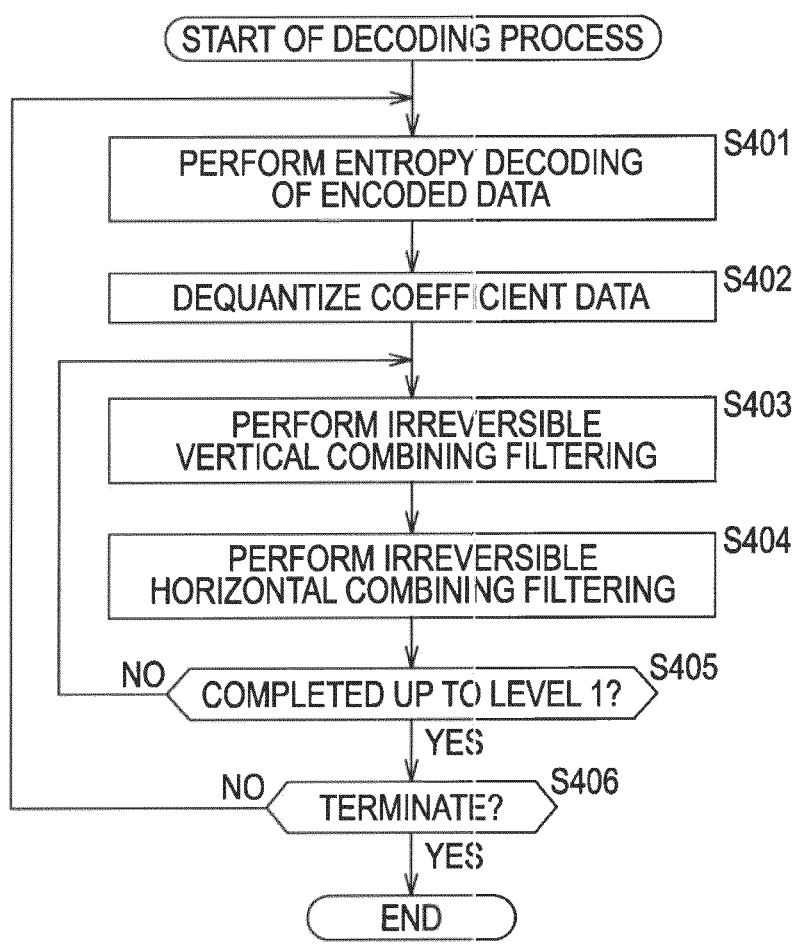
FIG. 22 is a flowchart for describing another exemplary flow of the decoding process.

Next, with reference to the flowchart in FIG. 22, an exemplary flow of a decoding process executed by the decoding apparatus 400 will be described. This decoding process is a process that decodes encoded data using an irreversible method that does not completely ensure forward direction and backward direction transform.

The decoding apparatus 400 performs, as has been described above, a decoding process basically similar to that in the reversible case (the case of a decoding performed by the decoding apparatus 200) except that the decoding apparatus 400 performs a process not with integer precision, but with fixed-point precision. Note that, since the highest priority is given to reduction of delay time in the irreversible case, reordering of coefficients is performed in the encoding apparatus 300. In addition, in the irreversible case, quantization is also performed in the encoding apparatus 300. Therefore, the decoding apparatus 400 performs dequantization instead of reordering coefficients.

Figure 21:
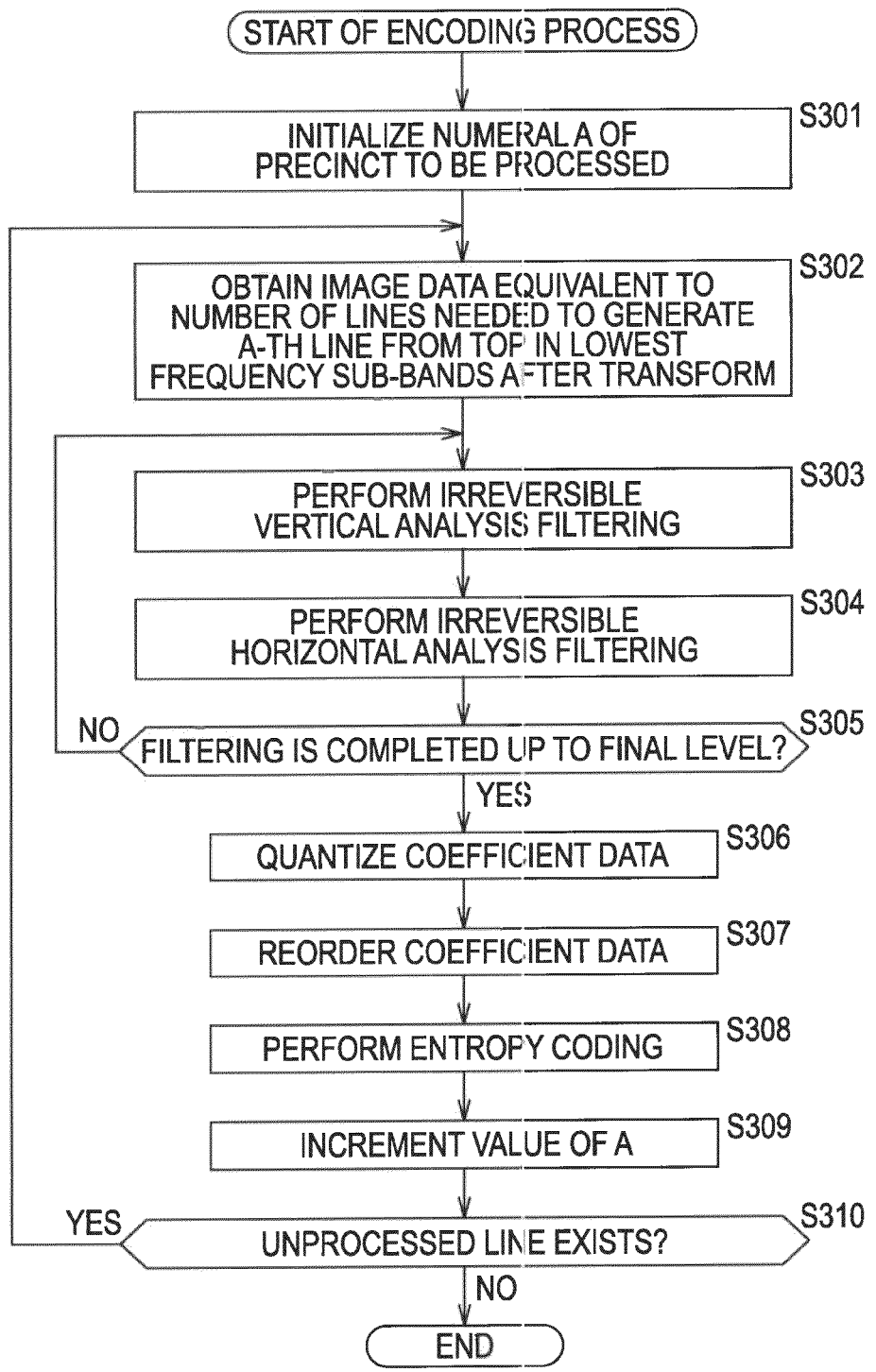
FIG. 21 is a flowchart for describing another exemplary flow of the encoding process.

When a decoding process starts, in step S401, the entropy decoding unit 401 performs entropy decoding of input encoded data. In step S402, the dequantization unit 402 dequantizes coefficient data using a method corresponding to step S306 (FIG. 21). In step S403, when coefficient data equivalent to one precinct or more supplied from the dequantization unit 402 is held in the coefficient buffer unit 403, the inverse wavelet transform unit 404 reads out the coefficient data equivalent to one precinct and performs an irreversible vertical combining filtering process with fixed-point precision. In step S404, the inverse wavelet transform unit 404 performs an irreversible horizontal combining filtering process with fixed-point precision.

In step S405, the inverse wavelet transform unit 404 determines whether or not the combining filtering processes have been performed up to level 1. When it is determined that level 1 has not been reached, the process returns to step S403, and the process thereafter is repeated on low frequency components. Alternatively, when it is determined in step S405 that the combining filtering processes have been performed up to level 1, the process proceeds to step S406.

In step S406, the entropy decoding unit 401 determines whether or not to terminate the decoding process. When it is determined not to terminate the decoding process, the process returns to step S401, and the process thereafter is repeated. Alternatively, when it is determined in step S406 to terminate the decoding process, the decoding process is terminated.

The decoding apparatus 400 repeats the decoding process such as that described above in increments of a picture (frame or field).

Figure 23:
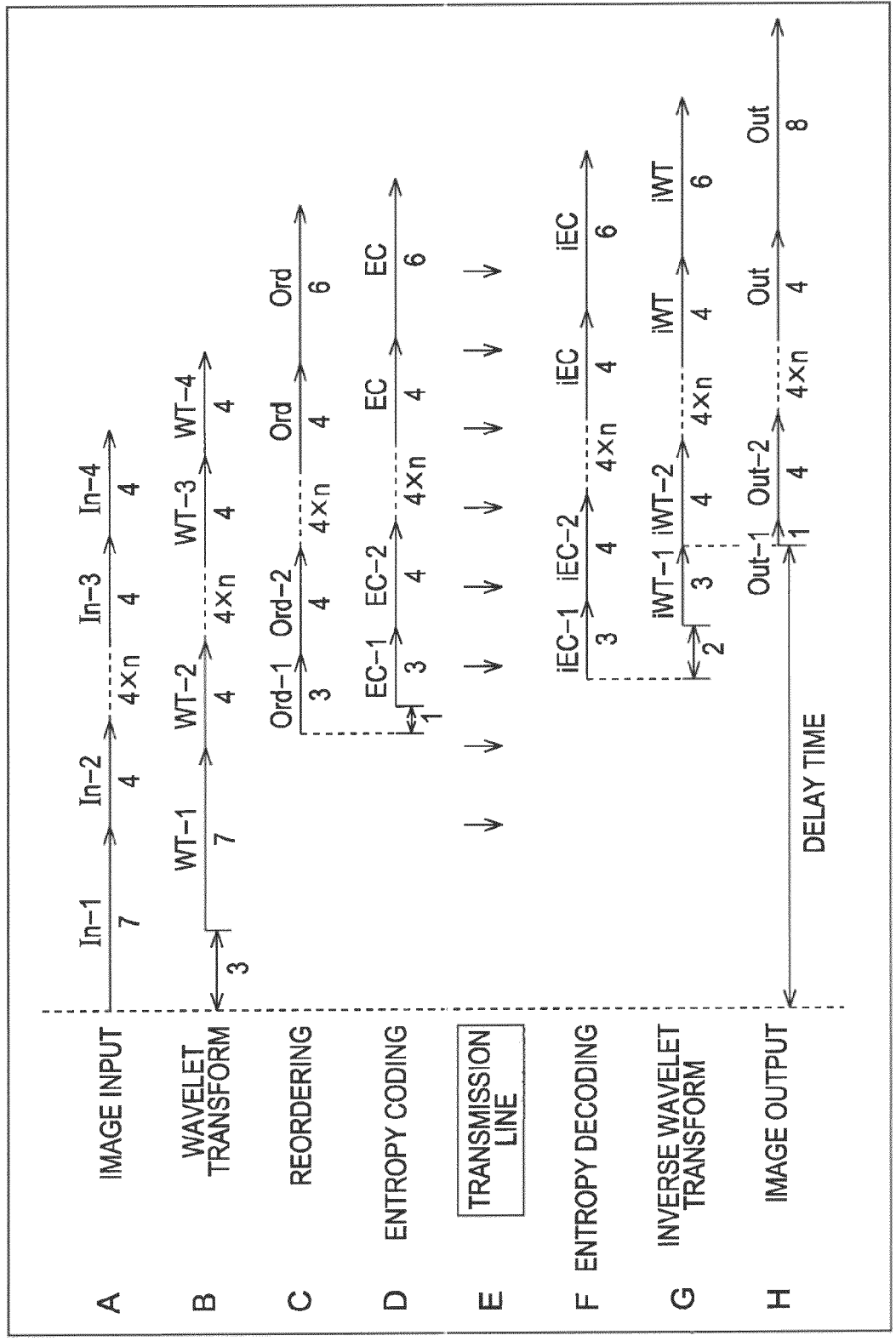
FIG. 23 is an outline diagram showing the outline of an example of the manner of parallel operation performed by individual elements of an encoding unit and a decoding unit.

Various processes as described above may appropriately be executed in parallel, as shown in FIG. 23 by way of example.

FIG. 23 is a diagram showing the outline of an example of the parallel operation of individual elements of processes, in the irreversible case, executed by the individual units of the encoding apparatus 300 shown in FIG. 14 and the decoding apparatus 400 shown in FIG. 18. This FIG. 23 corresponds to FIG. 7 and FIG. 8 described above. A first wavelet transform WT-1 (B in FIG. 23) is applied to an input In-1 of image data (A in FIG. 23) at the wavelet transform unit 301 (FIG. 14). This first wavelet transform WT-1 is started at a point of time at which the first three lines are input, and the coefficient C1 is generated. That is, a delay equivalent to three lines occurs from the input of the image data In-1 until the start of the wavelet transform WT-1.

The generated coefficient data is quantized and thereafter stored in the coefficient reordering buffer unit 304 (FIG. 14). Subsequently, a wavelet transform is applied to input image data. When the first process is completed, the process directly proceeds to a second wavelet transform WT-2.

In parallel to an input of image data In-2 for the second wavelet transform WT-2 and a process of the second wavelet transform WT-2, reordering Ord-1 of three, the coefficient C1, the coefficient C4, and the coefficient C5, is executed by the coefficient reordering unit 305 (FIG. 14) (C in FIG. 23).

Note that the delay from the completion of the wavelet transform WT-1 until the start of the reordering Ord-1 is a delay based on the apparatus or system configuration, such as a delay involved in transmission of a control signal for instructing the coefficient reordering unit 305 to perform a reordering process, a delay required to start a process performed by the coefficient reordering unit 305 in response to the control signal, and a delay required for program processing, and is not an essential delay involved in an encoding process.

Items of coefficient data are read out from the coefficient reordering buffer unit 304 in the order in which they are finished being reordered and are supplied to the entropy coding unit 155 (FIG. 14), and entropy coding EC-1 thereof is performed (D in FIG. 23). This entropy coding EC-1 can be started without waiting for completion of the reordering of all the three, the coefficient C1, the coefficient C4, and the coefficient C5. For example, at a point of time at which reordering of one line based on the coefficient C5 which is output first is completed, entropy coding of the coefficient C5 can be started. In this case, a delay from the start of the process of the reordering Ord-1 to the start of the process of the entropy coding EC-1 is equivalent to one line.

Predetermined signal processing is applied to the encoded data of which the entropy coding EC-1 by the entropy coding unit 306 has been completed, and then transmitted to the decoding apparatus 400 (FIG. 18) (E in FIG. 23).

As above, in succession to input of image data equivalent to seven lines with the first process, items of image data up to the lower end line of the screen are sequentially input to the encoding apparatus 300. In accordance with an input In-n (n is 2 or greater) of image data, the encoding apparatus 300 performs wavelet transform WT-n, reordering Ord-n, and entropy coding EC-n every four lines, as described above. Reordering Ord and entropy coding EC in the encoding apparatus 300 in response to the last process are performed on six lines. These processes are performed in parallel in the encoding apparatus 300, as illustrated in A in FIG. 23 through D in FIG. 23.

Encoded data encoded by performing entropy coding EC-1 using the encoding apparatus 300 is supplied to the decoding apparatus 400. The entropy decoding unit 401 in the decoding apparatus 400 (FIG. 18) sequentially performs decoding iEC-1 of entropy coding of the encoded data encoded with the entropy coding EC-1, which is supplied thereto, and restores the coefficient data (F in FIG. 23). Items of restored coefficient data are dequantized and thereafter sequentially stored in the coefficient buffer unit 403. When as many items of coefficient data as are needed to perform inverse wavelet transform are stored in the coefficient buffer unit 403, the inverse wavelet transform unit 404 reads out the coefficient data from the coefficient buffer unit 403 and performs inverse wavelet transform iWT-1 using the read-out coefficient data (G in FIG. 23).

As has been described with reference to FIG. 7 and FIG. 8, the inverse wavelet transform iWT-1 performed by the inverse wavelet transform unit 404 can be started at a point of time at which the coefficient C4 and the coefficient C5 are stored in the coefficient buffer unit 403. Therefore, a delay from the start of the decoding iEC-1 performed by the entropy decoding unit 401 to the start of the inverse wavelet transform iWT-1 performed by the inverse wavelet transform unit 404 is equivalent to two lines.

When the inverse wavelet transform iWT-1 equivalent to three lines of the first wavelet transform is completed in the inverse wavelet transform unit 404, an output Out-1 of image data generated with the inverse wavelet transform iWT-1 is performed (H in FIG. 23). In the output Out-1, as has been described using FIG. 7 and FIG. 8, image data of the first line is output.

In succession to input of encoded coefficient data equivalent to three lines with the first process performed by the encoding apparatus 300, items of coefficient data encoded with entropy coding EC-n (n is 2 or greater) are sequentially input to the decoding apparatus 400. The decoding apparatus 400 performs entropy decoding iEC-n and inverse wavelet transform iWT-n of the input coefficient data every four lines and sequentially performs an output Out-n of image data restored with the inverse wavelet transform iWT-n, as has been described above. Entropy decoding iEC and inverse wavelet transform iWT in response to the last time performed by the encoding apparatus 300 are performed on six lines, and an output Out outputs eight lines. These processes are performed in parallel in the decoding apparatus 400, as illustrated in F in FIG. 23 through H in FIG. 23.

By performing the individual processes in the encoding apparatus 300 and the decoding apparatus 400 in parallel in order from the upper portion to the lower portion of the screen as has been described above, an image compression process and an image decoding process can be performed with a shorter delay.

Referring to FIG. 23, a delay time from an image input to an image output in the case where wavelet transform and inverse wavelet transform up to the decomposition level=2 are performed using a fixed-point-type 5×3 analysis filter and a fixed-point-type 5×3 combining filter is calculated. A delay time from when image data of the first line is input to the encoding apparatus 300 to when the image data of the first line is output from the decoding apparatus 400 is the sum total of the following individual elements. Note that a delay that is different depending on the system configuration, such as a delay in transmission line or a delay involved in the actual processing timing of each unit of the apparatus, is excluded here.

(1) Delay D_WT from the first line input to the completion of the wavelet transform WT-1 equivalent to seven lines (2) Time D_Ord involved in coefficient reordering Ord-1 equivalent to three lines (3) Time D_EC involved in entropy coding EC-1 equivalent to three lines (4) Time D_iEC involved in entropy decoding iEC-1 equivalent to three lines (5) Time D_iWT involved in inverse wavelet transform iWT-1 equivalent to three lines Referring to FIG. 23, a calculation of delay due to the individual elements described above is attempted. The delay D_WT in (1) is a time equivalent to ten lines. Each of the time D_Ord in (2), the time D_EC in (3), the time D_iEC in (4), and the time D_iWT in (5) is a time equivalent to three lines. Also, the entropy coding EC-1 can be started in the encoding apparatus 300 one line after the reordering Ord-1 is started. Similarly, the inverse wavelet transform iWT-1 can be started in the decoding apparatus 400 two lines after the entropy decoding iEC-1 is started. Also, the entropy decoding iEC-1 can start a process at a point of time at which encoding equivalent to one line is completed in the entropy coding EC-1.

Therefore, in the example in FIG. 23, a delay time from the input of the image data of the first line to the encoding apparatus 300 to the output of the image data of the first line from the decoding apparatus 400 is equivalent to 10+1+1+2+3=17 lines.

Using a more specific example, a delay time will be considered. In the case where input image data is an interlaced video signal based on HDTV (High Definition Television), for example, one frame is configured of a resolution of 1920 pixels×1080 lines, and one field is of 1920 pixels×540 lines. Therefore, when a frame frequency is assumed to be 30 Hz, 540 lines serving as one field are input to the encoding apparatus 300 during a time of 16.67 msec (=1 sec/60 fields).

Therefore, a delay time involved in an input of image data equivalent to seven lines is 0.216 msec (=16.67 msec×7/540 lines), which is a very short time with respect to an updating time of one field, for example. Also, with regard to the sum total of the above-described delay D_WT in (1), time D_Ord in (2), time D_EC in (3), time D_iEC in (4), and time D_iWT in (5) as well, the number of lines to be processed is small, and accordingly a delay time is extremely reduced.

As above, since priority is given to reduction of delay time in the case of the encoding process and the decoding process using irreversible methods described with reference to FIG. 14 through FIG. 23, the entropy coding unit 306 in the encoding apparatus 300 encodes coefficient data in increments of a precinct. Also, in order to further reduce the delay time, reordering of coefficient data is performed in the encoding apparatus 300 (coefficient reordering unit 305). Further, in the case of the irreversible scheme, quantization of coefficient data can be performed. By performing this quantization in the encoding apparatus 300 (quantization unit 303), further improvement of the compression effect can be expected.

In addition, in the case of the irreversible scheme, the encoding apparatus 300 can use an irreversible filter such as a fixed-point-type 5×3 analysis filter in the wavelet transform unit 301. Accordingly, the encoding apparatus 300 can perform an analysis filtering process with higher precision than the case where a reversible analysis filter such as an integer-type 5×3 analysis filter is used. Note that an irreversible analysis filter other than the fixed-point-type 5×3 analysis filter, such as a 9×7 analysis filter, a 13×3 analysis filter, or a 9×2 analysis filter, is also applicable. Similarly, an irreversible combining filter other than the fixed-point-type 5×3 combining filter, such as a 9×7 combining filter, a 13×3 combining filter, or a 9×2 combining filter, is applicable to the decoding apparatus 400.

In contrast, in the case of the encoding process and the decoding process using reversible methods described with reference to FIG. 1 through FIG. 13, when baseband image data is encoded in the encoding apparatus 100 and decoded in the decoding apparatus 200, the baseband image data before encoding is restored. That is, a high-quality decoded image whose image quality has not deteriorated compared with that before encoding can be obtained. Therefore, in the case of these reversible methods, needless to say, not only further reduction of delay time is done in data transmission than that in the case of conventional schemes, such as MPEG and JPEG 2000, but also high-quality data transmission may be taken into consideration to a certain degree. In general, reduction of delay time and improvement of quality of data transmission are in a trade-off relationship. In order to improve the quality of data transmission, it is necessary to suppress reduction of delay time to a certain degree.

For example, the analysis filter processing unit 111 in the encoding apparatus 100 performs an analysis filtering process in increments of a precinct. In order to improve the compression efficiency and the quality of data, the entropy coding unit 103 remains in standby until coefficient data equivalent to multiple precincts is obtained and, using the coefficient data equivalent to multiple precincts, performs entropy coding. Also, because the encoding apparatus 100 employs the reversible scheme, the encoding apparatus 100 does not perform quantization of coefficient data (the decoding apparatus 200 does not perform dequantization). It has been described that reordering of coefficients is performed in the decoding apparatus 200. Alternatively, when a greater weight is given to reduction of delay time, reordering of coefficients may be performed in the encoding apparatus 100.

Also, it has been described that the wavelet transform unit 101 in the encoding apparatus 100 performs wavelet transform using the integer-type 5×3 analysis filter. Alternatively, for example, a reversible analysis filter other than the integer-type 5×3 analysis filter, such as a 2×1 analysis filter, is also applicable. Similarly, instead of the integer-type 5×3 combining filter, a reversible combining filter other than the integer-type 5×3 combining filter, such as a 2×1 combining filter, may be applied to the inverse wavelet transform unit 204 in the decoding apparatus 200.

As above, by performing the encoding process and the decoding process using reversible methods, the encoding apparatus 100 and the decoding apparatus 200 can transmit image data with high quality and low delay.

Note that it has been described above that reordering of coefficients is performed in the decoding apparatus when encoding and decoding processes are performed using reversible methods and data transmission is performed. However, in order to reduce delay time, reordering of coefficients may be performed in the encoding apparatus.

Also, when encoded data is to be transmitted, encoded data is generally packetized and transmitted. On this occasion, information regarding encoding, such as the fact that encoding is performed using a reversible method, the filter used in encoding, the number of processing units in entropy coding, or whether or not items of coefficient data are reordered, may be added to header information of the packet, and the decoding apparatus may be configured to perform an appropriate decoding process in accordance with the contents of the encoding process on the basis of the header information.

Figure 24:
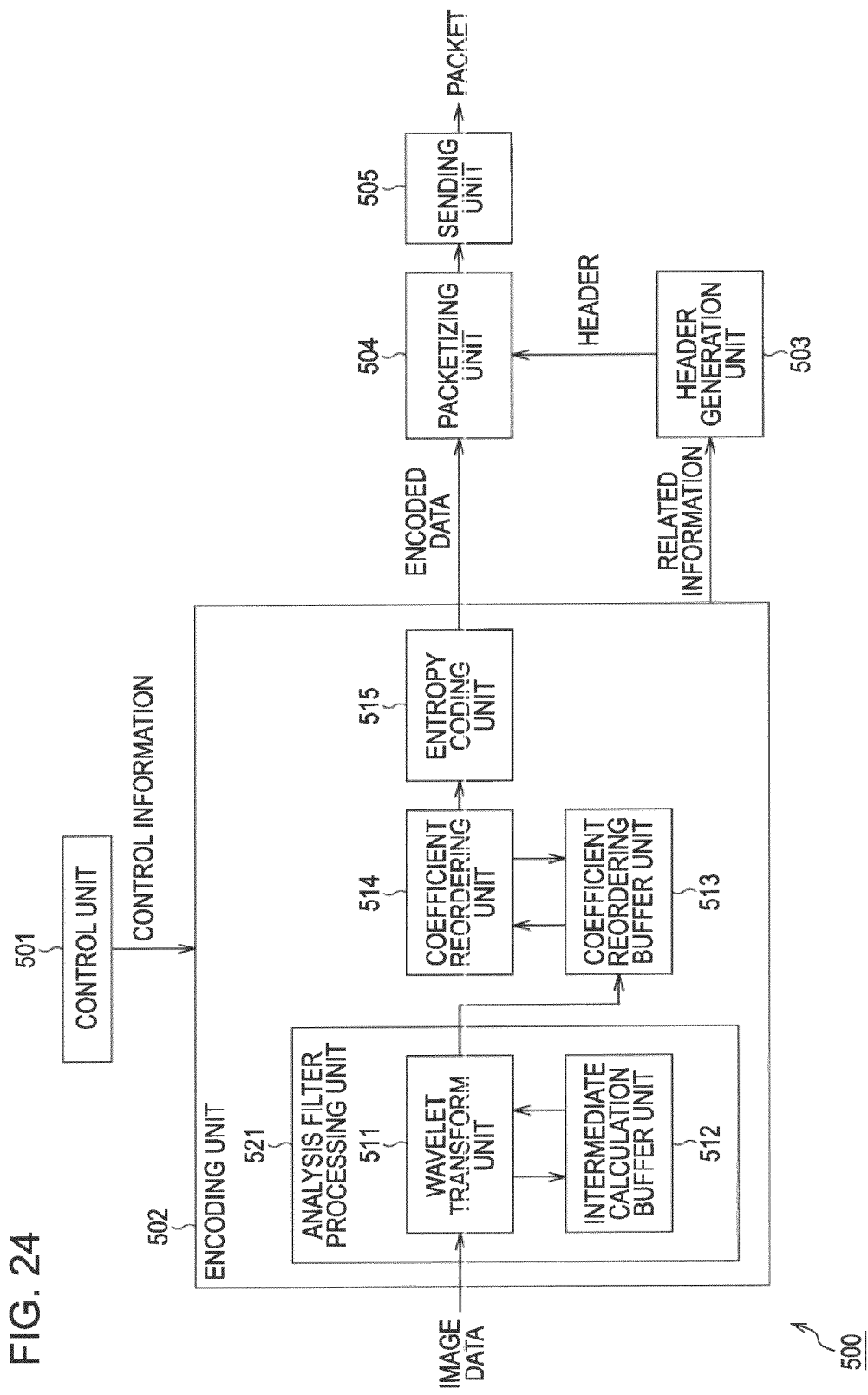
FIG. 24 is a block diagram showing yet another exemplary structure of the encoding apparatus.

Hereinafter, these cases will be described. FIG. 24 is a block diagram showing another exemplary structure of an encoding apparatus to which the present invention is applied. In FIG. 24, an encoding apparatus 500 encodes baseband image data using a reversible method and generates encoded data, as is the case with the encoding apparatus 100. Note that the encoding apparatus 500 further packetizes the encoded data and outputs the packetized encoded data. On this occasion, the encoding apparatus 500 generates header information using the information regarding encoding and supplies the header information, together with the encoded data, to a decoding apparatus. Accordingly, the encoding apparatus 500 can supply the information regarding the encoding process to the decoding apparatus, and the decoding apparatus is enabled to perform an appropriate decoding process in accordance with the contents of the encoding process on the basis of the header information.

As shown in FIG. 24, the encoding apparatus 500 includes a control unit 501, an encoding unit 502, a header generation unit 503, a packetizing unit 504, and a sending unit 505.

By supplying control information to the encoding unit 502, the control unit 501 controls an encoding process performed by the encoding unit 502, such as designating a processing unit (the number of precincts) in an encoding process of an entropy coding unit 515. The control unit 501 generates or obtains control information in accordance with, for example, a user designation input via an input unit not shown in the drawings, predetermined setting information input in advance, setting information supplied from an external device, setting information generated by the control unit 501 itself in accordance with a predetermined condition, or the like and supplies this to the encoding unit 502.

The encoding unit 502 is basically a processing unit corresponding to the encoding apparatus 100 in FIG. 1. The encoding unit 502 has a structure similar to that of the encoding apparatus 100, that is, a wavelet transform unit 511 corresponding to the wavelet transform unit 101, an intermediate calculation buffer unit 512 corresponding to the intermediate calculation buffer unit 102 (an analysis filter processing unit 521 corresponding to the analysis filter processing unit 111), and the entropy coding unit 515 corresponding to the entropy coding unit 103. Note that the encoding unit 502 has a function of reordering items of coefficient data, which are output from the analysis filter processing unit 521 and are arranged in order from high frequency components to low frequency components, in order from low frequency components to high frequency components. As a structure therefor, the encoding unit 502 includes a coefficient reordering buffer unit 513 and a coefficient reordering unit 514.

The coefficient reordering buffer unit 513 holds items of coefficient data generated by encoding image data using a reversible method and supplied using the wavelet transform unit 511 in that order. The coefficient reordering unit 514 reorders the items of coefficient data, which are held in order from high frequency components to low frequency components in the coefficient reordering buffer unit 513, in order from low frequency components to high frequency components and supplies these items of reordered coefficient data to the entropy coding unit 515.

The wavelet transform unit 511 in the analysis filter processing unit 521 performs a reversible analysis filtering process of input image data using the intermediate calculation buffer unit 512, as is the case with the analysis filter processing unit 521, generates encoded data, and supplies the encoded data to the coefficient reordering buffer unit 513. Note that the wavelet transform unit 511 may be capable of selecting a reversible analysis filter to use. In that case, the wavelet transform unit 511 selects a filter on the basis of, for example, designation included in control information supplied from the control unit 501.

The entropy coding unit 515 encodes the items of coefficient data reordered in the coefficient reordering unit 514 using a reversible method in increments of a preset number of precincts and supplies the obtained encoded data to the packetizing unit 504.

Also, the encoding unit 502 performs setting and control of individual sections in the encoding unit 502 on the basis of control information supplied from the control unit 501. Also, the encoding unit 502 generates related information which includes the encoding setting contents and relates to the encoding process and supplies the related information to the header generation unit 503.

The header generation unit 503 generates header information in increments of a predetermined data unit, such as in increments of a picture, on the basis of the supplied related information.

Figure 25:
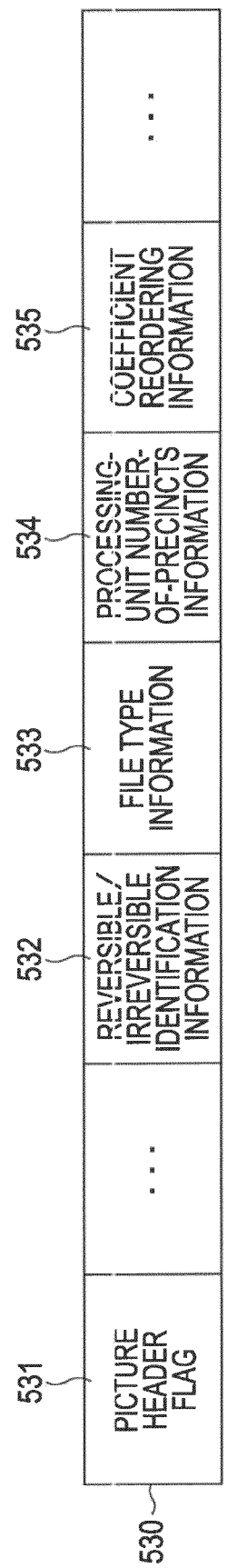
FIG. 25 is a schematic diagram showing an exemplary structure of a picture header.

FIG. 25 is a diagram schematically showing an example of a picture header generated by the header generation unit 503. A picture header 530 shown in FIG. 25 is header information which is added to each picture of image data and consists of information regarding that picture. That is, this picture header 530 is added to a header portion of the head packet in a group of packets corresponding to one picture. This picture header 530 is added to, for example, a header portion of the head packet of each picture. Needless to say, the picture header 530 may be added to a packet other than the head packet.

As shown in FIG. 25, a picture header flag 531 indicating that the picture header 530 is a picture header is arranged at the head. In addition, the picture header 530 includes information regarding an encoding process, namely, the related information supplied from the encoding unit 502, such as reversible/irreversible identification information 532, file type information 533, processing-unit number-of-precincts information 534, and coefficient reordering information 535.

The reversible/irreversible identification information 532 indicates whether the encoding process performed by the encoding unit 502 is a reversible scheme or an irreversible scheme. For example, the reversible/irreversible identification information 532 consists of 1-bit flag information. The file type information 533 indicates the file type of an analysis filter used in the wavelet transform unit 511. For example, the file type information 533 consists of a predetermined identification number, a file type name, or the like. The processing-unit number-of-precincts information 534 indicates a processing unit in encoding performed by the entropy coding unit 515. For example, the processing-unit number-of-precincts information 534 is indicated by the number of precincts. The coefficient reordering information 535 indicates whether or not reordering of coefficients has been done in the encoding unit 502. For example, the coefficient reordering information 535 consists of 1-bit flag information.

Needless to say, the picture header 530 may include information other than those above. Some of the above-described items of information regarding the encoding process may be omitted from the picture header 530; or information regarding the encoding process other than those described above may further be included in the picture header 530.

When a decoding apparatus that decodes encoded data generated in the encoding unit 502 obtains such related information, the decoding apparatus can easily grasp the contents of the encoding process performed in the encoding unit 502. Therefore, for example, when encoded data generated in the encoding unit 502 is to be decoded by a decoding apparatus corresponding to various encoding schemes, that decoding apparatus is capable of easily setting an appropriate decoding process on the basis of the header information.

The packetizing unit 504 packetizes encoded data supplied from the encoding unit 502 in increments of a predetermined data unit, appropriately adds header information supplied from the header generation unit 503 to the packet, and supplies the generated packet to the sending unit 505. The sending unit 505 sends, in accordance with the format of a communication network serving as a transmission line, the packet to the decoding apparatus via the transmission line.

Note that it has been described above that the header generation unit 503 generates a picture header on the basis of related information. Alternatively, the header generation unit 503 may include information regarding encoding in a header other than the picture header. That is, the timing at which the header generation unit 503 generates information regarding encoding is arbitrary and may be other than that in increments of a picture.

An exemplary flow of an encoding process performed by the encoding apparatus 500, such as that described above, will be described with reference to the flowchart in FIG. 26.

In step S501, the encoding unit 502 performs setting of individual sections, that is, an encoding process, on the basis of control information supplied from the control unit 501. In step S502, the encoding unit 502 starts encoding image data. Details of the encoding process will be described later with reference to the flowchart in FIG. 27. From this point onward, the encoding process performed by the encoding unit 502 is executed in parallel to the following process.

When the encoding process of image data starts, the packetizing unit 504 packetizes, in step S503, the encoded data supplied from the encoding unit 502 in increments of a predetermined data unit. In step S504, the header generation unit 503 determines whether or not image data equivalent to one picture has been encoded. When it is determined that image data equivalent to one picture has been encoded, the header generation unit 503 advances the process to step S505 and, on the basis of related information supplied from the encoding unit 502, generates the picture header 530 including information regarding the encoded data. Details of the picture header generation process will be described later with reference to the flowchart in FIG. 28.

In step S506, the packetizing unit 504 adds the generated packet header to the picture header 530 of the packet and advances the process to step S507. Alternatively, when it is determined in step S504 that no image data equivalent to one picture has been encoded, the packetizing unit 504 omits the processing in step S505 and step S506 and advances the process to step S507. In step S507, the sending unit 505 sends the generated packet to the transmission line.

In step S508, the encoding unit 502 determines whether or not the control information supplied from the control unit 501 has been updated. When it is determined that the control information has been updated, the encoding unit 502 advances the process to step S509 and updates the encoding setting. When the setting is updated, the encoding unit 502 advances the process to step S510. Alternatively, when it is determined in step S508 that the control information supplied from the control unit 501 has not been updated, the encoding unit 502 omits the processing in step S509 and advances the process to step S510. In step S510, the encoding unit 502 determines whether or not to terminate the encoding process. For example, when image data is still being supplied and accordingly the encoding unit 502 determines to continue the encoding process, the process returns to step S503, and the process thereafter is repeated. Alternatively, when it is determined in step S510 to terminate the encoding process, the encoding unit 502 terminates the encoding process.

Figure 27:
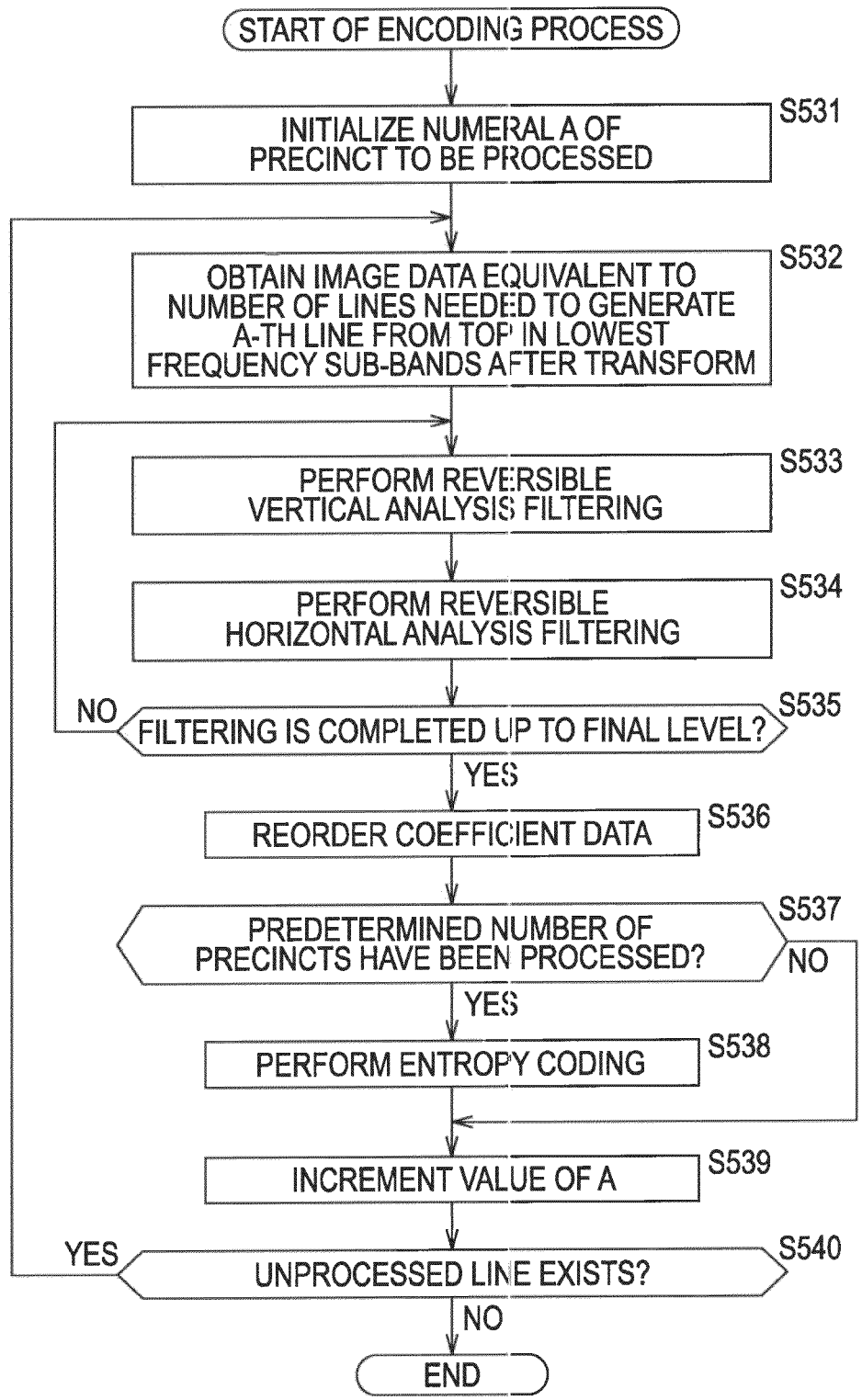
FIG. 27 is a flowchart for describing yet another exemplary flow of the encoding process.

Next, with reference to the flowchart in FIG. 27, an exemplary flow of an encoding process executed by the encoding unit 502 will be described.

Figure 12:
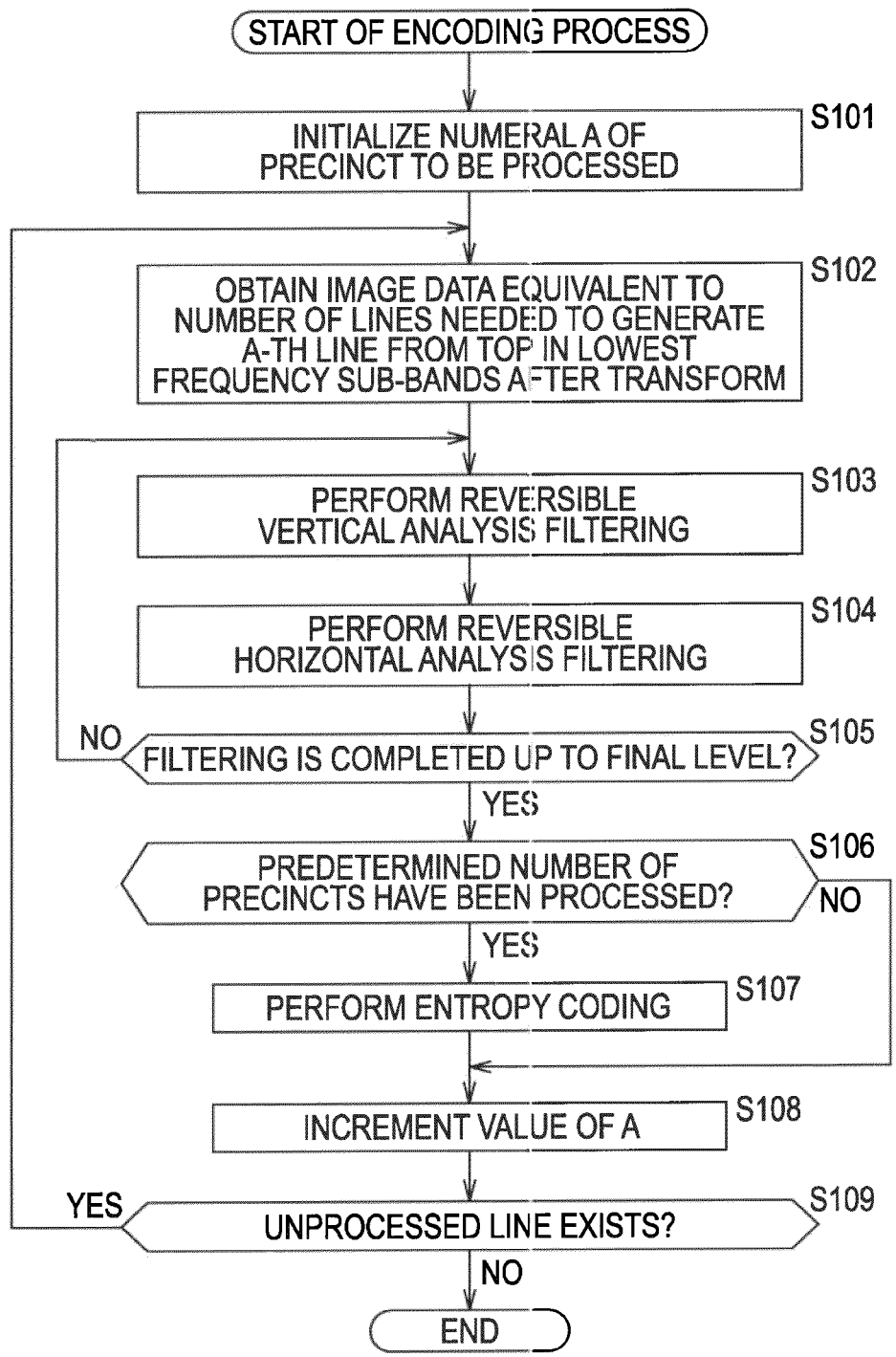
FIG. 12 is a flowchart for describing an exemplary flow of an encoding process.

This encoding process is basically executed similarly to the encoding process performed by the encoding apparatus 100, which has been described with reference to the flowchart in FIG. 12. That is, the processing in step S531 through step S535 is executed similarly to the processing in respective step S101 through step S105 in FIG. 12. Note that, in the case of the encoding process in FIG. 27, in step S536, the coefficient reordering unit 514 reorders items of coefficient data, which are arranged in order from high frequency components to low frequency components, in order from low frequency components to high frequency components. Also, the processing from step S537 to step S540 is executed similarly to the processing in respective step S106 through step S109 in FIG. 12.

An encoding process performed by the encoding unit 502 is executed as above.

Figure 28:
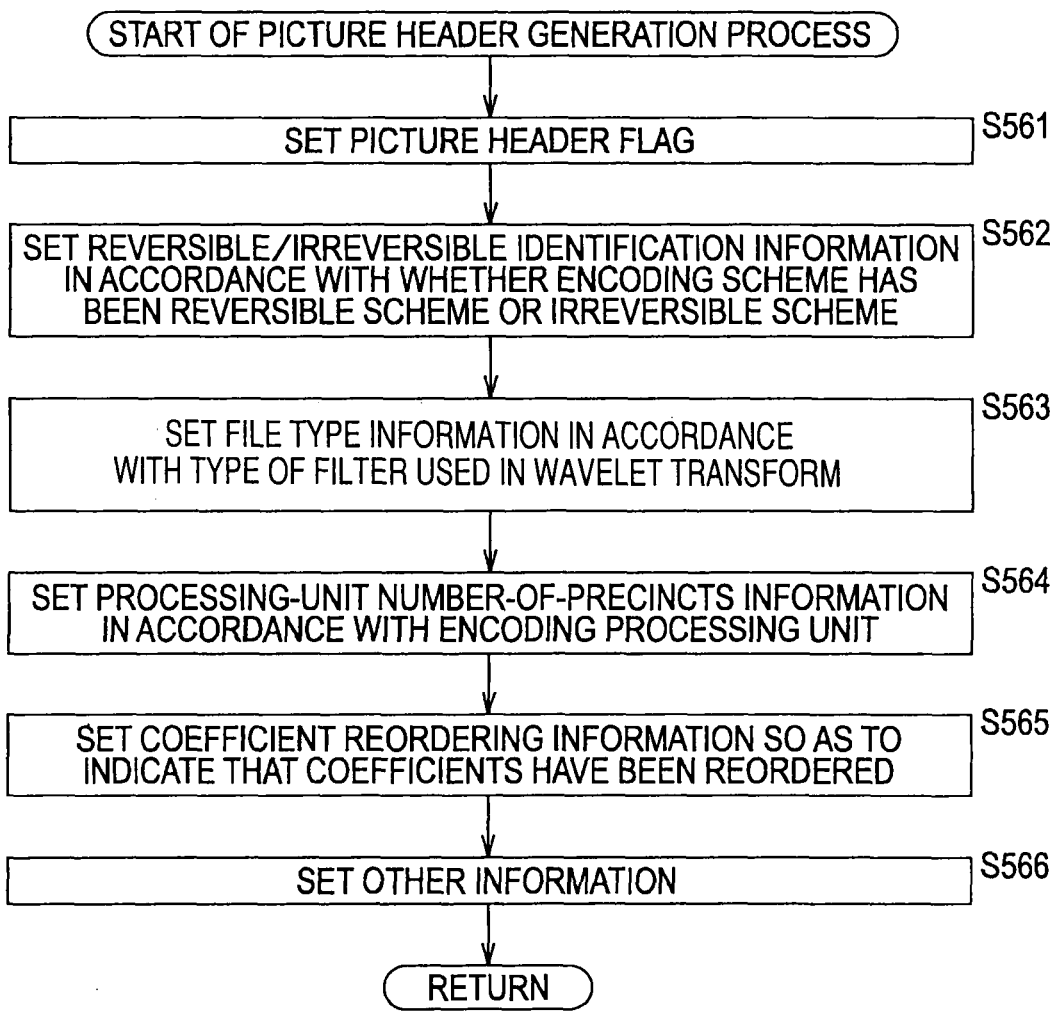
FIG. 28 is a flowchart for describing an exemplary flow of a picture header generation process.

Next, with reference to the flowchart in FIG. 28, an exemplary flow of the picture header generation process executed in step S505 in FIG. 26 will be described.

When the picture header generation process starts, in step S61, the header generation unit 503 sets the picture header flag 531. In step S561, the header generation unit 503 sets the reversible/irreversible identification information 532 in accordance with whether the encoding scheme has been a reversible scheme or an irreversible scheme, on the basis of the related information supplied from the encoding unit 502.

In step S563, the header generation unit 503 sets the file type information 533 in accordance with the type of a filter used in wavelet transform, on the basis of the related information supplied from the encoding unit 502. In step S564, the header generation unit 503 sets the processing-unit number-of-precincts information 534 in accordance with the encoding processing unit, on the basis of the related information supplied from the encoding unit 502. In step S565, the header generation unit 503 sets the coefficient reordering information 535 indicating that coefficients have been reordered, on the basis of the related information supplied from the encoding unit 502. Further, in step S566, the header generation unit 503 sets other information on the basis of the related information supplied from the encoding unit 502.

Figure 26:
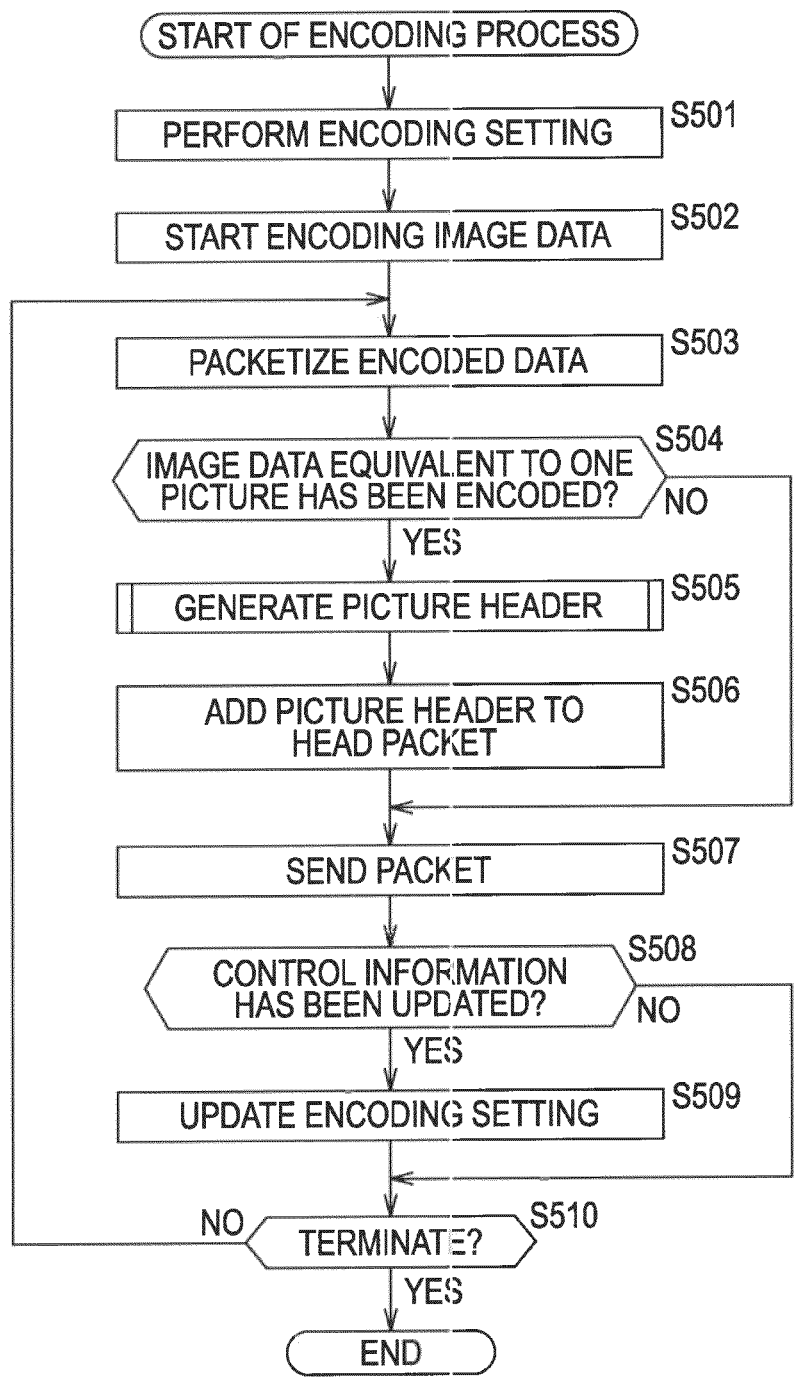
FIG. 26 is a flowchart for describing yet another exemplary flow of the encoding process.

When the processing in step S566 ends, the process returns to step S505 in FIG. 26, and the process from step S506 onward is executed.

As above, the encoding apparatus 500 encodes image data, packetizes the encoded data, and outputs the packetized encoded data. Additionally, the encoding apparatus 500 generates and outputs information regarding the encoding process thereof. This makes it possible for a decoding apparatus that decodes the encoded data to easily grasp the contents of the encoding process and to perform a decoding process with appropriate setting. That is, the encoding apparatus 500 suppresses occurrence of an unnecessary data defect or the like which may lead to deterioration of image quality at the time of transmission and realizes data transmission with higher quality.

In addition, since the encoding apparatus 500 reorders items of coefficient data, which are generated in order from high frequency components to low frequency components, in order from low frequency components to high frequency components, which is the order in a decoding process (inverse wavelet transform process), the encoding apparatus 500 can further reduce delay time due to data transmission (from the start of an encoding process to the end of a decoding process).

A decoding process corresponding to this encoding process will be described later. Before that, description of the encoding apparatus is continued.

It has been described above that encoding is performed by the encoding apparatus using a reversible method or an irreversible method. Alternatively, the encoding apparatus may be configured to be capable of selecting an encoding method. For example, the encoding apparatus may be configured to be capable of executing both an encoding process using a reversible method and an encoding process using an irreversible method and selecting which of the methods is to be used to perform encoding. Further, the encoding apparatus may be configured to be capable of selecting whether or not to perform reordering of coefficients and arbitrarily setting the processing unit in entropy coding. That is, the encoding apparatus may be configured to be capable of arbitrarily performing setting regarding the encoding process.

Figure 29:
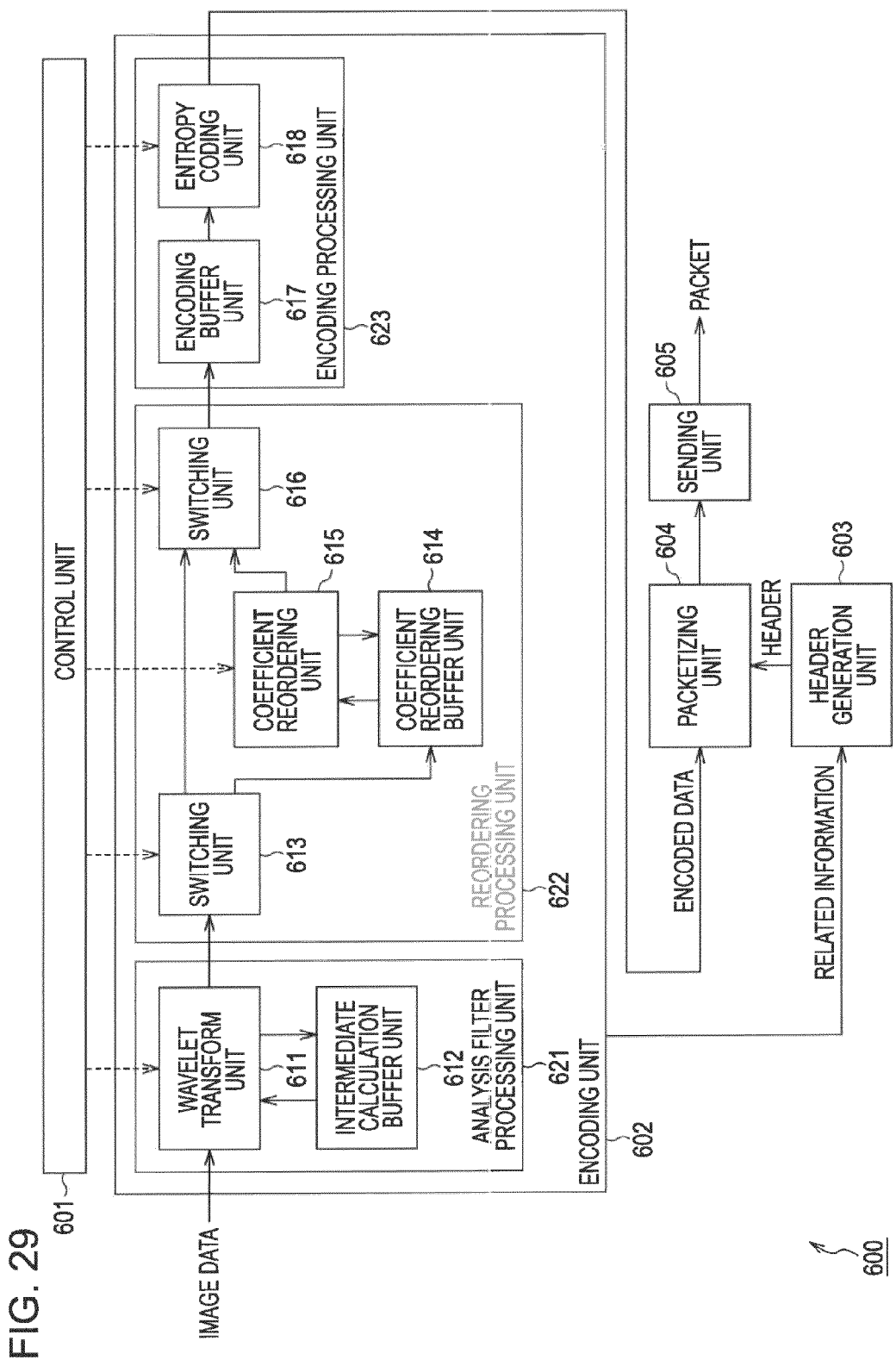
FIG. 29 is a block diagram showing yet another exemplary structure of the encoding apparatus.

FIG. 29 is a block diagram showing yet another exemplary structure of an encoding apparatus to which the present invention is applied.

In FIG. 29, an encoding apparatus 600 is an encoding apparatus that encodes image data and has a structure basically similar to that of the above-described encoding apparatus 500 or the like. Note that the encoding apparatus can select whether to perform an analysis filtering process using a reversible method or an irreversible method and whether or not to perform a reordering process. In addition, the encoding apparatus 600 can arbitrarily set a processing unit in an entropy coding process.

As shown in FIG. 29, the encoding apparatus 600 includes a control unit 601, an encoding unit 602, a header generation unit 603, a packetizing unit 604, and a sending unit 605. These control unit 601, encoding unit 602, header generation unit 603, packetizing unit 604, and sending unit 605 correspond to, have structures basically similar to, and perform processes similar to the control unit 501, encoding unit 502, header generation unit 503, packetizing unit 504, and sending unit 505, respectively, in the encoding apparatus 500.

Note that the encoding unit 602 is capable of changing the setting of each of an analysis filtering process, a reordering process, and an entropy coding process, as has been described above. As shown in FIG. 29, the encoding unit 602 includes an analysis filter processing unit 621, a reordering processing unit 622, and an encoding processing unit 623.

The analysis filter processing unit 621 corresponds to the analysis filter processing unit 521 and has a wavelet transform unit 611 and an intermediate calculation buffer unit 612. The reordering processing unit 622 includes, besides a coefficient reordering buffer unit 614 similar to the coefficient reordering buffer unit 513 and a coefficient reordering unit 615 similar to the coefficient reordering unit 514, a switching unit 613 and a switching unit 616. Under control of the control unit 601, the switching unit 613 and the switching unit 616 perform switching between whether or not to perform reordering of coefficients.

For example, when the reordering processing unit 622 under control of the control unit 601 performs reordering of items of coefficient data in the coefficient reordering unit 615, the reordering processing unit 622 causes the switching unit 613 to switch connection so as to supply coefficient data supplied from the wavelet transform unit 611 to the coefficient reordering buffer unit 614, and causes the switching unit 616 to switch connection so as to supply an output of the coefficient reordering unit 615 to an encoding buffer unit 617 in the encoding processing unit 623.

In addition, for example, when the reordering processing unit 622 under control of the control unit 601 does not perform reordering of items of coefficient data in the coefficient reordering unit 615, the reordering processing unit 622 causes the switching unit 613 to switch connection so as to supply coefficient data supplied from the wavelet transform unit 611 to the switching unit 616, and causes the switching unit 616 to switch connection so as to supply an output of the switching unit 613 to the encoding buffer unit 617 in the encoding processing unit 623.

The encoding processing unit 623 includes the encoding buffer unit 617 and an entropy coding unit 618. The encoding buffer unit 617 sequentially accumulates items of coefficient data supplied from the switching unit 616. The entropy coding unit 618 performs entropy coding, similar to that of the entropy coding unit 515 in the encoding apparatus 500, of the coefficient data accumulated in the encoding buffer unit 617. On this occasion, the entropy coding unit 618 performs entropy coding using the number of precincts designated by the control unit 601 as a processing unit. By accumulating coefficient data in the encoding buffer unit 617, the entropy coding unit 618 can alternatively perform an encoding process using coefficient data equivalent to an arbitrary number of (multiple) precincts, such as two precincts or three precincts, as a processing unit.

Figure 30:
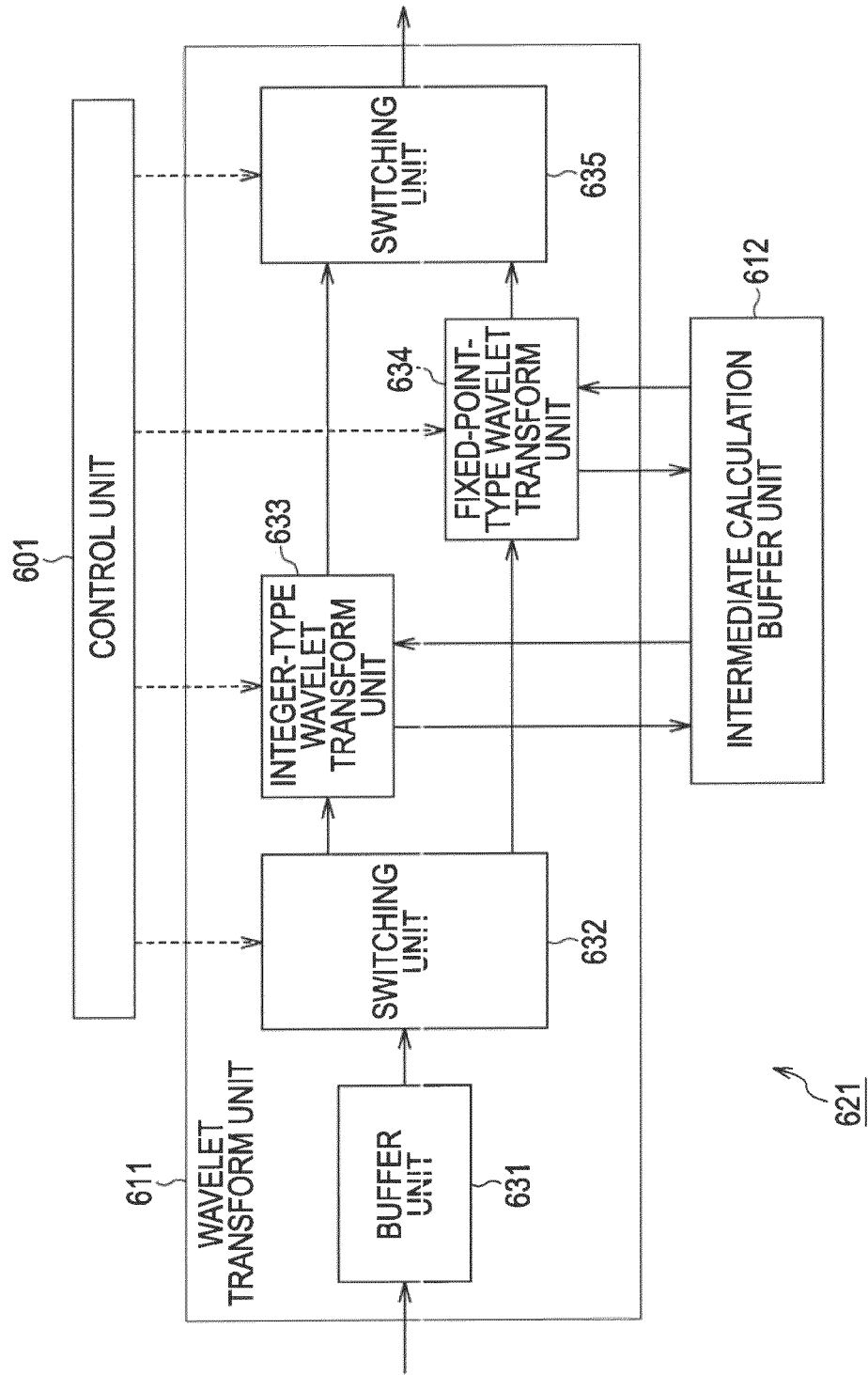
FIG. 30 is a block diagram showing a detailed exemplary structure of an analysis filter processing unit in FIG. 29.

FIG. 30 is a block diagram showing a detailed exemplary structure of the analysis filter processing unit 621. As shown in FIG. 30, the wavelet transform unit 611 includes a buffer unit 631, a switching unit 632, an integer-type wavelet transform unit 633, a fixed-point-type wavelet transform unit 634, and a switching unit 635.

The buffer unit 631 accumulates input image data. The switching unit 632 switches connection, thereby supplying the input image data output from the buffer unit 631 to one of the integer-type wavelet transform unit 633 and the fixed-point-type wavelet transform unit 634. The integer-type wavelet transform unit 633 has a structure basically similar to the wavelet transform unit 101 or the wavelet transform unit 511 and performs an analysis filtering process using a reversible method. The fixed-point-type wavelet transform unit 634 has a structure basically similar to the wavelet transform unit 301 and performs an analysis filtering process using an irreversible method. The switching unit 635 switches connection, thereby supplying one of an output of the integer-type wavelet transform unit 633 and the fixed-point-type wavelet transform unit 634 to the switching unit 613.

The control unit 601 supplies control information, thereby controlling the operation of the switching unit 632, the integer-type wavelet transform unit 633, the fixed-point-type wavelet transform unit 634, and the switching unit 635 and causes an wavelet transform process (analysis filtering process) of input image data to be performed in one of the integer-type wavelet transform unit 633 and the fixed-point-type wavelet transform unit 634. That is, under control of the control unit 601, the analysis filter processing unit 621 (wavelet transform unit 611) performs a wavelet transform process using a reversible method or an irreversible method.

Figure 31:
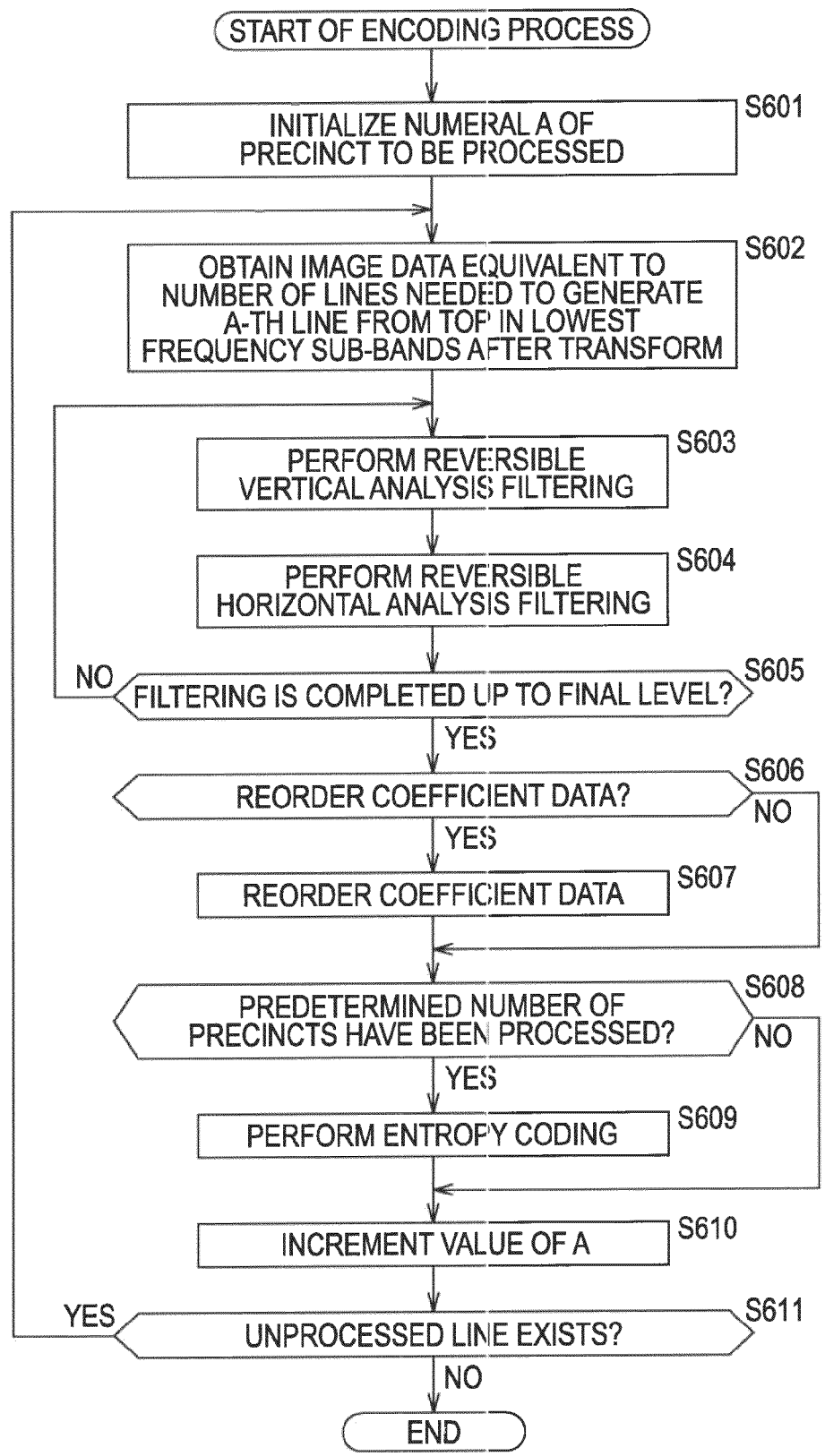
FIG. 31 is a flowchart for describing yet another exemplary flow of the encoding process.

The flow of an encoding process performed by the encoding apparatus 600 is basically similar to the case described with reference to FIG. 26, and accordingly a description thereof is omitted. With reference to the flowchart in FIG. 31, an exemplary flow of an encoding process, execution of which is started in the processing corresponding to step S502 in FIG. 26 by the wavelet transform unit 611 in FIG. 29, will be described.

The processing in step S601 through step S605 is executed basically similarly to the processing in respective step S531 through step S535. Note that, in step S603 and step S604, the wavelet transform unit 611 performs, under control of the control unit 601, analysis filtering (vertical analysis filtering and horizontal analysis filtering) using one of the integer-type wavelet transform unit 633 and the fixed-point-type wavelet transform unit 634, that is, a reversible method or an irreversible method.

In step S606, the reordering processing unit 622 determines, under control of the control unit 601, whether or not to reorder items of coefficient data. When it is determined to perform reordering, the reordering processing unit 622 controls the switching unit 613 and the switching unit 616 so that the coefficient reordering unit 615 can be used. In step S607, the reordering processing unit 622 reorders the items of coefficient data, which are output from the wavelet transform unit 611 and are arranged in order from high frequency components to low frequency components, in order from low frequency components to high frequency components. When it is determined in step S606 not to perform reordering of items of coefficient data, the reordering processing unit 622 omits the processing in step S607.

The processing in step S608 through step S611 is executed basically similarly to the processing in respective step S537 through step S540. Note that the entropy coding unit 618 performs entropy coding using a data unit (number of precincts) set by the control unit 601 as a processing unit.

The encoding unit 602 repeatedly executes an encoding process such as that described above in increments of a picture.

Figure 32:
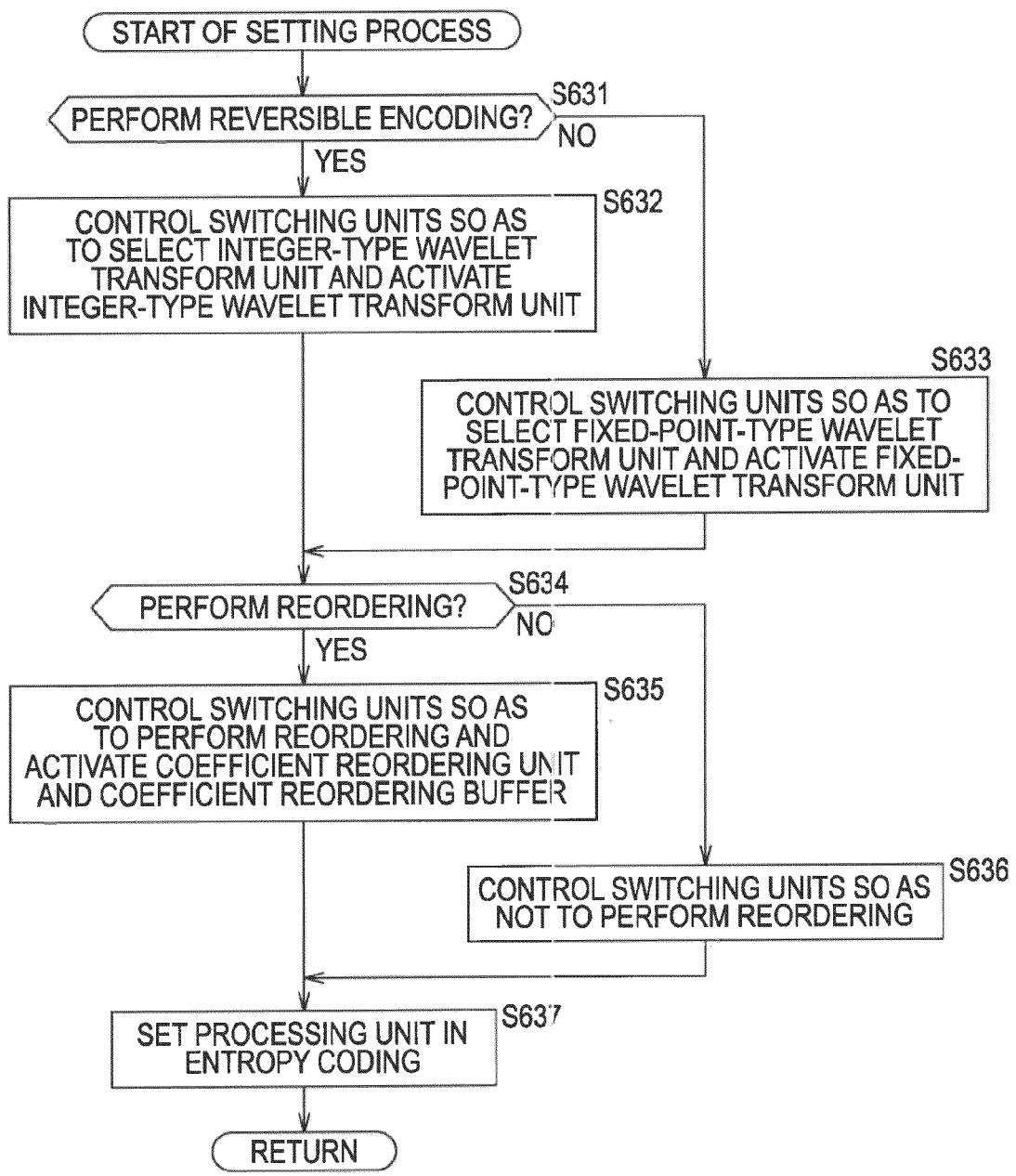
FIG. 32 is a flowchart for describing an exemplary flow of a setting process.

Next, with reference to the flowchart in FIG. 32, an exemplary flow of the setting process executed in the processing corresponding to step S501 in FIG. 26 will be described.

When the setting process starts, in step S631, the wavelet transform unit 611 determines whether or not to perform reversible encoding on the basis of control information supplied from the control unit 601. When it is determined to perform encoding using a reversible scheme, the wavelet transform unit 611 advances the process to step S632 and controls the switching unit 632 and the switching unit 635 to select the integer-type wavelet transform unit 633, and activates the integer-type wavelet transform unit 633.

Alternatively, when it is determined in step S631 to perform encoding using an irreversible scheme, the wavelet transform unit 611 advances the process to step S633 and controls the switching unit 632 and the switching unit 635 to select the fixed-point-type wavelet transform unit 634, and activates the fixed-point-type wavelet transform unit 634.

In step S634, the reordering processing unit 622 determines whether or not to perform reordering on the basis of control information supplied from the control unit 601. When it is determined to reorder coefficient data, the reordering processing unit 622 advances the process to step S635, controls the switching unit 613 and the switching unit 616 so as to perform reordering, and activates the coefficient reordering unit 615 and the coefficient reordering buffer unit 614. In contrast, when it is determined in step S634 not to perform reordering, the reordering processing unit 622 advances the process to step S636, and controls the switching unit 613 and the switching unit 616 so as not to perform reordering.

In step S637, the entropy coding unit 618 sets a processing unit (e.g., the number of precincts) in entropy coding on the basis of control information supplied from the control unit 601. That is, the entropy coding unit 618 remains in standby until items of coefficient data equivalent to the number of precincts which is the set processing unit have been accumulated in the encoding buffer unit 617. When items of coefficient data equivalent to the number of precincts which is the set processing unit are accumulated in the encoding buffer unit 617, the entropy coding unit 618 uses these items of coefficient data to execute an entropy coding process.

When the processing in step S637 ends, the process returns to processing corresponding to step S501 in FIG. 26, and the process thereafter is executed.

In the above manner, the encoding apparatus 600 can perform setting regarding the encoding method of the encoding unit 602 on the basis of control information. Note that, when the setting is to be updated, updating can be performed with a similar process. Also, the header generation unit 603 in the encoding apparatus 600 embeds the setting of the encoding process performed as above as information regarding encoding into a picture header. The method therefor is similar to the case described with reference to the flowchart in FIG. 28. The header generation unit 603 embeds each item of information into a picture header on the basis of related information supplied from the encoding unit 602.

Note that it has been described above that switching between the case where wavelet transform is performed using a reversible method and the case where wavelet transform is performed using an irreversible method is performed by using one of the integer-type wavelet transform unit 633 and the fixed-point-type wavelet transform unit 634. As has been described above, a reversible analysis filtering process and an irreversible analysis filtering process can be made common except for the bit precision.

Figure 33:
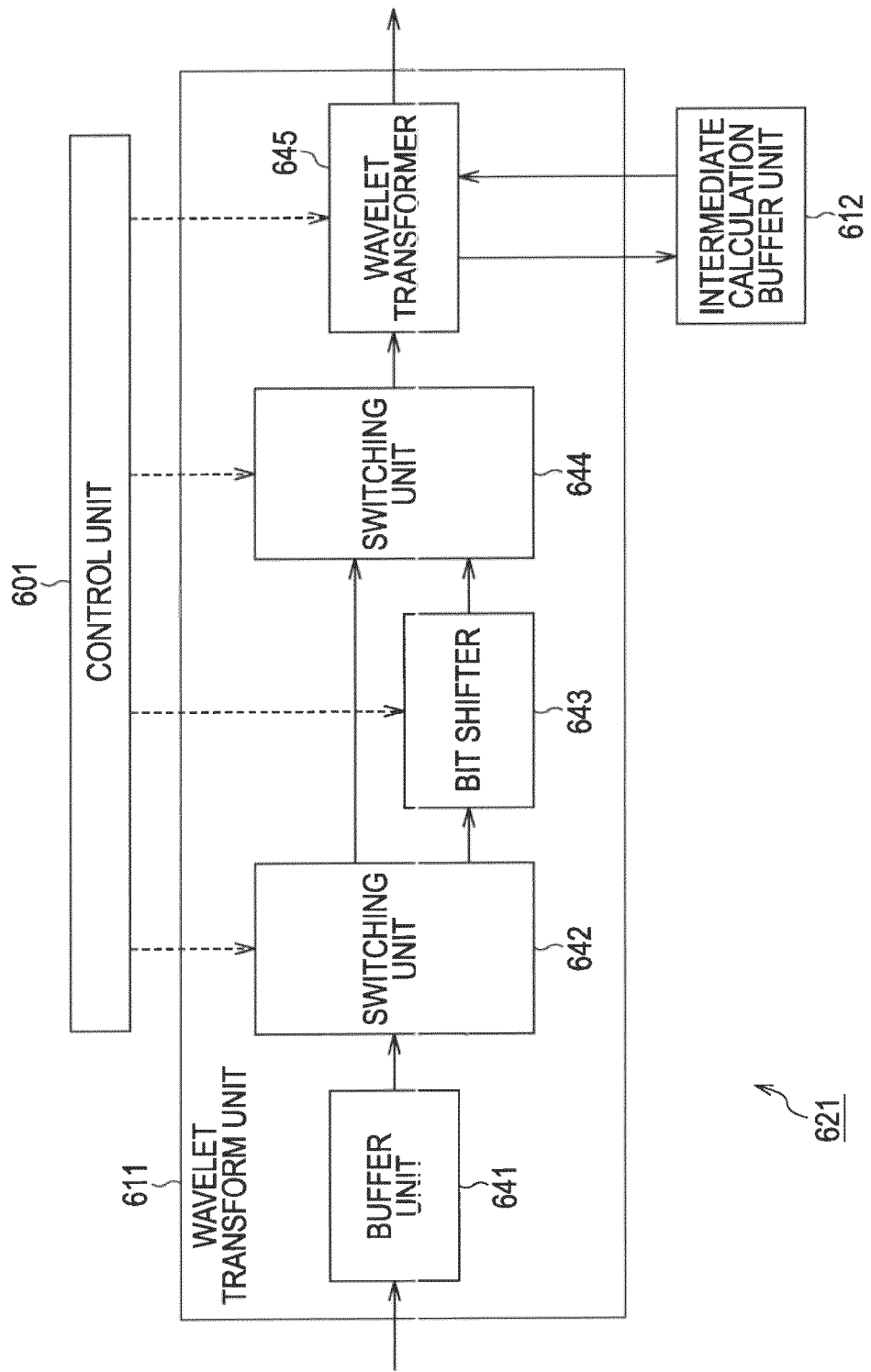
FIG. 33 is a block diagram showing another detailed exemplary structure of the analysis filter processing unit in FIG. 29.

FIG. 33 is a block diagram showing another detailed exemplary structure of the analysis filter processing unit 621.

As shown in FIG. 33, in this case, the wavelet transform unit 611 includes a buffer unit 641, a switching unit 642, a bit shifter 643, a switching unit 644, and a wavelet transformer 645. The bit shifter 643 and the wavelet transformer 645 are similar to the bit shifter 321 and the wavelet transformer 322 (FIG. 15). The buffer unit 641 temporarily holds input image data and supplies the image data to the switching unit 642 at a predetermined timing. Under control of the control unit 601, the switching unit 642 and the switching unit 644 switch connection so as to select whether or not to use the bit shifter 643.

For example, when the wavelet transform unit 611 is to perform an analysis filtering process with integer precision (analysis filtering process using a reversible method) on the basis of control information from the control unit 601, the switching unit 642 and the switching unit 644 switch connection so that the image data output from the buffer unit 641 is supplied to the wavelet transformer 645 without passing through the bit shifter 643.

Alternatively, for example, when the wavelet transform unit 611 is to perform an analysis filtering process with fixed-point precision (analysis filtering process using an irreversible method) on the basis of control information from the control unit 601, the switching unit 642 and the switching unit 644 switch connection so that the image data output from the buffer unit 641 is supplied to the wavelet transformer 645 via the bit shifter 643.

That is, when the wavelet transformer 645 is to perform wavelet transform of input image data without shifting bit(s), the wavelet transformer 645 performs a wavelet transform process with integer precision (using a reversible method). In contrast, when the wavelet transformer 645 is to shift bit(s) of input image data using the bit shifter 643 and then performs wavelet transform of the input image data, the wavelet transformer 645 performs a wavelet transform process with fixed-point precision (using an irreversible method).

By making parts of the structures common to each other, an increase in hardware (circuit dimensions) can be suppressed, and the power consumption and cost of the encoding apparatus 600 can be reduced. Note that, since the switching method and the picture header generation method are similar to the case of the structure in FIG. 30, descriptions thereof are omitted.

Figure 34:
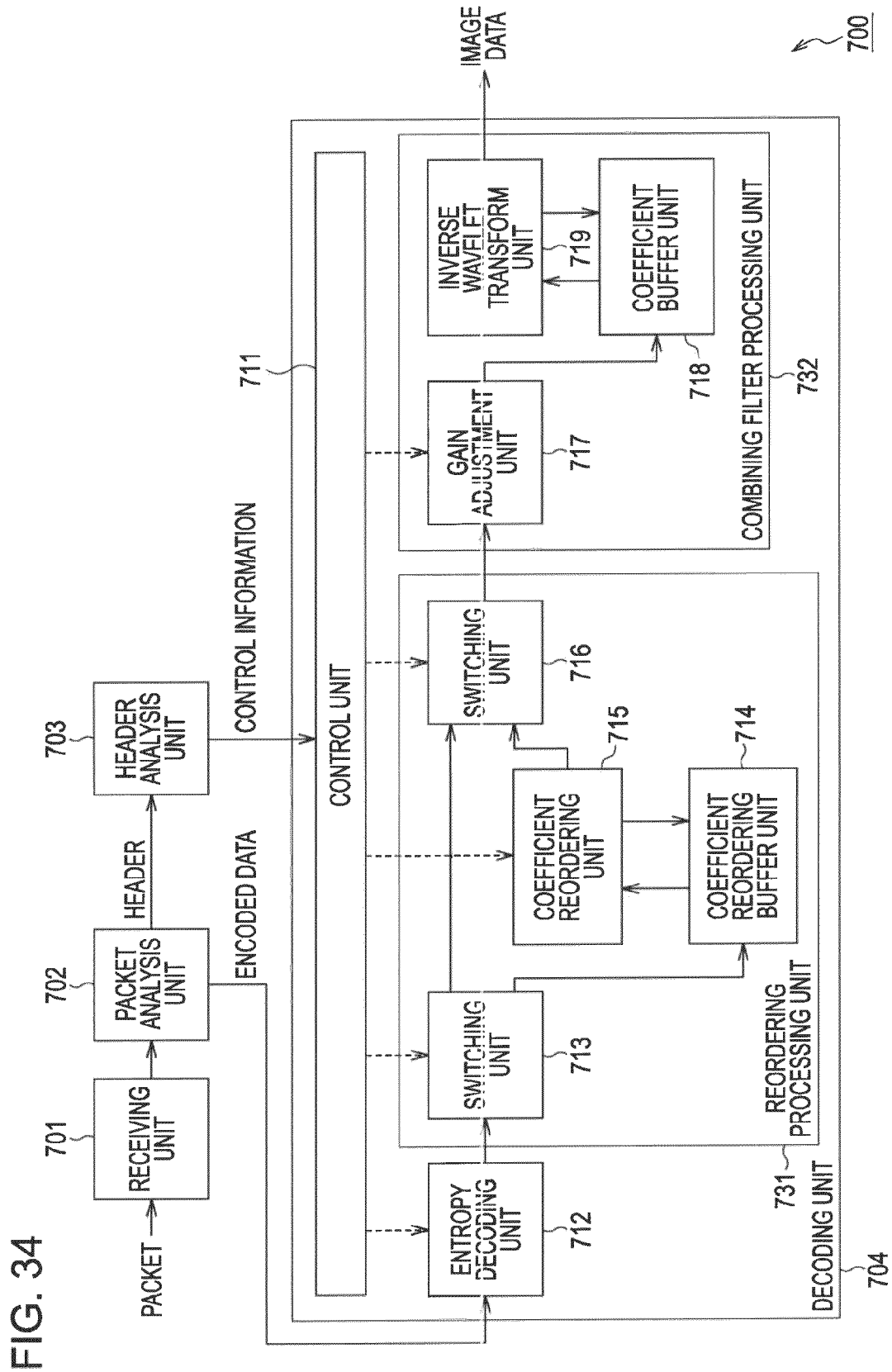
FIG. 34 is a block diagram showing yet another exemplary structure of the decoding apparatus.

Next, a decoding apparatus that corresponds to the encoding apparatus 500 and the encoding apparatus 600 described above, analyzes a picture header (information regarding encoding), and performs an appropriate decoding process will be described. FIG. 34 is a block diagram showing another exemplary structure of a decoding apparatus.

In FIG. 34, a decoding apparatus 700 corresponds to the encoding apparatus 500 and the encoding apparatus 600, analyzes a picture header (information regarding encoding) supplied therefrom, and performs an appropriate decoding process. The decoding apparatus 700 includes a receiving unit 701, a packet analysis unit 702, a header analysis unit 703, and a decoding unit 704.

The receiving unit 701 receives a packet supplied from the encoding apparatus and supplies the packet to the packet analysis unit 702. The packet analysis unit 702 analyzes the supplied packet, extracts header information such as a picture header from the packet, and supplies the header information to the header analysis unit 703. Additionally, the packet analysis unit 702 extracts encoded data from the packet and supplies the encoded data to the decoding unit 704. The header analysis unit 703 analyzes the supplied header information, extracts, for example, information regarding encoding, which is included in the above-described picture header, generates control information for a decoding process so as to optimize setting of the decoding process on the basis of the information regarding encoding, and supplies the control information to a control unit 711 in the decoding unit 704.

The decoding unit 704 has a structure basically similar to the decoding apparatus 200 or the decoding apparatus 400. The decoding unit 704 decodes supplied encoded data using a method corresponding to the encoding process performed in the encoding apparatus and generates baseband image data.

As shown in FIG. 34, the decoding unit 704 includes the control unit 711, an entropy decoding unit 712, a reordering processing unit 731, and a combining filter processing unit 732.

On the basis of the control information supplied from the header analysis unit 703, the control unit 711 controls the operation of the entropy decoding unit 712, the reordering processing unit 731, and the combining filter processing unit 732. Under control of the control unit 711, the entropy decoding unit 712 performs an entropy decoding process of encoded data supplied from the packet analysis unit 702 using a method corresponding to the entropy coding process performed in the encoding apparatus, and supplies obtained coefficient data to a switching unit 713 in the reordering processing unit 731.

The reordering processing unit 731 has a structure basically similar to the reordering processing unit 622. Under control of the control unit 711, the reordering processing unit 731 can select whether or not to perform reordering of coefficient data. As shown in FIG. 34, the reordering processing unit 731 includes the switching unit 713, a coefficient reordering buffer unit 714, a coefficient reordering unit 715, and a switching unit 716. That is, the reordering processing unit 731 under control of the control unit 711 switches connection of the switching unit 713 and the switching unit 716, and accordingly, the reordering processing unit 731 switches whether or not to perform reordering of coefficient data using the coefficient reordering buffer unit 714 and the coefficient reordering unit 715. Note that, when coefficient reordering has not been performed on the encoding apparatus side, the reordering processing unit 731 performs reordering of coefficient data. When coefficient reordering has been performed on the encoding apparatus side, the reordering processing unit 731 does not perform reordering of coefficient data.

As above, the reordering processing unit 731 can easily select whether or not to perform reordering of coefficient data in accordance with whether or not a process of reordering coefficient data has been performed on the encoding apparatus side. The switching unit 716 supplies the supplied coefficient data to a gain adjustment unit 717 in the combining filter processing unit 732.

The combining filter processing unit 732 includes the gain adjustment unit 717, a coefficient buffer unit 718, and an inverse wavelet transform unit 719. The coefficient buffer unit 718 and the inverse wavelet transform unit 719 have structures basically similar to the coefficient buffer unit 203 and the inverse wavelet transform unit 204 (FIG. 9) or the coefficient buffer unit 403 and the inverse wavelet transform unit 404 (FIG. 18), and perform similar processes. Note that the inverse wavelet transform unit 719 can perform a combining filtering process using both a reversible scheme and an irreversible scheme. The gain adjustment unit 717 performs gain adjustment of high frequency components of coefficient data according to need.

Figure 35:
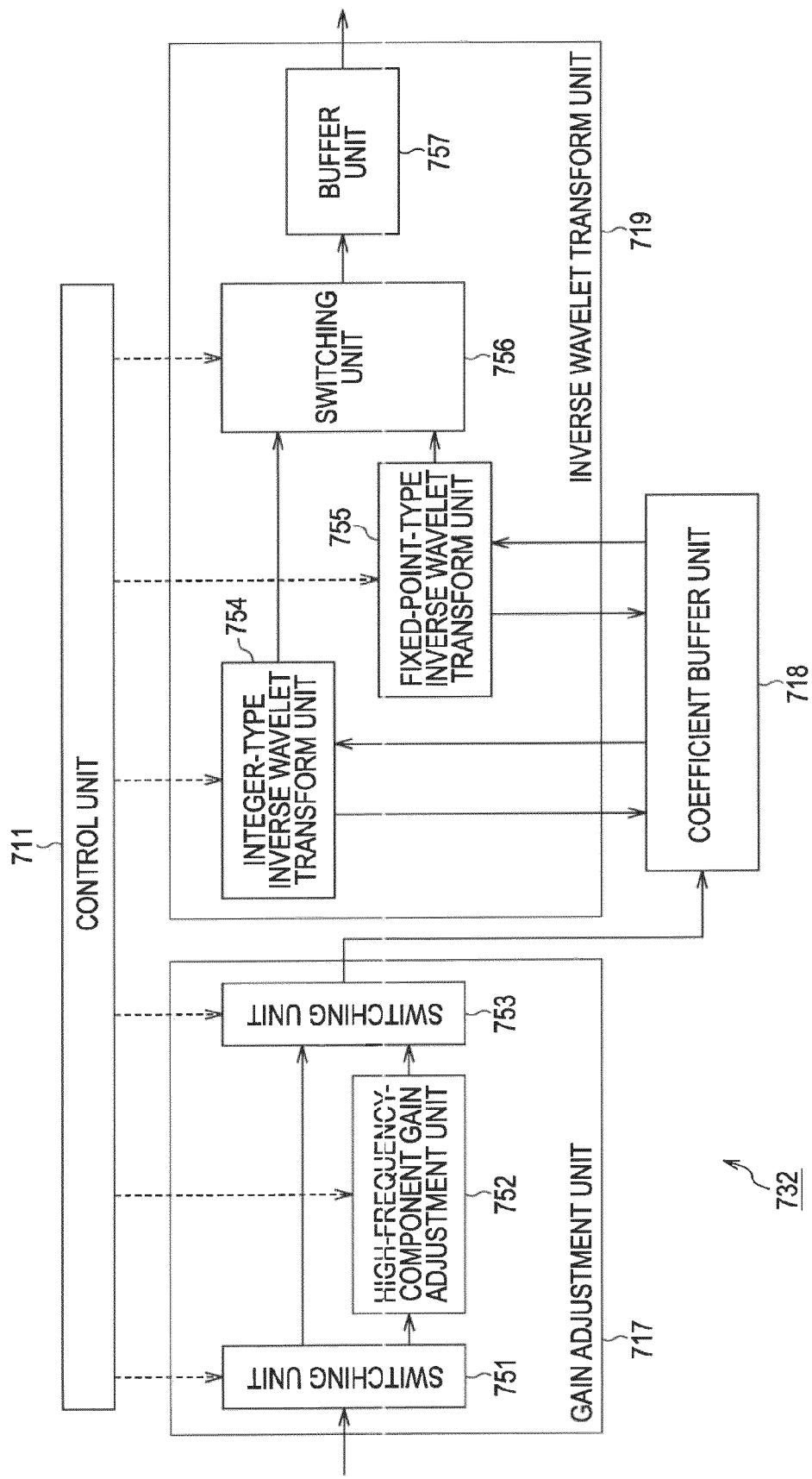
FIG. 35 is a block diagram showing a detailed exemplary structure of a combining filter processing unit in FIG. 34.

FIG. 35 is a block diagram showing a detailed exemplary structure of the combining filter processing unit 732.

As shown in FIG. 35, the gain adjustment unit 717 includes a switching unit 751, a high-frequency-component gain adjustment unit 752, and a switching unit 753. Under control of the control unit 711, the gain adjustment unit 717 selects whether or not to adjust gain of high frequency components. When performing gain adjustment, the gain adjustment unit 717 under control of the control unit 711 causes the switching unit 751 and the switching unit 753 to switch connection so that coefficient data input to the switching unit 751 is supplied to the switching unit 753 via the high-frequency-component gain adjustment unit 752. The high-frequency-component gain adjustment unit 752 performs predetermined gain adjustment of high frequency components of the supplied coefficient data. For example, when gain adjustment is performed on the encoding side, the gain adjustment unit 717 performs gain adjustment in the opposite direction to that at the time of encoding.

Alternatively, when performing no gain adjustment, the gain adjustment unit 717 under control of the control unit 711 causes the switching unit 751 and the switching unit 753 to switch connection so that coefficient data input to the switching unit 751 is supplied to the switching unit 753 without passing through the high-frequency-component gain adjustment unit 752.

As above, the gain adjustment unit 717 can easily select whether or not to perform gain adjustment in accordance with the method of an analysis filtering process on the encoding apparatus side (the presence or absence of a gain adjustment process). The switching unit 753 supplies the supplied coefficient data to the coefficient buffer unit to hold the supplied coefficient data.

The inverse wavelet transform unit 719 performs a combining filtering process of the coefficient data accumulated in the coefficient buffer unit 718 and generates baseband image data. As is the case of the wavelet transform unit 611 (FIG. 30), the inverse wavelet transform unit 719 includes both an integer-type inverse wavelet transform unit 754 that performs a combining filtering process using a reversible method and a fixed-point-type inverse wavelet transform unit 755 that performs a combining filtering process using an irreversible method. The inverse wavelet transform unit 719 further includes a switching unit 756 and a buffer unit 757. Under control of the control unit 711, the switching unit 756 switches connection, thereby performing a combining filtering process using one of the integer-type inverse wavelet transform unit 754 and the fixed-point-type inverse wavelet transform unit 755. The buffer unit 757 temporarily holds an output of the integer-type inverse wavelet transform unit 754 or the fixed-point-type inverse wavelet transform unit 755, which is supplied via the switching unit 756, that is, baseband image data, and outputs the baseband image data at a predetermined timing.

For example, when encoding is performed using a reversible method in the encoding apparatus, the inverse wavelet transform unit 719 under control of the control unit 711 is configured to select the integer-type inverse wavelet transform unit 754 and perform a combining filtering process using the integer-type inverse wavelet transform unit 754. Also, the inverse wavelet transform unit 719 under control of the control unit 711 connects the integer-type inverse wavelet transform unit 754 and the buffer unit 757 to the switching unit 756 so that an output of the integer-type inverse wavelet transform unit 754 is stored in the buffer unit 757.

Alternatively, for example, when encoding is performed using an irreversible method in the encoding apparatus, the inverse wavelet transform unit 719 under control of the control unit 711 is configured to select the fixed-point-type inverse wavelet transform unit 755 and perform a combining filtering process using the fixed-point-type inverse wavelet transform unit 755. Also, the inverse wavelet transform unit 719 under control of the control unit 711 connects the fixed-point-type inverse wavelet transform unit 755 and the buffer unit 757 to the switching unit 756 so that an output of the fixed-point-type inverse wavelet transform unit 755 is stored in the buffer unit 757.

As above, the inverse wavelet transform unit 719 can easily perform a combining filtering process using an appropriate method in accordance with the method of an analysis filtering process on the encoding apparatus side.

Figure 36:
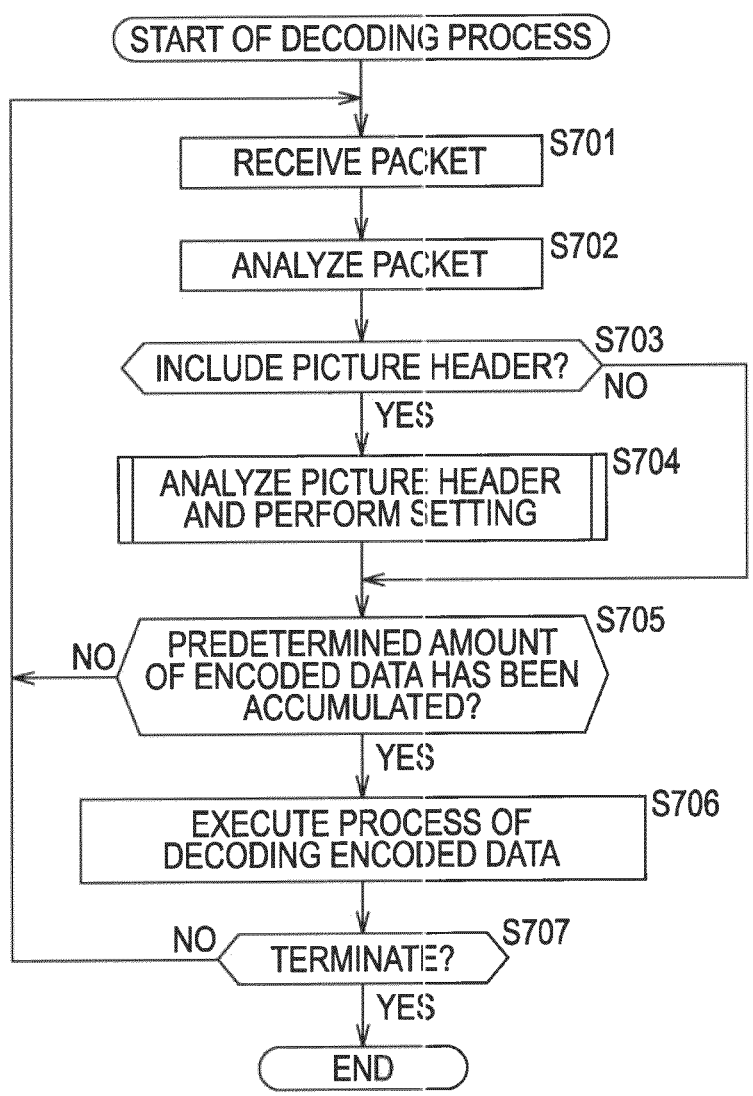
FIG. 36 is a flowchart for describing yet another exemplary flow of the decoding process.

Next, with reference to the flowchart in FIG. 36, an exemplary flow of a decoding process executed by the decoding apparatus 700 will be described.

When the decoding process starts, in step S701, the receiving unit 701 in the decoding apparatus 700 receives a packet. In step S702, the packet analysis unit 702 analyzes the packet. In step S703, the packet analysis unit 702 determines whether or not the packet includes a picture header (information regarding encoding). Note that, when information regarding encoding is included in another header, the packet analysis unit 702 determines whether or not the packet includes that header information.

When it is determined that the packet includes a picture header, the packet analysis unit 702 advances the process to step S704. In step S704, the header analysis unit 703 analyzes the picture header, generates control information, and performs setting of the decoding unit 704. Details of this process will be described with reference to the flowchart in FIG. 37. When the processing in step S704 ends, the header analysis unit 703 advances the process to step S705.

Alternatively, when it is determined in step S703 that the packet includes no picture header, the packet analysis unit 702 omits the processing in step S704 and advances the process to step S705.

In step S705, the decoding unit 704 determines whether or not a predetermined amount of encoded data has been accumulated in the entropy decoding unit 712 as a result of reception and analysis of the above-described packet. When it is determined that no predetermined amount of encoded data has been accumulated, the process returns to step S701, and further, obtaining and analysis of a packet are continued. Alternatively, when it is determined in step S705 that the predetermined amount of encoded data has been obtained, the decoding unit 704 advances the process to step S706 and executes a process of decoding the encoded data. Details of the decoding process will be described later with reference to the flowchart in FIG. 38.

In step S707, the receiving unit 701 determines whether or not to terminate the decoding process. When it is determined not to terminate the decoding process, the process returns to step S701, and the process thereafter is repeated. Alternatively, when it is determined in step S707 to terminate the decoding process, the receiving unit 701 terminates the packet reception and terminates the decoding process.

Figure 37:
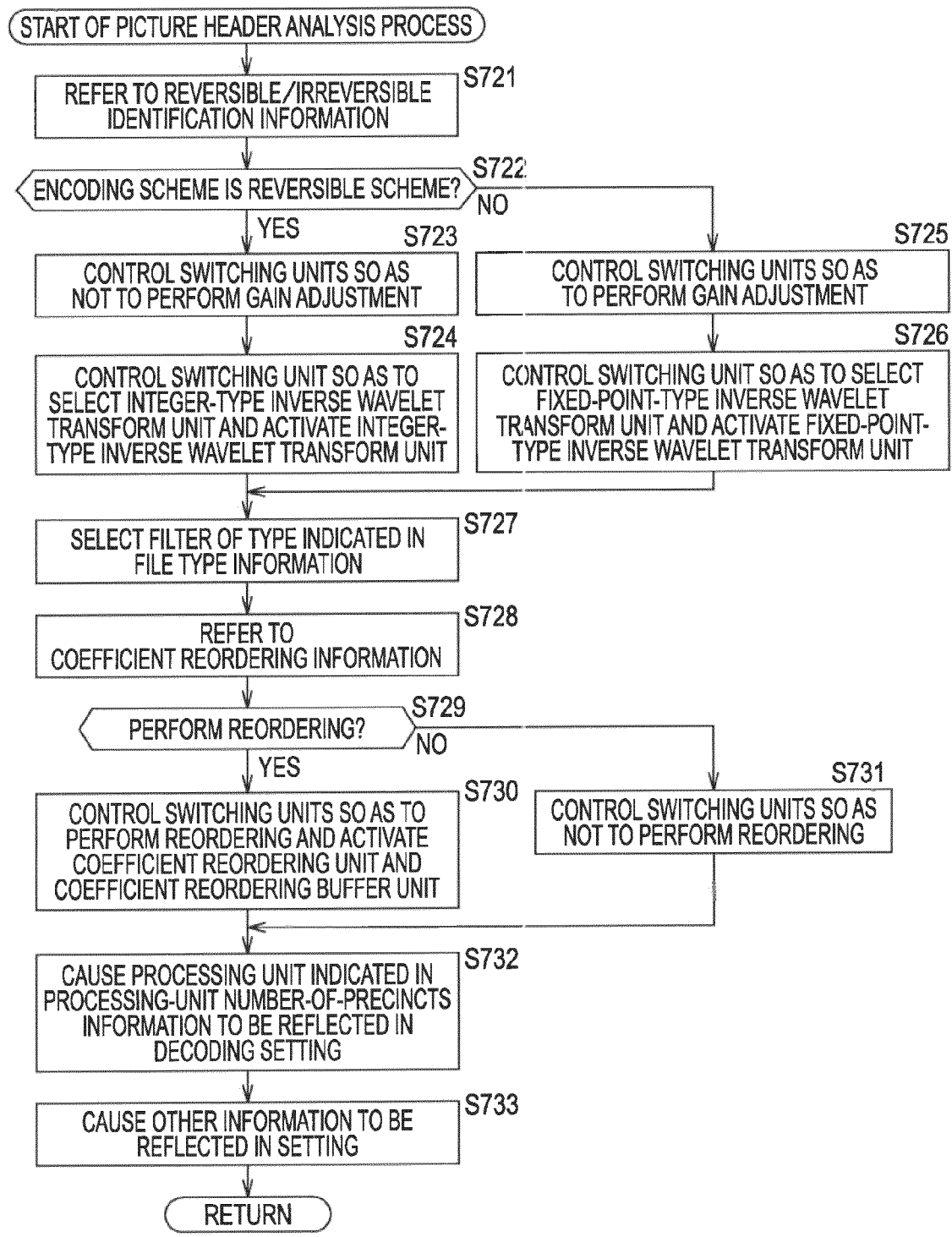
FIG. 37 is a flowchart for describing an exemplary flow of a picture header analysis process.

Next, with reference to the flowchart in FIG. 37, an exemplary flow of the picture header analysis process executed in step S704 in FIG. 36 will be described.

In step S721, the header analysis unit 703 refers to the reversible/irreversible identification information 532 in the picture header 530. In step S722, the header analysis unit 703 determines whether or not the encoding scheme of the encoded data is a reversible scheme on the basis of the reversible/irreversible identification information 532. When it is determined that the encoding scheme is a reversible scheme, the header analysis unit 703 advances the process to step S723.

In step S723, the header analysis unit 703 controls the switching unit 751 and the switching unit 753 so as not to perform gain adjustment. Note that actually the header analysis unit 703 only generates control information. The actual control is performed by the control unit 711 on the basis of the control information generated by the header analysis unit 703. The same also applies to the following.

In step S724, the header analysis unit 703 controls the switching unit 756 so as to select the integer-type inverse wavelet transform unit 754 and activates the integer-type inverse wavelet transform unit 754.

Alternatively, when it is determined in step S722 that the encoding scheme is an irreversible scheme on the basis of the reversible/irreversible identification information 532, the header analysis unit 703 advances the process to step S725.

In step S725, the header analysis unit 703 controls the switching unit 751 and the switching unit 753 so as to perform gain adjustment. In step S726, the header analysis unit 703 controls the switching unit 756 so as to select the fixed-point-type inverse wavelet transform unit 755 and activates the fixed-point-type inverse wavelet transform unit 755.

When the processing in step S724 or step S726 ends, the header analysis unit 703 selects, in step S727, a filter of the type indicated in the file type information 533. This corresponds to the case where the integer-type inverse wavelet transform unit 754 or the fixed-point-type inverse wavelet transform unit 755 (activated inverse wavelet transform unit) can select a filter to use. When the integer-type inverse wavelet transform unit 754 or the fixed-point-type inverse wavelet transform unit 755 (activated inverse wavelet transform unit) can use only one filter, this processing is omitted.

In step S728, the header analysis unit 703 refers to the coefficient reordering information 535 in the picture header 530. In step S729, the header analysis unit 703 determines whether or not to perform reordering of coefficient data. When it is determined to perform reordering of coefficient data, the header analysis unit 703 advances the process to step S730.

In step S730, the header analysis unit 703 controls the switching unit 713 and the switching unit 716 so as to perform reordering and activates the coefficient reordering unit 715 and the coefficient reordering buffer unit 714. Alternatively, when it is determined in step S729 not to perform reordering of coefficient data, the header analysis unit 703 advances the process to step S731 and controls the switching unit 713 and the switching unit 716 not to perform reordering.

In step S732, the header analysis unit 703 causes the processing unit indicated in the processing-unit number-of-precincts information 534 to be reflected in the entropy decoding setting. Further, in step S733, the header analysis unit 703 causes other information included in the picture header 530 to be reflected in various settings according to need and terminates the picture header analysis process. The process returns to step S704 in FIG. 36, and the process thereafter is executed.

As above, the header analysis unit 703 analyzes a picture header (information regarding encoding) supplied from the encoding apparatus and generates control information so as to appropriately perform decoding setting in accordance with encoding setting. Accordingly, the decoding apparatus 700 can easily perform a decoding process using an appropriate method in accordance with the encoding setting, suppress occurrence of unnecessary data deterioration or delay time, and perform data transmission with high quality and low delay.

Figure 38:
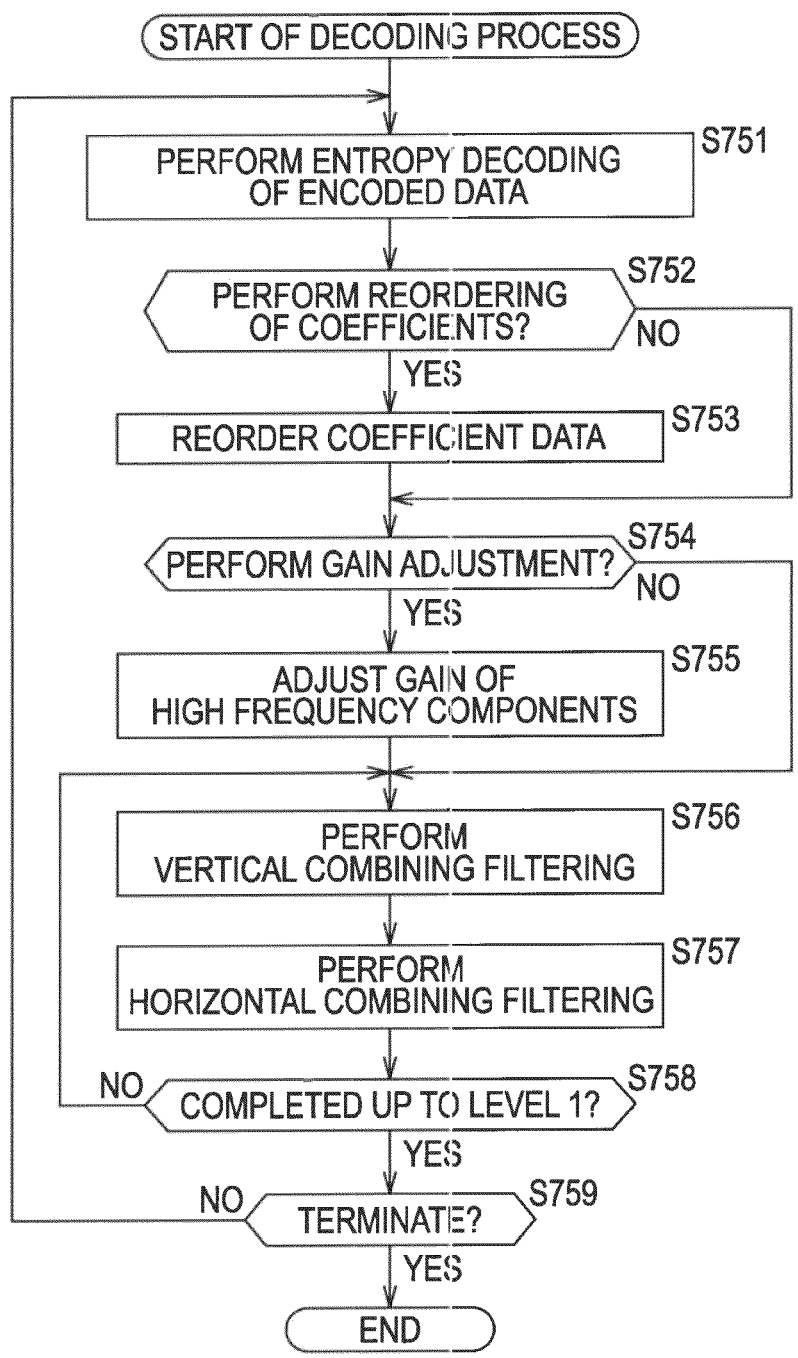
FIG. 38 is a flowchart for describing yet another exemplary flow of the decoding process.

Next, with reference to the flowchart in FIG. 38, an exemplary flow of the decoding process executed by the decoding unit 704 in step S706 in FIG. 36 will be described.

In step S751, the entropy decoding unit 712 performs entropy decoding of encoded data. In step S752, the coefficient reordering unit 715 determines whether or not to perform reordering of coefficients. When it is determined to perform reordering, the coefficient reordering unit 715 advances the process to step S753 and reorders coefficient data. Alternatively, when it is determined in step S752 not to perform reordering of coefficients, the coefficient reordering unit 715 omits the processing in step S753.

In step S754, the gain adjustment unit 717 determines whether or not to perform gain adjustment. When it is determined to perform gain adjustment, the gain adjustment unit 717 advances the process to step S755 and adjusts gain of high frequency components. Alternatively, when it is determined in step S754 not to perform gain adjustment, the gain adjustment unit 717 omits the processing in step S755.

In step S756, the inverse wavelet transform unit 719 uses one of the integer-type inverse wavelet transform unit 754 and the fixed-point-type inverse wavelet transform unit 755 to perform vertical combining filtering using a reversible scheme or an irreversible scheme. In step S757, the inverse wavelet transform unit 719 uses one of the integer-type inverse wavelet transform unit 754 and the fixed-point-type inverse wavelet transform unit 755 to perform horizontal combining filtering using a reversible scheme or an irreversible scheme.

In step S758, the inverse wavelet transform unit 719 determines whether or not the combining filtering processes have been performed up to level 1. When it is determined that the combining filtering processes at level 1 have not been completed, the process returns to step S756, and combining filtering processes at the next level are performed. When it is determined in step S758 that the combining filtering processes at level 1 have been completed, the inverse wavelet transform unit 719 advances the process to step S759. In step S759, the decoding unit 704 determines whether or not to terminate the decoding process. When the supply of encoded data is continued and accordingly it is determined not to terminate the decoding process, the decoding unit 704 brings the process back to step S751 and executes the process thereafter. When it is determined in step S759 to terminate the decoding process, the decoding unit 704 terminates the decoding process.

The decoding unit 704 executes such a decoding process in increments of a picture.

Note that, also in the case of the inverse wavelet transform unit 719, as is the case with the wavelet transform unit 611, some of the structures of the integer-type inverse wavelet transform unit 754 and the fixed-point-type inverse wavelet transform unit 755 can be made common.

Figure 39:
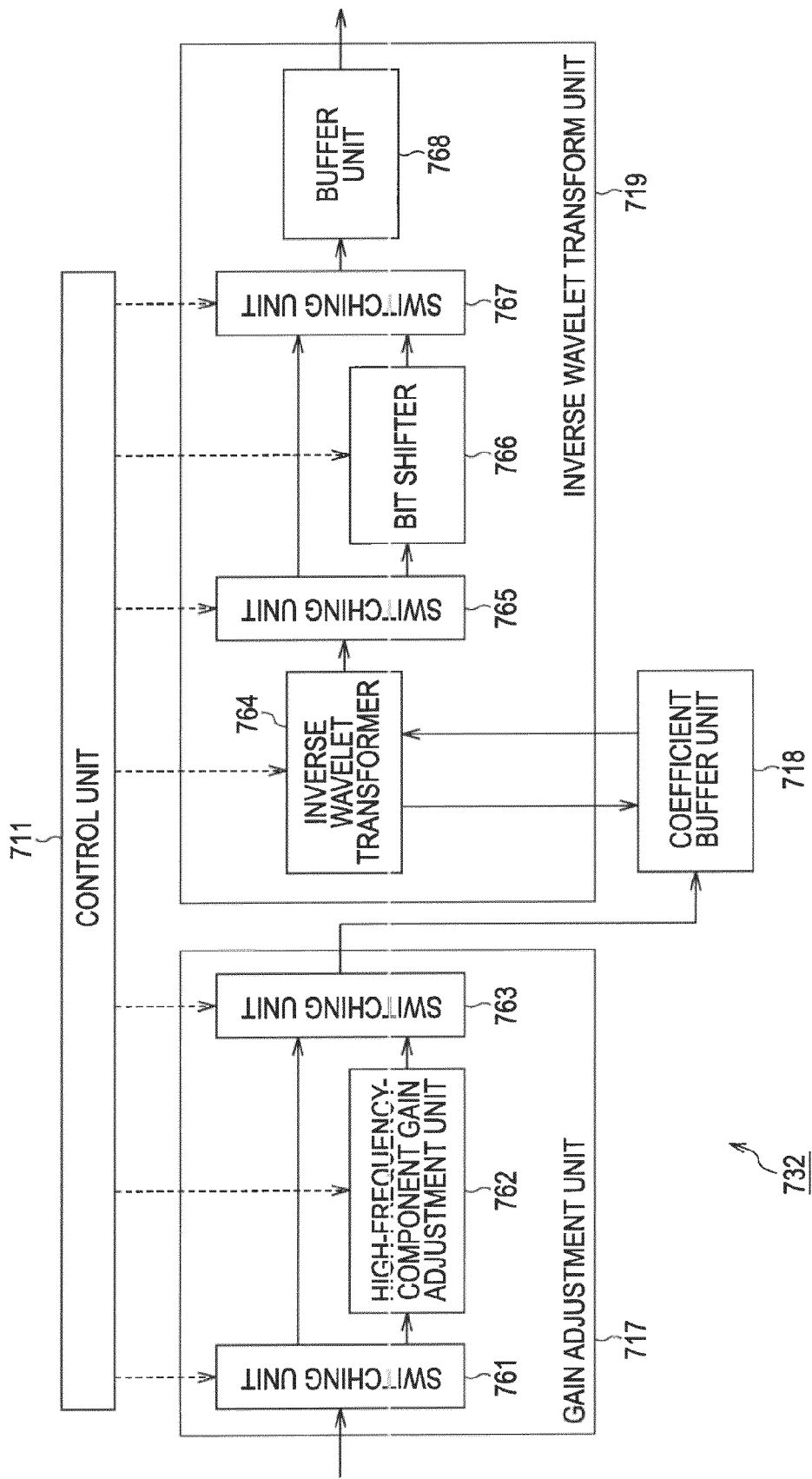
FIG. 39 is a block diagram showing another detailed exemplary structure of the combining filter processing unit in FIG. 34.

FIG. 39 is a block diagram showing another detailed exemplary structure of the analysis filter processing unit 732. In FIG. 39, the inverse wavelet transform unit 719 includes an inverse wavelet transformer 764, a switching unit 765, a bit shifter 766, a switching unit 767, and a buffer unit 768 which are common in the reversible scheme and the irreversible scheme. The inverse wavelet transform unit 719 makes portions other than the bit precision of a combining filtering process common in the reversible scheme and the irreversible scheme. That is, in the case of the irreversible scheme, the inverse wavelet transformer 764 performs a combining filtering process with the fixed-point precision. Accordingly, under control of the control unit 711, the inverse wavelet transform unit 719 causes the switching unit 765 and the bit shifter 766 to switch connection so that data is bit-shifted in the bit shifter 766 in the opposite direction from the time of encoding.

Conversely, in the case of the reversible scheme, the inverse wavelet transformer 764 performs a combining filtering process with the integer precision. Accordingly, under control of the control unit 711, the inverse wavelet transform unit 719 causes the switching unit 765 and the bit shifter 766 to switch connection so that data is not passed through the bit shifter 766.

The buffer unit 768 temporarily stores baseband image data supplied from the switching unit 767 and outputs this at a predetermined timing.

Figure 40:
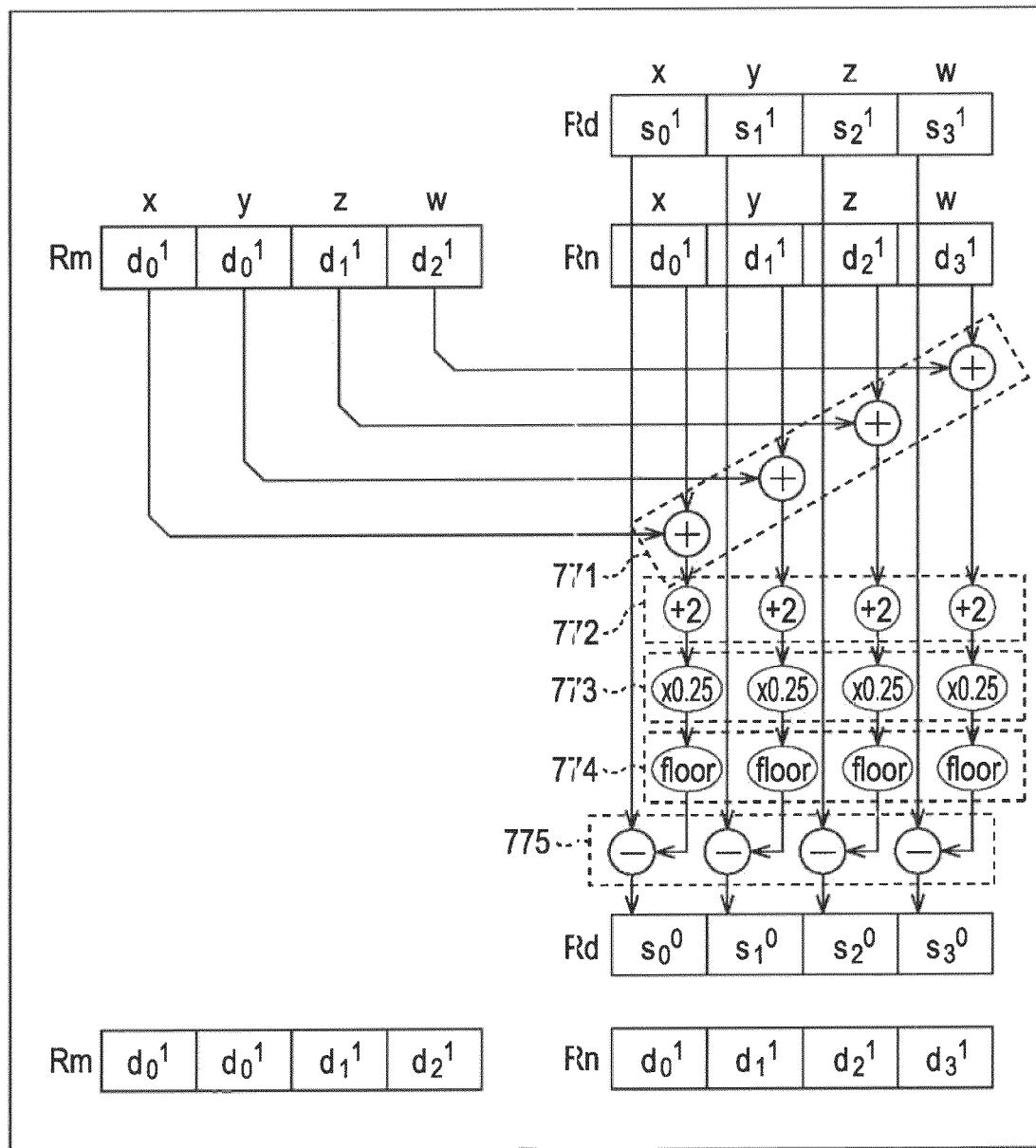
FIG. 40 is a diagram showing an exemplary hardware structure for calculating coefficients or pixel values of combining-side low frequency components.
Figure 41:
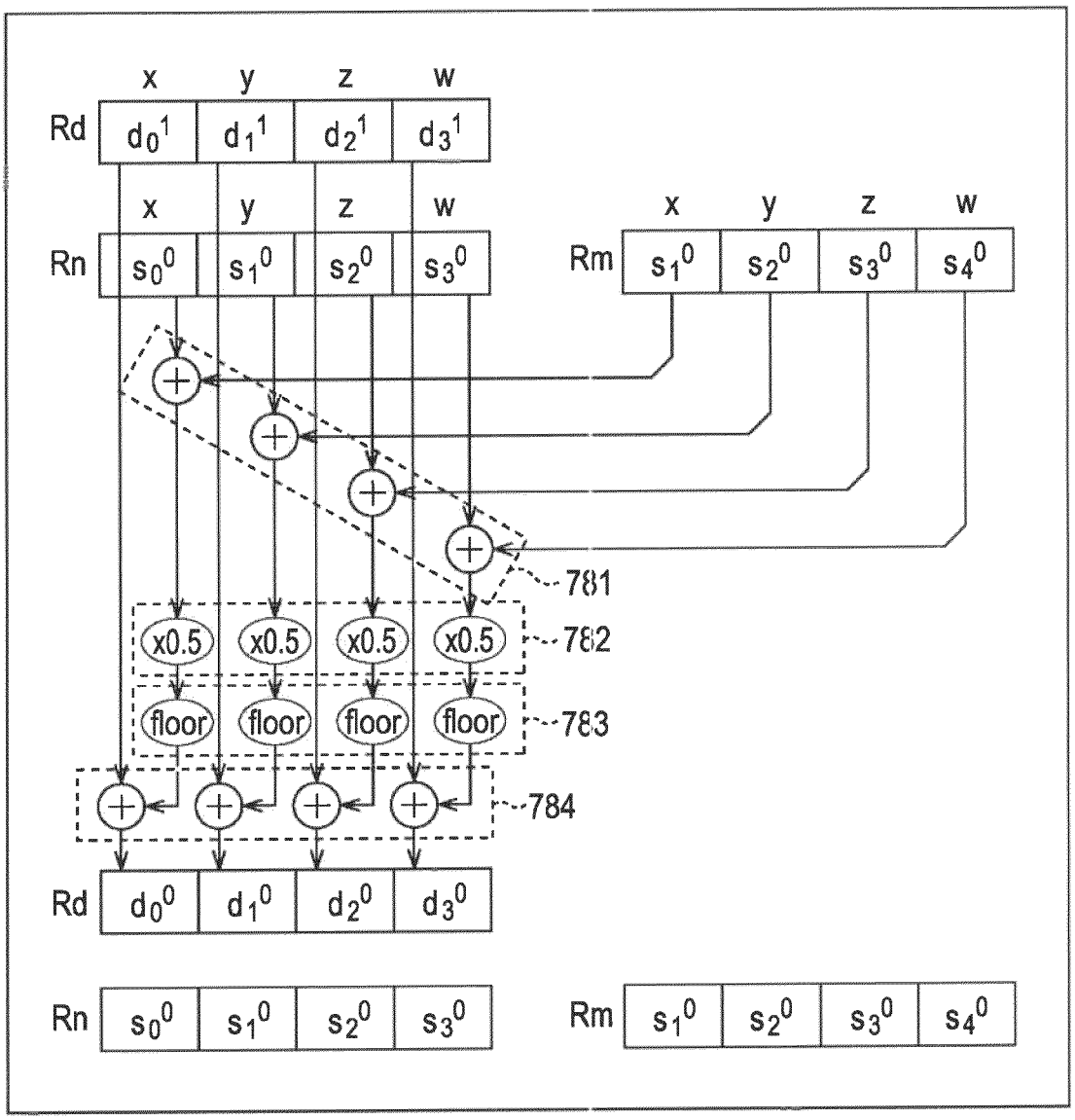
FIG. 41 is a diagram showing an exemplary hardware structure for calculating coefficients or pixel values of combining-side high-frequency components (in the case of level 0).

FIG. 40 and FIG. 41 show an exemplary hardware structure for calculating coefficients of combining-side high/low frequency components. First, with reference to FIG. 40, the structure for calculating coefficient values or pixel values of low frequency components (in the case of level 0) will be described. Here, in order to simplify the description, it is assumed that the structure includes three registers Rm, Rn, and Rd, adders 771, 772, and 775 indicated in the drawing as +, +2, and −, respectively, a multiplier 773 that performs an arithmetic operation of ×0.25, and a rounding unit 774 indicated as floor. Also, each of the registers Rm, Rn, and Rd is configured to be capable of individually storing, for example, four values x, y, z, and w. By applying the already-mentioned predetermined filtering operations to coefficient values stored in the registers, the registers calculate coefficient values or pixel values that are one level lower (in the case of level 0).

That is, four values from the register Rm (e.g., $d_0^1$, $d_0^1$, $d_1^1$, and $d_2^1$) and four values from the register Rn (e.g., $d_0^1$, $d_1^1$, $d_2^1$, and $d_3^1$) are respectively added by the adder 771. Two is added to the individual added results in the adders 772. Four output values from the adder 772 are individually multiplied by 0.25 (or two bits are shifted to the right) in the multiplier 773 to generate four values, and these values are individually round-processed by the rounding unit 774 to generate four values, which are sent to the adder 775. These four values are respectively subtracted from four values from the register Rd (e.g., $s_0^1$, $s_1^1$, $s_2^1$, and $s_3^1$), thereby calculating coefficient values or pixel values of low frequency components that are one level lower (e.g., $s_0^0$, $s_1^0$, $s_2^0$, $s_3^0$).

In addition, for example, when integer registers with a certain bit length are provided, the already-mentioned filtering with the integer precision can be executed. When these are replaced with fixed-point registers with a certain bit length, the already-mentioned filtering with the fixed-point precision can be executed. Moreover, this can be realized without needing to change the hardware structure except for the precision of the registers. In this manner, the hardware structure components can be made common.

In the structure of the specific example in FIG. 40, low frequency components are stored and placed in the register Rd, and high frequency components are stored in the registers Rm and Rn. Operation results are newly stored in the register Rd. In this manner, the results are overwritten on coefficients that have already been used and become unnecessary, and accordingly, the use of an extra register is not required, which is efficient. In addition, this contributes to reduction of hardware.

Regarding a specific example of a rounding process of the rounding unit 774 indicated as floor in FIG. 40, rounding off performed by floor is defined not as rounding off a decimal, but as performing a process of rounding to an integer that is smaller in value. According to this definition, for example, the following is obtained:

+2.3→+2 (positive value)
−2.3→−3 (negative value)

Next, with reference to FIG. 41, the structure for calculating coefficient values or pixel values of high frequency components (in the case of level 0) will be described. Here, in order to simplify the description, it is assumed that the structure includes three registers Rm, Rn, and Rd, adders 781 and 784, a multiplier 782 that performs an arithmetic operation of ×0.5, and a rounding unit 783 indicated as floor. Also, each of the registers Rm, Rn, and Rd is configured to be capable of individually storing, for example, four values x, y, z, and w. By applying the already-mentioned predetermined filtering operations to coefficient values stored in the registers, the registers calculate coefficient values or pixel values that are one level lower (in the case of level 0).

That is, four values from the register Rn (e.g., $s_0^0$, $s_1^0$, $s_2^0$, and $s_3^0$) and four values from the register Rm (e.g., $s_1^0$, $s_2^0$, $s_3^0$, and $s_4^0$) are respectively added by the adder 781. The added results are individually multiplied by 0.5 (or one bit is shifted to the right) in the multiplier 782 to generate four values, and these values are individually round-processed by the rounding unit 783 to generate four values, which are sent to the adder 784. These four values are respectively subtracted from four values from the register Rd (e.g., $d_0^1$, $d_1^1$, $d_2^1$, and $d_3^1$), thereby calculating coefficient values or pixel values of high frequency components that are one level lower (e.g., $d_0^0$, $d_1^0$, $d_2^0$, and $d_3^0$). Here, among the four values of the register Rd ($d_0^1$, $d_1^1$, $d_2^1$, and $d_3^1$), two $d_0^1$ are used since, as has been described above, data positioned outside the screen at the ends of the screen is supplemented by adjacent data inside the screen (see $d_0^1$ and dotted circles serving as folding thereof in FIG. 11).

Even in this case of the specific example in FIG. 41, as with the specific example of FIG. 40 described above, the structure of an integer-type combining filter and the structure of a fixed-point-type combining filter can be made common, without changing the hardware structure at all, only by deciding whether to use the individual registers Rm, Rn, and Rd as integer registers or fixed-point registers. In addition, a rounding process of the rounding unit 783 indicated as floor in FIG. 41 is, as in the rounding unit 774 in FIG. 40 described above, defined not as rounding off a decimal, but as performing a process of rounding to an integer that is smaller in value. Also, in the specific example in FIG. 41, low frequency components are stored and placed in the registers Rm and Rn, and high frequency components are stored in the register Rd. Operation results are newly stored in the register Rd. In this manner, the results are overwritten on coefficients that have already been used and become unnecessary, and accordingly, the use of an extra register is not required, which is efficient. In addition, this contributes to reduction of hardware. Note that it is clear that there are usages of these registers other than this. The larger the registers, the larger the amount of data that can be stored. The amount that can be filtered at the same time is also increased, which contributes to increasing the speed of processing.

Now, the multipliers 773 and 782 in FIG. 40 and FIG. 41 described above can be substituted for by shift operators. Specifically, it is clear that the ×0.25 multiplier 773 in FIG. 40 corresponds to shifting two bits to the right, and the ×5 multiplier 782 in FIG. 41 corresponds to shifting one bit to the right. In general, it has been known that making hardware to implement a shift operator is easier and more efficient than making hardware to implement a multiplier.

Note that, even in the case where a portion of the structure of the inverse wavelet transform unit is made common in the reversible scheme and the irreversible scheme, as shown in FIG. 39, selection of the scheme (switching of the switching units, etc.) and the method of a decoding process are basically similar to the case in FIG. 35, and a description thereof is omitted.

Also, in the case of the irreversible method, whether or not to perform a quantization process in the encoding apparatus 600 can be made selectable. The method therefor is just necessary to be similar to the case of the reordering processing unit 622 described with reference to FIG. 29. Information indicating whether or not a quantization process has been performed may also be embedded in the picture header 530, as with the case of reordering of coefficients. Similarly, in the case of the irreversible method, whether or not to perform a dequantization process in the decoding apparatus 700 can be made selectable. The method therefor is just necessary to be similar to the case of the reordering processing unit 731 described with reference to FIG. 34. The decoding apparatus is required to refer to the picture header and, only when a quantization process has been performed in the encoding apparatus, perform dequantization.

The above-described series of processes can be executed by hardware or can be executed by software. When the series of processes is to be executed by software, a program configuring the software is installed from a program recording medium into a computer embedded in dedicated hardware, a general personal computer, for example, which can execute various functions using various programs being installed therein, or an information processing apparatus in an information processing system consisting of a plurality of apparatuses.

Figure 42:
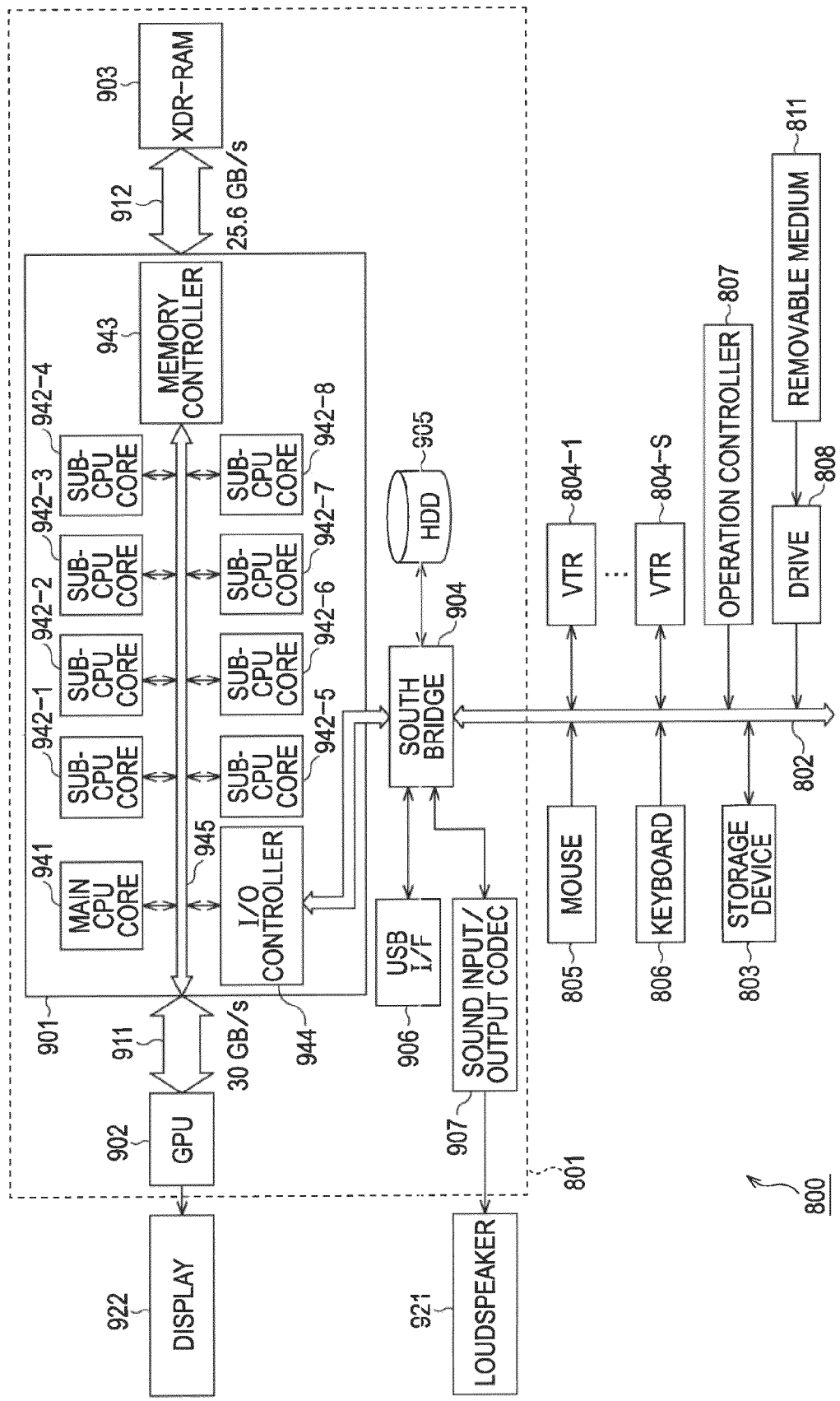
FIG. 42 is a diagram showing an exemplary configuration of an information processing system to which the present invention is applied.

FIG. 42 is a block diagram showing an exemplary configuration of an information processing system that executes the above-described series of processes based on a program.

As shown in FIG. 42, an information processing system 800 is a system configured with an information processing apparatus 801, a storage device 803 connected to the information processing apparatus 801 using a PCI bus 802, a VTR 804-1 through a VTR 804-S which are a plurality of video cassette recorders (VCR), and a mouse 805, keyboard 806, and operation controller 807 for a user to perform operation input to these, and is a system which performs an image encoding process, an image decoding process, and the like as described above based on an installed program.

For example, the information processing apparatus 801 in the information processing system 800 can store encoded data obtained by encoding moving image content stored in the large-capacity storage device 803 constituted of RAID (Redundant Arrays of Independent Disks) in the storage device 803, store in the storage device 803 decoded image data (moving image content) obtained by decoding the encoded data stored in the storage device 803, and store the encoded data and the decoded image data on video tapes via the VTR 804-1 through the VTR 804-S. Also, the information processing apparatus 801 is arranged to be capable of bringing in moving image content recorded on video tapes mounted in the VTR 804-1 through the VTR 804-S into the storage device 803. On that occasion, the information processing apparatus 801 may encode the moving image content.

The information processing apparatus 801 has a microprocessor 901, a GPU (Graphics Processing Unit) 902, an XDR (Extreme Data Rate)-RAM 903, a south bridge 904, an HDD (Hard Disk Drive) 905, a USB interface (USB I/F) 906, and a sound input/output codec 907.

The GPU 902 is connected to the microprocessor 901 via a dedicated bus 911. The XDR-RAM 903 is connected to the microprocessor 901 via a dedicated bus 912. The south bridge 904 is connected to an I/O controller 944 of the microprocessor 901 via a dedicated bus. Also connected to the south bridge 904 are the HDD 905, the USB interface 906, and the sound input/output codec 907. A loudspeaker 921 is connected to the sound input/output codec 907. Also, a display 922 is connected to the GPU 902.

Furthermore, also connected to the south bridge 904 are the mouse 805, the keyboard 806, the VTR 804-1 through the VTR 804-S, the storage device 803, and the operation controller 807, via the PCI bus 802.

The mouse 805 and the keyboard 806 receive operation inputs from the user and supply signals indicating the contents of the operation inputs from the user to the microprocessor 901 via the PCI bus 802 and the south bridge 904. The storage device 803 and the VTR 804-1 through the VTR 804-S are configured to be capable of recording or reproducing predetermined data.

Further connected to the PCI bus 802 according to need is a drive 808, to which a removable medium 811 such as a magnetic disk, an optical disk, a magneto-optical disk, or a semiconductor memory is suitably mounted, and a computer program read out therefrom is installed in the HDD 905 according to need.

The microprocessor 901 is configured with a multi-core configuration in which a general-purpose main CPU core 941 that executes basic programs such as an OS (Operating System), a sub-CPU core 942-1 through a sub-CPU core 942-8 which are a plurality of (eight in this case) RISC (Reduced Instruction Set Computer) type signal processing processors connected to the main CPU core 941 via an internal bus 945, a memory controller 943 that performs memory control of the XDR-RAM 903 having a capacity of 256 [MByte], for example, and the I/O (In/Out) controller 944 which manages input and output of data with the south bridge 904 are integrated on one chip, and realizes an operation frequency of 4 [GHz], for example.

At the time of activation, the microprocessor 901 reads out necessary application programs stored in the HDD 905 on the basis of a control program stored in the HDD 905, expands the application programs in the XDR-RAM 803, and subsequently executes necessary control processes based on the application programs and operator operations.

Also, by executing the software, the microprocessor 901 can, for example, realize the above-described encoding process and decoding process, supply encoded streams obtained as a result of encoding via the south bridge 904 to the HDD 905 for storage, and perform data transfer of a video image reproduced from the moving image content obtained as a result of decoding to the GPU 902 for display on the display 922.

While a method of using each CPU core in the microprocessor 901 is arbitrary, for example, the main CPU core 941 may perform processing relating to control of an image encoding process and an image decoding process, and may control the eight sub-CPU core 942-1 through sub-CPU core 942-8 to perform processes, such as wavelet transform, coefficient reordering, entropy coding, entropy decoding, inverse wavelet transform, quantization, and dequantization, simultaneously in parallel as described with reference to FIG. 39, for example. On that occasion, when the main CPU core 941 is arranged to assign processing to each of the eight sub-CPU core 942-1 through sub-CPU core 942-8 on a precinct-by-precinct basis, an encoding process and a decoding process are executed simultaneously in parallel on a precinct-by-precinct basis, as has been described above. That is, the efficiency of an encoding process and a decoding process can be improved, the delay time of the overall processing can be reduced, and further, the load, processing time, and memory capacity necessary for the processing can be reduced. Needless to say, each process can be performed using other methods, as well.

For example, some of the eight sub-CPU core 942-1 through sub-CPU core 942-8 of the microprocessor 901 can be arranged to execute an encoding process and the rest can be arranged to perform a decoding process simultaneously in parallel.

Also, for example, when an independent encoder or decoder, or codec processing apparatus is connected to the PCI bus 802, the eight sub-CPU core 942-1 through sub-CPU core 942-8 of the microprocessor 901 may be arranged to control processes executed by these apparatuses via the south bridge 904 and the PCI bus 802. Further, when a plurality of such apparatuses are connected, or when these apparatuses include a plurality of decoders or encoders, the eight sub-CPU core 942-1 through sub-CPU core 942-8 of the microprocessor 901 may be arranged to control processes executed by the plurality of decoders or encoders in a sharing manner.

At this time, the main CPU core 941 manages the operation of the eight sub-CPU core 942-1 through sub-CPU core 942-8, assigns processes to the individual sub-CPU cores, and retrieves processing results. Further, the main CPU core 941 performs processes other than those performed by these sub-CPU cores. For example, the main CPU core 941 accepts commands supplied from the mouse 805, the keyboard 806, or the operation controller 807 via the south bridge 904 and executes various processes in response to the commands.

The GPU 902 governs functions for performing, in addition to a final rendering process regarding, for example, pasting textures when moving a video image reproduced from moving image content to be displayed on the display 922, a coordinate transformation calculation process when simultaneously displaying a plurality of video images reproduced from moving image content and still images of still image content on the display 922, an enlargement/reduction process of a video image reproduced from moving image content and a still image of still image content, and so forth, thereby alleviating the processing load on the microprocessor 901.

Under control of the microprocessor 901, the GPU 902 applies predetermined signal processing to video image data of supplied moving image content and image data of still image content, sends the video image data and image data obtained as a result thereof to the display 922, and displays image signals on the display 922.

For example, video images reproduced from a plurality of items of moving image content decoded simultaneously in parallel by the eight sub-CPU core 942-1 through sub-CPU core 942-8 of the microprocessor 901 are data-transferred to the GPU 902 via the bus 911. The transfer speed on this occasion is, for example, 30 [Gbyte/sec] at maximum, and accordingly, even complex reproduced video images with special effects can be displayed quickly and smoothly.

In addition, the microprocessor 901 applies audio mixing processing to audio data, of video image data and audio data of moving image content, and sends edited audio data obtained as a result thereof to the loudspeaker 921 via the south bridge 904 and the sound input/output codec 907, thereby outputting audio based on audio signals from the loudspeaker 921.

When the above-described series of processes is to be executed by software, a program configuring the software is installed from a network or a recording medium.

This recording medium is configured with, for example, as shown in FIG. 42, not only the removable medium 811 which has recorded thereon the program and is distributed, separately from a main body of the apparatus, to distribute the program to a user, such as a magnetic disk (including a flexible disk), an optical disk (including CD-ROM and DVD), a magneto-optical disk (including MD) or a semiconductor memory, but also the HDD 905, the storage device 803, and the like, which have recorded thereon the program and are distributed to the user in a state where they are embedded in advance in the main body of the apparatus. Needless to say, the recording medium may also be a semiconductor memory, such as a ROM or a flash memory.

In the above, it has been described that the eight sub-CPU cores are configured in the microprocessor 901. However, the present invention is not limited thereto. The number of sub-CPU cores is arbitrary. Also, the microprocessor 901 is not necessarily be configured with a plurality of cores such as a main CPU core and sub-CPU cores, and the microprocessor may be configured using a CPU configured with a single core (one core).

Also, instead of the microprocessor 901, a plurality of CPUs may be used, or a plurality of information processing apparatuses may be used (that is, a program that executes the processes of the present invention is executed in a plurality of apparatuses operating in conjunction with one another).

The steps describing the program recorded in the recording medium in the present specification may of course include processes performed time sequentially in accordance with the described order, but also include processes executed not necessarily time sequentially but in parallel or individually.

Also, the system in the present specification refers to the entirety of equipment constituted of a plurality of devices (apparatuses).

Note that a structure described above as being a single apparatus may be split so as to be configured as a plurality of apparatuses. Conversely, structures described above as being a plurality of apparatuses may be consolidated so as to be configured as a single apparatus. Also, needless to say, the structures of the individual apparatuses may have added thereto structures other than those described above. Further, a part of the structure of one apparatus may be included in the structure of another apparatus, as long as the structure and operation of the overall system are substantially the same.

INDUSTRIAL APPLICABILITY

The present invention described above is to easily perform data transmission with high quality and low delay and is applicable to various apparatuses or systems as long as they compress, encode, and transmit images and, at a transmission destination, decode the compressed encoding and output the images. The present invention is particularly suitable to apparatuses or systems required to have a short delay from image compression and encoding to decoding and outputting.

For example, the present invention is suitable for use in applications of the medical remote medical analysis, such as operating a master-slave manipulator while looking at a video image captured by a video camera and performing a medical treatment. Also, the present invention is suitable for use in systems that encode and transmit images and decode and display or record the images in broadcasting stations and the like.

Additionally, the present invention can be applied to systems that perform distribution of live coverage of video images, systems that enable interactive communication between students and teachers in educational institutions, and the like.

Furthermore, the present invention can be applied to sending of image data captured by a mobile terminal having an image capturing function, such as a mobile phone terminal with a camera function, video conference systems, systems including a monitoring camera and a recorder that records a video image captured by the monitoring camera, and the like.

The invention claimed is:

1. An information processing apparatus, comprising:
analysis filtering means for performing an analysis filtering process of decomposing image data in increments of a frequency band using a reversible method that can restore original image data from transformed coefficient data by performing a transform in an opposite direction, and generating sub-bands including coefficient data in increments of the frequency band, in increments of a line block including image data equivalent to a number of lines needed to generate coefficient data equivalent to one line of sub-bands of at least the lowest frequency components; and
encoding means for determining whether a predetermined number of the line blocks have been processed by the analysis filtering means and for encoding the coefficient data generated by the analysis filtering process performed by the analysis filtering means using a reversible method that can restore original coefficient data from encoded data by performing a decoding process in increments of a group of items of the coefficient data generated from a plurality of the line blocks, in response to the encoding means determining that the predetermined number of the line blocks have been processed by the analysis filtering means.

2. The information processing apparatus according to claim 1, further comprising:
generation means for generating, for the encoded data obtained by an encoding performed by the encoding means, information regarding the obtained encoded data, the information at least including information indicating that the obtained encoded data has been generated by an encoding using the reversible method, in increments of a predetermined data unit.

3. The information processing apparatus according to claim 2, wherein the generation means generates, as the information regarding the obtained encoded data, information regarding a type of the analysis filtering process executed by the analysis filtering means.

4. The information processing apparatus according to claim 2, wherein the generation means generates, as the information regarding the obtained encoded data, information regarding a number of line blocks needed to generate a group of items of coefficient data serving as a processing unit for an encoding performed by the encoding means.

5. The information processing apparatus according to claim 1, further comprising:
reordering means for reordering the coefficient data generated by the analysis filtering process performed by the analysis filtering means in the order in which coefficient data is used in executing a combining filtering process of combining the coefficient data of each sub-band to generate the original image data in increments of the line block, wherein the encoding means encodes the encoded coefficient data in the order reordered by the reordering means in increments of a group of items of the coefficient data generated from the plurality of the line blocks.

6. The information processing apparatus according to claim 5, further comprising:
generation means for generating, for the encoded data obtained by an encoding performed by the encoding means, information regarding the obtained encoded data, the information at least including information indicating that the obtained encoded data has been generated by an encoding using the reversible method, and information regarding a reordering of coefficient data performed by the reordering means, in increments of a predetermined data unit.

7. The information processing apparatus according to claim 1, wherein the analysis filtering means further performs an analysis filtering process of decomposing the image data in increments of a frequency band using an irreversible method that does not ensure a restoration of the original image data by performing a transform in the opposite direction, and generating sub-bands including coefficient data in increments of the frequency band, in increments of a line block including image data equivalent to a number of lines needed to generate coefficient data equivalent to one line of sub-bands of at least the lowest frequency components, and
the information processing apparatus further comprises:
control means for controlling whether to perform the analysis filtering process performed by the analysis filtering means using the reversible method or the irreversible method.

8. The information processing apparatus according to claim 1, wherein the analysis filtering process performs calculations with integer precision.

9. An information processing method of an information processing apparatus, wherein the information processing apparatus includes an analysis filtering unit and an encoding unit, the method comprising:

performing, with the analysis filtering unit, an analysis filtering process of decomposing image data in increments of a frequency band using a reversible method that can restore original image data from transformed coefficient data by performing a transform in an opposite direction, and generating sub-bands including coefficient data in increments of the frequency band, in increments of a line block including image data equivalent to a number of lines needed to generate coefficient data equivalent to one line of sub-bands of at least the lowest frequency components;

determining whether a predetermined number of the line blocks have been processed by the performing; and encoding, with the encoding unit, the coefficient data generated by performing the analysis filtering process using a reversible method that can restore original coefficient data from encoded data by performing a decoding process in increments of a group of items of the coefficient data generated from a plurality of the line blocks, in response to the determining that the predetermined number of the line blocks have been processed by the analysis filtering unit.

10. An information processing apparatus, comprising:

analysis means for analyzing information regarding encoded data which is encoded image data, and specifying whether or not the encoded data has been generated by performing an encoding process using a reversible method that can restore data before an encoding by performing a decoding process;

decoding means for performing, when it is determined as a result of an analysis performed by the analysis means that the encoded data has been generated by performing the encoding process using the reversible method, a decoding process of the encoded data using a method corresponding to the encoding process; and combining filtering means for combining coefficient data generated from the encoded data by performing the decoding process using the decoding means and for generating the image data, in response to a determination that coefficient data equivalent to a number of lines of image data needed to generate the lowest frequency components equivalent to one line is held in a buffer.

11. An information processing method of an information processing apparatus, wherein the information processing apparatus includes an analysis unit, a decoding unit, and a combining filtering unit, the method comprising:

analyzing, with the analysis unit, information regarding encoded data which is encoded image data, and specifying whether or not the encoded data has been generated by performing an encoding process using a reversible method that can restore data before an encoding by performing a decoding process, performing, with the decoding unit, when it is determined as a result of the specifying that the encoded data has been generated by performing the encoding process using the reversible method, a decoding process of the encoded data using a method corresponding to the encoding process, and combining, with the combining filtering unit, coefficient data generated from the encoded data by performing the decoding process and generating the image data, in response to a determination that coefficient data equivalent to a number of lines of image data needed to generate the lowest frequency components equivalent to one line is held in a buffer.

12. An information processing apparatus, comprising:

an analysis filtering unit that performs an analysis filtering process of decomposing image data in increments of a frequency band using a reversible method that can restore original image data from transformed coefficient data by performing a transform in an opposite direction, and generating sub-bands including coefficient data in increments of the frequency band, in increments of a line block including image data equivalent to a number of lines needed to generate coefficient data equivalent to one line of sub-bands of at least the lowest frequency components; and an encoding unit configured to determine whether a predetermined number of the line blocks have been processed by the analysis filtering unit and to encode the coefficient data generated by the analysis filtering process performed by the analysis filtering unit using a reversible method that can restore original coefficient data from encoded data by performing a decoding process in increments of a group of items of the coefficient data generated from a plurality of the line blocks, in response to the encoding unit determining that the predetermined number of the line blocks have been processed by the analysis filtering unit.

13. A non-transitory computer-readable storage medium encoded with computer executable instructions, wherein the instructions, when executed by a processing unit, cause the processing unit to perform a method comprising:

performing an analysis filtering process of decomposing image data in increments of a frequency band using a reversible method that can restore original image data from transformed coefficient data by performing a transform in an opposite direction, and generating sub-bands including coefficient data in increments of the frequency band, in increments of a line block including image data equivalent to a number of lines needed to generate coefficient data equivalent to one line of sub-bands of at least the lowest frequency components;

determining whether a predetermined number of the line blocks have been processed by the performing; and encoding the coefficient data generated by performing the analysis filtering process using a reversible method that can restore original coefficient data from encoded data by performing a decoding process in increments of a group of items of the coefficient data generated from a plurality of the line blocks, in response to the determining determining that the predetermined number of the line blocks have been processed by the performing.

14. An information processing apparatus, comprising:

an analysis unit configured to analyze information regarding encoded data which is encoded image data, and to specify whether or not the encoded data has been generated by performing an encoding process using a reversible method that can restore data before an encoding by performing a decoding process;

a decoding unit that performs, when it is determined as a result of an analysis performed by the analysis unit that the encoded data has been generated by performing the encoding process using the reversible method, a decoding process of the encoded data using a method corresponding to the encoding process; and a combining filtering unit configured to combine coefficient data generated from the encoded data by performing the decoding process using the decoding unit and to generate the image data, in response to a determination that coefficient data equivalent to a number of lines of image data needed to generate the lowest frequency components equivalent to one line is held in a buffer.

15. A non-transitory computer-readable storage medium encoded with computer executable instructions, wherein the instructions, when executed by a processing unit, cause the processing unit to perform a method comprising:

analyzing information regarding encoded data which is encoded image data, and specifying whether or not the encoded data has been generated by performing an encoding process using a reversible method that can restore data before an encoding by performing a decoding process;

performing, when it is determined as a result of the specifying that the encoded data has been generated by performing the encoding process using the reversible method, a decoding process of the encoded data using a method corresponding to the encoding process; and combining coefficient data generated from the encoded data by performing the decoding process and generating the image data, in response to a determination that coefficient data equivalent to a number of lines of image data needed to generate the lowest frequency components equivalent to one line is held in a buffer.

* * * * *